United States Patent
Ito et al.

(10) Patent No.: US 7,936,838 B2
(45) Date of Patent: May 3, 2011

(54) WIRELESS COMMUNICATION SYSTEM, RECEIVING APPARATUS, MODULATING METHOD FOR USE THEREIN, AND PROGRAM THEREFOR

(75) Inventors: Takumi Ito, Minato-ku (JP); Shousei Yoshida, Minato-ku (JP); Yoshikazu Kakura, Minato-ku (JP); Hiroyuki Seki, Kawasaki-shi (JP); Hiroyuki Kawai, Yokosuka-shi (JP); Kenichi Higuchi, Yokohama-shi (JP); Mamoru Sawahashi, Yokohama-shi (JP)

(73) Assignees: NEC Corporation, Tokyo (JP); Fujitsu Limited, Kanagawa (JP); NTT DoCoMo, Inc., Tokyo (JP)

( * ) Notice: Subject to any disclaimer, the term of this patent is extended or adjusted under 35 U.S.C. 154(b) by 974 days.

(21) Appl. No.: 10/589,460

(22) PCT Filed: Feb. 14, 2005

(86) PCT No.: PCT/JP2005/002124
§ 371 (c)(1),
(2), (4) Date: Jan. 12, 2007

(87) PCT Pub. No.: WO2005/078955
PCT Pub. Date: Aug. 25, 2005

(65) Prior Publication Data
US 2007/0155433 A1    Jul. 5, 2007

(30) Foreign Application Priority Data

Feb. 13, 2004 (JP) ................................ 2004-035891
Aug. 24, 2004 (JP) ................................ 2004-244164

(51) Int. Cl.
*H04B 7/02* (2006.01)
(52) U.S. Cl. ...................................................... 375/267
(58) Field of Classification Search .................. 375/260, 375/262, 267, 316, 346–350; 370/333–334, 370/350
See application file for complete search history.

(56) References Cited

U.S. PATENT DOCUMENTS
5,867,538 A    2/1999  Liu
(Continued)

FOREIGN PATENT DOCUMENTS
JP    09-219616 A    8/1997
(Continued)

OTHER PUBLICATIONS

K. B. Letaief, "Joint maximum likelihood detection and interference cancellation for MIMO/OEDM systems", IEEE Vehicular Technology Conference, 2003.VTC2003, vol. 1, p. 612-616, Jun. 10, 2003.

(Continued)

*Primary Examiner* — Khanh C Tran
(74) *Attorney, Agent, or Firm* — Sughrue Mion, PLLC

(57) ABSTRACT

It is an object to provide a receiving apparatus which is capable of demodulating signals with a very simple arrangement. Receiving apparatus 1 has N reception antennas 11-1-11-N, and reception antennas 11-1-11-N receive signals. Channel coefficient estimator 12 estimates and outputs channel coefficients from the signals received by respective reception antennas 11-1-11-N. QR decomposer 13 is supplied with a channel matrix having the channel coefficients as its elements, performs QR decomposition on the channel matrix, and outputs a Q matrix and an R matrix. A $Q^H$ processor 14 is supplied with the Q matrix and the received signals, multiplies the received signals by a complex conjugate transposed matrix of the Q matrix, and outputs converted signal z. A transmitted sequence estimator 15 is supplied with converted signal z and the R matrix and estimates transmitted sequences.

114 Claims, 36 Drawing Sheets

U.S. PATENT DOCUMENTS

| | | | |
|---|---|---|---|
| 7,088,956 B2 * | 8/2006 | Kishigami et al. | 455/65 |
| 7,154,936 B2 * | 12/2006 | Bjerke et al. | 375/148 |
| 7,280,840 B2 * | 10/2007 | Murakami et al. | 455/522 |
| 2003/0095507 A1 | 5/2003 | Chen et al. | |
| 2007/0104163 A1 * | 5/2007 | Kim | 370/338 |

FOREIGN PATENT DOCUMENTS

| | | |
|---|---|---|
| JP | 2001-036440 A | 2/2001 |
| JP | 2003-178048 A | 6/2003 |
| JP | 2003-244103 A | 8/2003 |
| WO | 01/95531 A2 | 12/2001 |

OTHER PUBLICATIONS

Hiroyuki Kawai et al. "Complexity-reduced Maximum Likelihood Detection Based on Replica Candidate Selection with QR Decomposition for MIMO Multiplex Using OFCDM" Proceedings of the 2004 IEICE General Conference, B-5-42.

Takumi Ito et al. "Comparison of Complexity-reduced Maximum Likelihood Detection Based on Replica Candidate Selection with QR Decomposition to Conventional Methods in OFCDM MIMO Multiplexing" Proceedings of the 2004 IEICE General Conference, B-5-43.

Hiroyuki Seiki et al. "Suitable Likelihood Function for Complexity-reduced Maximum Likelihood Detection Based on Replica Candidate Selection with QR Decomposition in OFCDM MIMO Multiplexing" Proceedings of the 2004 IEICE General Conference, B-5-44.

Junichiro Kawamoto et al. "Multistage Type Complexity-reduced Maximum Likelihood Detection Based on Replica Candidate Selection with QR Decomposition Using Multipath Interference Canceller for Broadband DS-CDMA" Proceedings of the 2004 IEICE General Conference, B-5-45.

Shousei Yoshida et. al. "Performance of Multistage Type Complexity-reduced Maximum Likelihood Detection Based on Replica Candidate Selection with QR Decomposition Using Multipath Interference Canceller for Broadband DS-CDMA" Proceedings of the 2004 IEICE General Conference, B-5-46.

Hiroyuki Kawai et al. "Complexity-reduced Maximum Likelihood Detection Based on Replica Candidate Selection with QR Decomposition Using Pilot-Assisted Channel Estimation and Ranking for MIMO Multiplexing Using OFCDM" IEICE Technical Report, RCS2003-312.

Takumi Itoh et al. "Comparison of Complexity-reduced Maximum Likelihood Detection Based on Symbol Replica-Candidate Selection with QR Decomposition on Throughput and Computational Complexity in OFCDM MIMO Multiplexing" IEICE Technical Report, RCS2003-313.

Hiroyuki Seiki et al. "Likelihood Function for Complexity-reduced Maximum Likelihood Detection Based on Symbol Replica-Candidate Selection with QR Decomposition Suitable to Soft-Decision Turbo Decoding in OFCDM MIMO Multiplexing" IEICE Technical Report, RCS2003-314.

Junichiro Kawamoto et al. "Maximum Likelihood Detection Based on Replica Candidate Selection with QR Decomposition Employing Multipath Interference Canceller with two-Dimensional MMSE for Broadband DS-CDMA", IEICE Technical Report, RCS2004-27.

Junichiro Kawamoto et al. Accurate Path Search Method Employing Side-lobe Components Cancellation in QRM-MLD Employing Multipath Interference Canceller for Broadband DS-CDMA IEICE Technical Report, RCS2004-56.

Hiroyuki Kawai et al. "Effect of Multi-Slot and Sub-Carrier Averaging Channel Estimation Filter in QRM-MLD for MIMO Multiplexing Using OFCDM" IEICE Technical Report, RCS2004-68.

Kenichi Higuchi "Adaptive Selection Algorithm of Surviving Symbol Replica Candidates in QRM-MLD for MIMO Multiplexing Using OFCDM Wireless Access" IEICE Technical Report, RCS2004-69.

Hiroyuki Kawai et al. "Investigations on BLER and Throughput Performances of Adaptive Selection Algorithm of Surviving Symbol Replica Candidates in QRM-MLD for MIMO Multiplexing Using OFCDM Wireless Access" IEICE Technical Report, RCS2004-108.

Junichiro Kawamoto et al. "Comparison of QRM-MLD Employing Multipath Interference Canceller on Throughput and Computational Complexity in Broadband DS-CDMA" IEICE Technical Report, RCS2004-110.

Wireless 2004 The Sixteen International Conference on Wireless Communications, Proceedings vol. 1, pp. 208-214.

K.B. Letaief et al. "Joint Maximum Likelihood Detection and Interference Cancellation for MIMO/OFDM Systems", Vehicular Technology Conference, 2003, VTC 2003-Fall., 2003 IEEE 58$^{th}$, vol. 1, pp. 612-616, Oct. 9, 2003.

W. Zha et al, "Modified Decorrelating Decision-Feedback Detection of BLAST Space-Time System", IEE International Conference 2002, pp. 335-339.

* cited by examiner

WIRELESS COMMUNICATION SYSTEM, RECEIVING APPARATUS, MODULATING METHOD FOR USE THEREIN, AND PROGRAM THEREFOR

This application claims priority from PCT Application No. PCT/JP2005/002124 filed Feb. 14, 2005, and from Japanese Patent Application No. 2004-035891 filed Feb. 13, 2004 and Japanese Patent Application No. 2004-244164 filed Aug. 24, 2004, which applications are incorporated herein by reference.

TECHNICAL FIELD

The present invention relates to a wireless communication system, a receiving apparatus, a modulating method for use therein, and a program therefor, and more particularly to a demodulating method for use in a receiving apparatus of a wireless communication system which employs a plurality of transmission/reception antennas.

BACKGROUND ART

There have been a technology for simultaneously acquiring outputs with respect to a plurality of reference signal sequences as disclosed in JP-A 2003-1708048 and a technology for processing a plurality of oncoming signals received by an array sensor device comprising a plurality of sensors as disclosed in JP-A 9-219616.

FIG. 32 is a diagram showing an arrangement of a wireless communication system of the above type. Receiving apparatus 800 employs a plurality of reception antennas 800-1 through 800-4, and demodulates received signals according to a demodulating process based on maximum likelihood sequence estimation.

In FIG. 32, it is assumed that signals sent from three transmission antennas (not shown) are received by receiving apparatus 800 having four reception antennas 800-1 through 800-4, and each transmission antenna is sending either one of 16-valued signals $c_1$ through $c_{16}$.

Receiving apparatus 800 has four reception antennas 800-1 through 800-4 each for receiving a signal. Channel coefficient estimator 802 is supplied with the received signals as its inputs, estimates channel coefficients between the transmission and reception antennas, and outputs a channel matrix. Maximum likelihood sequence estimator 803 is supplied with the received signals and the channel matrix as its inputs and estimates transmitted sequences.

In the above example, if either one of 16-valued signals $c_1$ through $c_{16}$ is sent from the three transmission antennas, then maximum likelihood sequence estimator 803 comprises 4096 error calculators 804-1 through 804-4096 and one signal selector 805.

Each of error calculators 804-1 through 804-4096 is in the form of error calculator 804 shown in FIG. 33. In first-stage error calculator 804-1, transmitted symbol generator 811 generates and outputs transmitted symbols $s_{1-1}, s_{1-2}, s_{1-3}$ with respect to each of the antennas.

Received signal replica generator 812 is supplied with the transmitted symbols and the channel coefficients as its inputs and generates and outputs received signal replicas.

Error calculator 813 is supplied with the received signals and the received signal replicas as its inputs and calculates an error signal. The transmitted symbols generated by transmitted symbol generator 811 are for either one of signals $c_1$ through $c_{16}$, and error calculators 804-1 through 804-4096 generate mutually different transmitted symbols.

Received signal replica generator 812 generate four received signal replicas $r_{1-1}, r_{1-2}, r_{1-3}, r_{1-4}$ represented by:

$$r_{1-1} = h_{11}s_{1-1} + h_{12}s_{1-2} + h_{13}s_{1-3}$$

$$r_{1-2} = h_{21}s_{1-1} + h_{22}s_{1-2} + h_{23}s_{1-3}$$

$$r_{1-3} = h_{31}s_{1-1} + h_{32}s_{1-2} + h_{33}s_{1-3}$$

$$r_{1-4} = h_{41}s_{1-1} + h_{42}s_{1-2} + h_{43}s_{1-3}$$

where $h_{11}, h_{12}, h_{13}, h_{21}, h_{22}, h_{23}, h_{31}, h_{32}, h_{33}, h_{41}, h_{42}, h_{43}$ represent the channel coefficients between the transmission antennas and reception antennas.

Error calculator 813 is supplied with the received signals and the received signal replicas as its inputs and calculates error signal $e_1$ according to the equation:

$$e_1 = |r_1 - r_{1-1}|^2 + |r_2 - r_{1-2}|^2 + |r_3 - r_{1-3}|^2 + |r_4 - r_{1-4}|^2$$

First-stage error calculator 804-1 outputs generated transmitted symbols $s_{1-1}, s_{1-2}, s_{1-3}$ and calculated error signal $e_1$. Similarly, second-stage error calculator 804-2 outputs transmitted symbols $s_{2-1}, s_{2-2}, s_{2-3}$ and error signal $e_2$. 4096th-stage error calculator 804-4906 outputs transmitted symbols $s_{4096-1}, s_{4096-2}, s_{4096-3}$ and error signal $e_{4096}$.

Signal selector 805 is supplied with the transmitted symbols and the error signals output from 4096 error calculators 804-1 through 804-4096, as its inputs, selects a minimum error, and outputs transmitted symbols which give the minimum error. In this manner, the transmitted signals are modulated.

DISCLOSURE OF THE INVENTION

Problems to be Solved by the Invention:

In the conventional transmitted sequence estimator described above, signal selector 805 needs to be supplied with 4096 signals and to generate and compare 4096 signals in order to demodulate the three signals, and hence requires a large amount of calculations to be carried out.

This is because pseudo received signals generated from all candidates that are possible to have been sent and actually received signals are compared with each other. When D signals are being sent from the transmission antennas, it is generally required to generate and compare $D^M$ signals in order to demodulate the D signals.

Consequently, the number of combinations is exponentially increased, and a very complex arrangement is required. JP-A 2003-1708048 and JP-A 9-219616 referred to above are given merely as technological examples for QR decomposition, and the disclosed technologies are unable to solve the above problems.

It is an object of the present invention to solve the above problems and to provide a wireless communication system, a receiving apparatus, a modulating method for use therein, and a program therefor which are capable of demodulating signals with a very simple arrangement.

Means for Achieving the Task:

According to the present invention, there is provided a wireless communication system for receiving and demodulating transmitted signals from a transmitting apparatus having M (M is an integer of 2 or greater) transmission antennas, with a receiving apparatus having N (N is an integer of 2 or greater), the receiving apparatus comprising:

means for performing nulling representative of orthogonalization of the received signals, using a channel matrix having as elements channel coefficients between the reception antennas and the transmission antennas; and means for demodulating the transmitted signals based on the nulled signals.

According to the present invention, there is provided another wireless communication system for receiving and demodulating transmitted signals from a transmitting apparatus having M (M is an integer of 2 or greater) transmission antennas, with a receiving apparatus having N (N is an integer of 2 or greater), the receiving apparatus comprising:

means for performing nulling representative of orthogonalization of the received signals, using a channel matrix having as elements channel coefficients between the reception antennas and the transmission antennas; and means for calculating and outputting a likelihood for the transmitted signals based on the nulled signals.

According to the present invention, there is provided still another wireless communication system for receiving and demodulating transmitted signals from a transmitting apparatus having M (M is an integer of 2 or greater) transmission antennas, with a receiving apparatus having N (N is an integer of 2 or greater), the receiving apparatus comprising:

means for performing nulling representative of orthogonalization of the received signals, using a channel matrix having as elements channel coefficients between the reception antennas and the transmission antennas; and means for outputting a likelihood for bits of the transmitted signals based on the nulled signals.

According to the present invention, there is provided a receiving apparatus having N (N is an integer of 2 or greater) reception antennas in a wireless communication system for receiving and demodulating transmitted signals from a transmitting apparatus having M (M is an integer of 2 or greater) transmission antennas, the receiving apparatus comprising:

means for performing nulling representative of the received signals, using a channel matrix having as elements channel coefficients between the reception antennas and the transmission antennas; and means for demodulating the transmitted signals based on the nulled signals.

According to the present invention, there is provided another receiving apparatus having N (N is an integer of 2 or greater) reception antennas in a wireless communication system for receiving and demodulating transmitted signals from a transmitting apparatus having M (M is an integer of 2 or greater) transmission antennas, the receiving apparatus comprising:

means for performing nulling representative of orthogonalization of the received signals, using a channel matrix having as elements channel coefficients between the reception antennas and the transmission antennas; and means for calculating and outputting a likelihood for the transmitted signals based on the nulled signals.

According to the present invention, there is provided still another receiving apparatus having N (N is an integer of 2 or greater) reception antennas in a wireless communication system for receiving and demodulating transmitted signals from a transmitting apparatus having M (M is an integer of 2 or greater) transmission antennas, the receiving apparatus comprising:

means for performing nulling representative of orthogonalization of the received signals, using a channel matrix having as elements channel coefficients between the reception antennas and the transmission antennas; and means for outputting a likelihood for bits of the transmitted signals based on the nulled signals.

According to the present invention, there is provided a demodulating method of receiving and demodulating transmitted signals from a transmitting apparatus having M (M is an integer of 2 or greater) transmission antennas, in a receiving apparatus having N (N is an integer of 2 or greater) reception antennas, the demodulating method comprising the steps of:

performing nulling representative of orthogonalization of the received signals, using a channel matrix having as elements channel coefficients between the reception antennas and the transmission antennas; and demodulating the transmitted signals based on the nulled signals.

According to the present invention, there is provided another demodulating method of receiving and demodulating transmitted signals from a transmitting apparatus having M (M is an integer of 2 or greater) transmission antennas, in a receiving apparatus having N (N is an integer of 2 or greater) reception antennas, the demodulating method comprising the steps of:

performing nulling representative of orthogonalization of the received signals, using a channel matrix having as elements channel coefficients between the reception antennas and the transmission antennas; and calculating and outputting a likelihood for the transmitted signals based on the nulled signals.

According to the present invention, there is provided still another demodulating method of receiving and demodulating transmitted signals from a transmitting apparatus having M (M is an integer of 2 or greater) transmission antennas, in a receiving apparatus having N (N is an integer of 2 or greater) reception antennas, the demodulating method comprising the steps of:

performing nulling representative of orthogonalization of the received signals, using a channel matrix having as elements channel coefficients between the reception antennas and the transmission antennas; and outputting a likelihood for bits of the transmitted signals based on the nulled signals.

According to the present invention, there is provided a program for a demodulating method of receiving and demodulating transmitted signals from a transmitting apparatus having M (M is an integer of 2 or greater) transmission antennas, in a receiving apparatus having N (N is an integer of 2 or greater) reception antennas, the program enabling a computer to perform:

a process of performing nulling representative of orthogonalization of the received signals, using a channel matrix having as elements channel coefficients between the reception antennas and the transmission antennas; and a process of demodulating the transmitted signals based on the nulled signals.

According to the present invention, there is provided another program for a demodulating method of receiving and demodulating transmitted signals from a transmitting apparatus having M (M is an integer of 2 or greater) transmission antennas, in a receiving apparatus having N (N is an integer of 2 or greater) reception antennas, the program enabling a computer to perform:

a process of performing nulling representative of orthogonalization of the received signals, using a channel matrix having as elements channel coefficients between the reception antennas and the transmission antennas; and a process of calculating and outputting a likelihood for the transmitted signals based on the nulled signals.

According to the present invention, there is provided still another program for a demodulating method of receiving and demodulating transmitted signals from a transmitting apparatus having M (M is an integer of 2 or greater) transmission antennas, in a receiving apparatus having N (N is an integer of 2 or greater) reception antennas, the program enabling a computer to perform:

a process of performing nulling representative of orthogonalization of the received signals, using a channel matrix having as elements channel coefficients between the reception antennas and the transmission antennas; and a process of outputting a likelihood for bits of the transmitted signals based on the nulled signals.

Specifically, a first wireless communication system according to the present invention has a receiving apparatus having N (N is an integer of 2 or greater) reception antennas, for receiving signals transmitted from a transmitting apparatus having M (M is an integer of 2 or greater) transmission antennas, and demodulating the signals using QR decomposition of a channel matrix having as elements channel coefficients between the transmission and reception antennas.

A second wireless communication system according to the present invention has a receiving apparatus having N (N is an integer of 2 or greater) reception antennas, for receiving signals transmitted from a transmitting apparatus having M (M is an integer of 2 or greater) transmission antennas, and calculating and outputting a likelihood for the signals transmitted from the transmitting apparatus using QR decomposition of a channel matrix having as elements channel coefficients between the transmission and reception antennas.

A third wireless communication system according to the present invention has a receiving apparatus having N (N is an integer of 2 or greater) reception antennas, for receiving signals transmitted from a transmitting apparatus having M (M is an integer of 2 or greater) transmission antennas, and calculating and outputting a likelihood for bits transmitted from the transmitting apparatus using QR decomposition of a channel matrix having as elements channel coefficients between the transmission and reception antennas.

A fourth wireless communication system according to the present invention has a receiving apparatus having:

a channel coefficient estimator for estimating and outputting the channel coefficients between the between the reception antennas and the transmission antennas based on the received signals;

a QR decomposer for performing QR decomposition on the channel matrix of the channel coefficients and outputting a Q matrix and an R matrix;

a $Q^H$ processor for multiplying a received signal vector having the received signals as elements by a complex conjugate transposed matrix of the Q matrix and outputting the product as a converted signal; and a transmitted sequence estimator for outputting at least one of a transmitted sequence, a likelihood for the transmitted sequence, and a likelihood for bits transmitted by the transmitted sequence, based on the converted signal and the R matrix.

A fifth wireless communication system according to the present invention has a receiving apparatus having:

a channel coefficient estimator for estimating and outputting the channel coefficients between the between the reception antennas and the transmission antennas based on the received signals;

a QR decomposer for performing QR decomposition on the channel matrix of the channel coefficients and outputting a Q matrix and an R matrix;

a $Q^H$ processor for multiplying a received signal vector having the received signals as elements by a complex conjugate transposed matrix of the Q matrix and outputting the product as a converted signal;

a transmitted symbol candidate selector for selecting and outputting a symbol candidate for the converted signal based on the received signals; and a transmitted sequence estimator for outputting at least one of a transmitted sequence, a likelihood for the transmitted sequence, and a likelihood for bits transmitted by the transmitted sequence, based on the converted signal, the symbol candidate, and the R matrix.

A sixth wireless communication system according to the present invention has a receiving apparatus having:

a channel coefficient estimator for estimating and outputting the channel coefficients between the between the reception antennas and the transmission antennas based on the received signals;

a priority determiner for determining priorities between transmission sequences transmitted from the transmission antennas based on the received signals;

a sorter for sorting the channel coefficients based on the channel coefficients estimated by the channel coefficient estimator and the priorities determined by the priority determiner, and outputting a modified channel matrix;

a QR decomposer for performing QR decomposition on the modified channel matrix and outputting a Q matrix and an R matrix;

a $Q^H$ processor for multiplying a received signal vector having the received signals as elements by a complex conjugate transposed matrix of the Q matrix and outputting the product as a converted signal;

a transmitted sequence estimator for outputting at least one of a transmitted sequence, a likelihood for the transmitted sequence, and a likelihood for bits transmitted by the transmitted sequence, based on the converted signal and the R matrix; and a restorer for restoring and outputting at least one of the transmitted sequence, the likelihood for the transmitted sequence, and the likelihood for bits transmitted by the transmitted sequence, based on the output from the transmitted sequence estimator and the priorities.

A seventh wireless communication system according to the present invention has a receiving apparatus having:

a channel coefficient estimator for estimating and outputting the channel coefficients between the between the reception antennas and the transmission antennas based on the received signals;

a QR decomposer for performing QR decomposition on the channel matrix of the channel coefficients and outputting a Q matrix and an R matrix;

a $Q^H$ processor for multiplying a received signal vector having the received signals as elements by a complex conjugate transposed matrix of the Q matrix and outputting the product as a converted signal;

a transmitted sequence candidate selector for determining candidate sequences for L (L is an integer ranging from 1 to M) converted signals based on the received signals and outputting the determined candidate sequences as transmitted sequence candidates; and a transmitted sequence estimator for outputting at least one of a transmitted sequence, a likelihood for the transmitted sequence, and a likelihood for bits transmitted by the transmitted sequence, based on the converted signal, the R matrix, and the transmitted sequence candidates.

An eighth wireless communication system according to the present invention has a receiving apparatus having:

a channel coefficient estimator for estimating and outputting the channel coefficients between the between the reception antennas and the transmission antennas based on the received signals;

a priority determiner for determining priorities between transmission sequences transmitted from the transmission antennas based on the received signals;

a sorter for sorting the channel coefficients based on the channel coefficients estimated by the channel coefficient estimator and the priorities determined by the priority determiner, and outputting a modified channel matrix;

a QR decomposer for performing QR decomposition on the modified channel matrix and outputting a Q matrix and an R matrix;

a $Q^H$ processor for multiplying a received signal vector having the received signals as elements by a complex conjugate transposed matrix of the Q matrix and outputting the product as a converted signal;

a transmitted symbol candidate selector for selecting a symbol candidate for a demodulated sequence based on the received signals, and outputting a transmitted symbol candidate;

a transmitted sequence estimator for outputting at least one of a transmitted sequence, a likelihood for the transmitted sequence, and a likelihood for bits transmitted by the transmitted sequence, based on the converted signal, the R matrix, and the transmitted symbol candidate; and a restorer for restoring and outputting at least one of the transmitted sequence, the likelihood for the transmitted sequence, and the likelihood for bits transmitted by the transmitted sequence, based on the output from the transmitted sequence estimator and the priorities.

A ninth wireless communication system according to the present invention has a receiving apparatus having:

a channel coefficient estimator for estimating and outputting the channel coefficients between the between the reception antennas and the transmission antennas based on the received signals;

a priority determiner for determining priorities between transmission sequences transmitted from the transmission antennas based on the received signals;

a sorter for sorting the channel coefficients based on the channel coefficients estimated by the channel coefficient estimator and the priorities determined by the priority determiner, and outputting a modified channel matrix;

a QR decomposer for performing QR decomposition on the modified channel matrix and outputting a Q matrix and an R matrix;

a $Q^H$ processor for multiplying a received signal vector having the received signals as elements by a complex conjugate transposed matrix of the Q matrix and outputting the product as a converted signal;

a transmitted sequence candidate selector for determining candidate sequences for L (L is an integer ranging from 1 to M) converted signals based on the received signals and outputting the determined candidate sequences as transmitted sequence candidates;

a transmitted sequence estimator for outputting at least one of a transmitted sequence, a likelihood for the transmitted sequence, and a likelihood for bits transmitted by the transmitted sequence, based on the converted signal, the R matrix, and the transmitted sequence candidates; and a restorer for restoring and outputting at least one of the transmitted sequence, the likelihood for the transmitted sequence, and the likelihood for bits transmitted by the transmitted sequence, based on the output from the transmitted sequence estimator and the priorities.

A tenth wireless communication system according to the present invention has a receiving apparatus having:

a channel coefficient estimator for estimating and outputting the channel coefficients between the between the reception antennas and the transmission antennas based on the received signals;

a QR decomposer for performing QR decomposition on the channel matrix of the channel coefficients and outputting a Q matrix and an R matrix;

a $Q^H$ processor for multiplying a received signal vector having the received signals as elements by a complex conjugate transposed matrix of the Q matrix and outputting the product as a converted signal;

a transmitted sequence candidate selector for determining candidate sequences for L (L is an integer ranging from 1 to M) converted signals based on the received signals and outputting the determined candidate sequences as transmitted sequence candidates;

a transmitted symbol candidate selector for selecting and outputting symbol candidates for (M−L) demodulated signals based on the received signals; and a transmitted sequence estimator for outputting at least one of a transmitted sequence, a likelihood for the transmitted sequence, and a likelihood for bits transmitted by the transmitted sequence, based on the converted signal, the R matrix, the transmitted sequence candidates, and the symbol candidates.

An eleventh wireless communication system according to the present invention has a receiving apparatus having:

a channel coefficient estimator for estimating and outputting the channel coefficients between the between the reception antennas and the transmission antennas based on the received signals;

a priority determiner for determining priorities between transmission sequences transmitted from the transmission antennas based on the received signals;

a sorter for sorting the channel coefficients based on the channel coefficients estimated by the channel coefficient estimator and the priorities determined by the priority determiner, and outputting a modified channel matrix;

a QR decomposer for performing QR decomposition on the modified channel matrix and outputting a Q matrix and an R matrix;

a $Q^H$ processor for multiplying a received signal vector having the received signals as elements by a complex conjugate transposed matrix of the Q matrix and outputting the product as a converted signal;

a transmitted sequence candidate selector for determining candidate sequences for L (L is an integer ranging from 1 to M) converted signals based on the received signals and outputting the determined candidate sequences as transmitted sequence candidates;

a transmitted symbol candidate selector for selecting and outputting symbol candidates for (M−L) converted signals based on the received signals;

a transmitted sequence estimator for outputting at least one of a transmitted sequence, a likelihood for the transmitted sequence, and a likelihood for bits transmitted by the transmitted sequence, based on the converted signal, the R matrix, and the symbol candidates; and a restorer for restoring and outputting at least one of the transmitted sequence, the likelihood for the transmitted sequence, and the likelihood for bits transmitted by the transmitted sequence, based on the output from the transmitted sequence estimator and the priorities.

A twelfth wireless communication system according to the present invention has a transmitted sequence estimator including likelihood calculator groups and signal selectors in P stages (P is an integer of 1 or greater);

a likelihood calculator group in a pth (p is an integer ranging from 1 to P) stage comprising Kp (Kp is an integer of 1 or greater) likelihood calculators;

each of the likelihood calculators calculating a likelihood in the pth stage and generating the transmitted symbol candidates based on the converted signal, the R matrix, Lp−1 (Lp−1 is an integer of 1 or greater) error signals output from a signal selector in a (p−1)th stage, and the transmitted symbol candidates; and a signal selector in the pth stage outputting Lp (Lp is an integer of 1 or greater) maximum likelihoods and Lp transmitted symbol candidates which give the likelihoods, based on Kp likelihoods output from the likelihood calculator group in the pth stage and the transmitted symbol candidates.

A thirteenth wireless communication system according to the present invention has a transmitted sequence estimator including likelihood calculator groups and signal selectors in P stages (P is an integer of 1 or greater);

a likelihood calculator group in a pth (p is an integer ranging from 1 to P) stage comprising Kp (Kp is an integer of 1 or greater) likelihood calculators;

each of the likelihood calculators calculating a likelihood in the pth stage and generating the transmitted symbol candidates based on the converted signal, the R matrix, Kp−1 (Kp−1 is an integer of 1 or greater) error signals output from a signal selector in a (p−1)th stage, and the transmitted symbol candidates; and a signal selector in the pth stage outputting Kp+1 maximum likelihoods and Kp+1 transmitted symbol candidates which give the likelihoods, based on Kp likelihoods output from the likelihood calculator group in the pth stage and the transmitted symbol candidates.

A fourteenth wireless communication system according to the present invention has a transmitted sequence estimator having likelihood calculator groups in M stages (M is an integer of 2 or greater) and signal selector groups in the M stages.

A fifteenth wireless communication system according to the present invention has a transmitted sequence estimator having likelihood calculator groups in N stages (N is an integer of 2 or greater) and signal selector groups in the M stages.

A sixteenth wireless communication system according to the present invention has a transmitted sequence estimator including signal selectors in a plurality of stages, and a signal selector in a final stage selects and outputs a most likely transmitted sequence.

A seventeenth wireless communication system according to the present invention has a transmitted sequence estimator including signal selectors in a plurality of stages, and a signal selector in a final stage selects a most likely transmitted sequence and outputs a likelihood for the sequence.

An eighteenth wireless communication system according to the present invention has a transmitted sequence estimator including signal selectors in a plurality of stages, and a signal selector in a final stage selects a most likely transmitted sequence and outputs a likelihood for a bit sequence transmitted by the sequence.

A nineteenth wireless communication system according to the present invention has a transmitted sequence estimator including a likelihood calculator for generating a converted signal replica using elements of the R matrix and calculating the likelihood using a physical quantity measured from the converted signal replica and the received signals.

A twentieth wireless communication system according to the present invention has a transmitted sequence estimator comprising a likelihood calculator for calculating the likelihood using a squared Euclidean distance between the received signals and the converted signal replica.

A twenty first wireless communication system according to the present invention has a transmitted sequence estimator comprising a likelihood calculator for calculating the likelihood using a Euclidean distance converted by performing a given processing operation on a squared Euclidean distance between the received signals and the converted signal replica.

A twenty fifth wireless communication system according to the present invention has a transmitted symbol candidate selector employing a linear filter.

A twenty sixth wireless communication system according to the present invention has a transmitted symbol candidate selector employing maximum likelihood estimation.

A twenty seventh wireless communication system according to the present invention has a priority determiner employing received electric power of each of the transmitted sequences.

A twenty eighth wireless communication system according to the present invention has a priority determiner employing a received electric power vs. noise electric power ratio of each of the transmitted sequences.

A twenty ninth wireless communication system according to the present invention has a priority determiner employing a received electric power vs. noise electric power ratio and an interference electric power ratio of each of the transmitted sequences.

A thirtieth wireless communication system according to the present invention has a transmitted sequence candidate selector employing a linear filter.

A thirty first wireless communication system according to the present invention has a transmitted sequence candidate selector employing maximum likelihood estimation.

The wireless communication system according to the present invention uses a channel matrix which has been QR-decomposed, and estimates transmitted sequences using pseudo received signals generated from a plurality of likely sequences and actually received signals. Using a suitable number of sequences, signals can be demodulated with a much simpler arrangement than heretofore.

Figure 1:
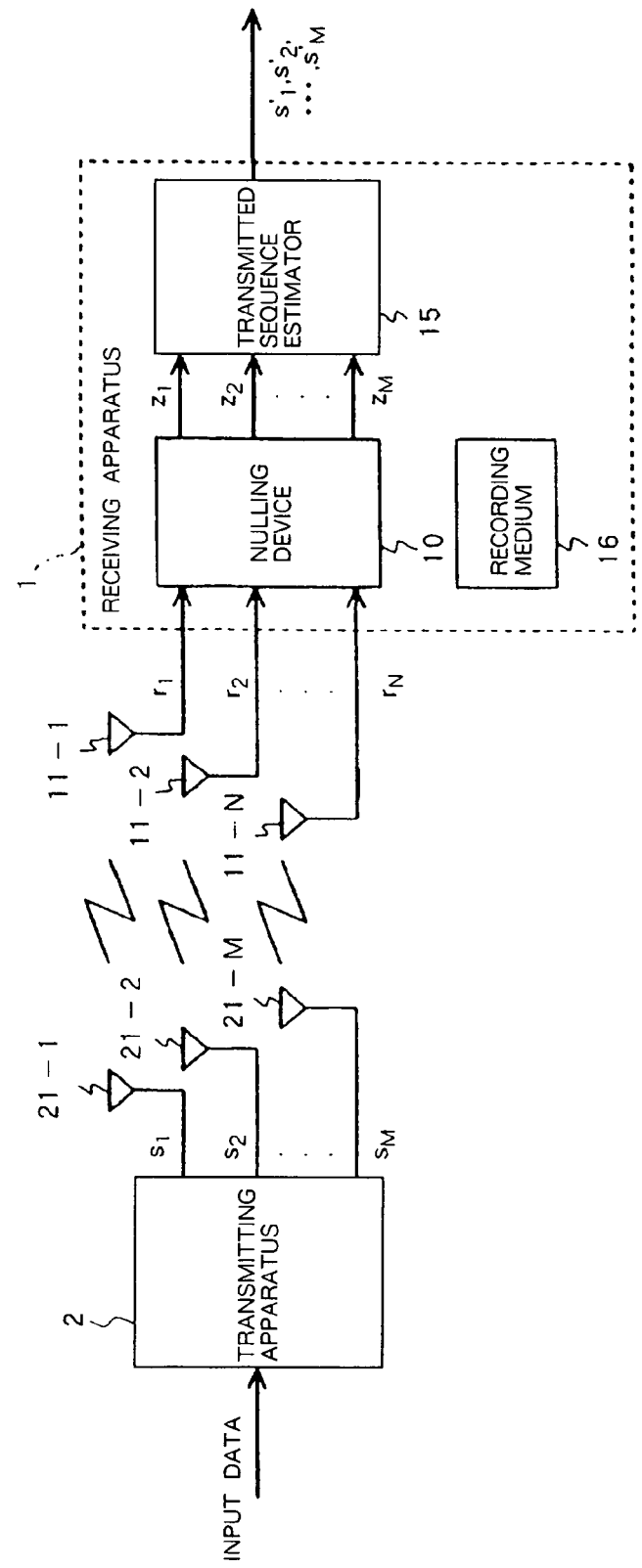
FIG. 1 is a block diagram of a wireless communication system according to an embodiment of the present invention.

DESCRIPTION OF REFERENCE CHARACTERS 1, 3, 5, 7, 8, 100, 700, 1200 receiving apparatus
2 transmitting apparatus
4, 6, 9, 15, 77, 110, 706, 1202 transmitted sequence estimator
10 nulling device
11-1-11-N, 31-1-31-4, 51-1-51-3, 71-1-71-4, 81-1, 81-2, 101-1, 101-2, 701-701-4, 1201-1-1204-4 reception antenna
12, 32, 52, 72, 82, 102, 500 channel coefficient estimator
13, 33, 53, 75, 85, 106, 703 QR decomposer
14, 34, 54, 76, 86, 107, 705 $Q^H$ processor
16, 35, 56, 79, 108, 707 recording medium
21-1-21-M transmission antenna
41-1-41-16, 43-1-43-16K1, 45-1-45-16K2, 61-1-61-8, 63-1-63-8K1,91-1-91-16K, 93-1-93-16K1, 111-1-111-L2', 113-1-113-L1'K1, 1204-1-1204-16, 1206-1-1206-16K1, 1208-1-1208-16K2 likelihood calculator
42, 44, 46, 62, 64, 92, 94, 112, 114, 200, 300, 1205, 1207 signal selector
55 transmitted symbol candidate selector
73, 83, 104 priority determiner
74, 84, 105 channel coefficient sorter
78, 89, 120 restorer
103 control channel restorer
201, 301, 901 antenna-specific minimum value selector
202, 203, 302, 303, 902 bit judging device
204, 205, 304, 305, 903 bit-specific minimum value selector
206, 207, 308, 309, 909 bit-specific likelihood calculator
210, 211, 310, 311 turbo decoder
306, 307, 904 error signal accumulator
411, 431, 451, 611, 631, 911, 931, 1111, 1131 transmitted symbol candidate generator
412, 432, 452, 612, 632, 912, 932, 1112, 1132 converted signal replica generator
413, 433, 453, 613, 633, 913, 933, 1113, 1133 error calculator
501-1, 501-3, 505-1, 505-3 pilot symbol replica generator
502-1, 502-3, 506-1, 506-3 correlation detector
704-1-704-4 despreader
905-908 function processor
1203 decoder
1209 signal selector incorporating a bit likelihood outputting function

BEST MODE FOR CARRYING OUT THE INVENTION

An embodiment of the present invention will be described with reference to the drawings. FIG. 1 is a block diagram of a wireless communication system according to an embodiment of the present invention. In FIG. 1, the wireless communication system according to the embodiment of the present invention allows receiving apparatus 1 and transmitting apparatus 2 to be connected to each other through wireless communications.

Receiving apparatus 1 has N (N is an integer of 2 or greater) reception antennas 11-1-11-N and comprises nulling device 10, transmitted sequence estimator 15, and recording medium 16. Transmitting apparatus 2 has M (M is an integer of 2 or greater) transmission antennas 21-1-21-M.

Figure 2:
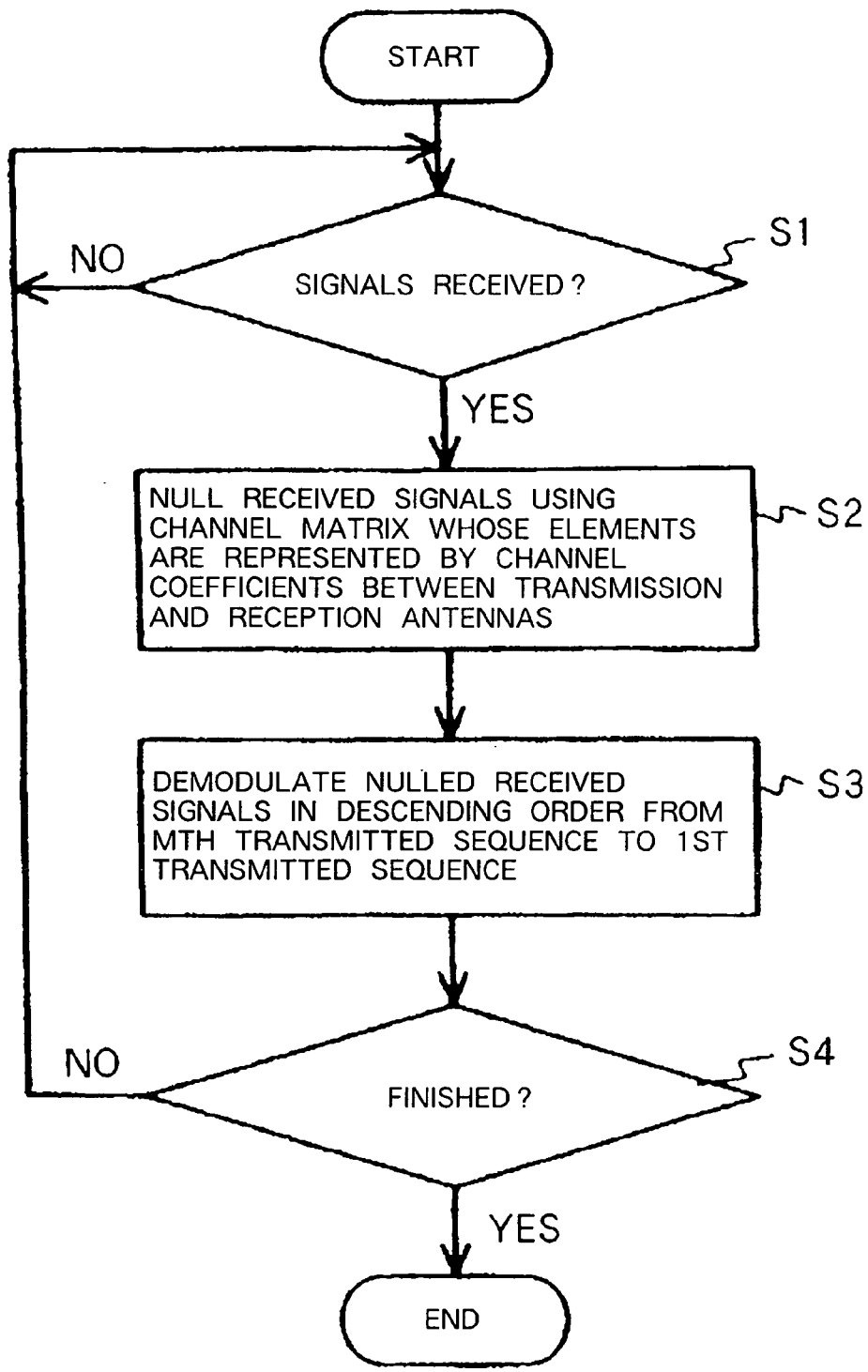
FIG. 2 is a flowchart of a demodulating process performed by a receiving apparatus shown in FIG. 1.

FIG. 2 is a flowchart of a demodulating process performed by receiving apparatus 1 shown in FIG. 1. The demodulating process performed by receiving apparatus 1 according to the embodiment of the present invention will be described below with reference to FIGS. 1 and 2. The process shown in FIG. 2 is performed when receiving apparatus 1 executes a program (a program executable by a computer) stored in recording medium 1.

When receiving apparatus 1 receives transmitted signals from transmission antennas 21-1-21-M of transmitting apparatus 21 (step S1 in FIG. 2), nulling device 100 nulls received signals using a channel matrix whose elements are represented by channel coefficients between the transmission/reception antennas (step S2 in FIG. 2).

Transmitted sequence estimator 15 demodulates the received signals that have been nulled by nulling device 10 in a descending order into Mth through 1st transmitted sequences (step S3 in FIG. 2). Receiving apparatus 1 repeats the above sequence until the process is ended (step S4 in FIG. 2).

The nulling process performed by nulling device 10 will be described below. When the signals from transmitting apparatus 2 are received by N reception antennas 11-1-11-N of receiving apparatus 1, received signal vector r whose elements are represented by the signals received by respective reception antennas 11-1-11-N can be expressed by:

$$r = (r_1, \ldots, r_N)$$

where $r_1$ represents the received signal received by first reception antenna 11-1, and $r_N$ the received signal received by Nth reception antenna 11-N.

If channel coefficients between transmission antennas 21-j and reception antennas 11-i are represented by $h_{ij}$, and a channel matrix whose elements are represented by channel coefficients $h_{ij}$, then received signal vector r is described as:

$$r = \begin{bmatrix} r_1 \\ r_2 \\ \vdots \\ r_N \end{bmatrix}$$ [Equation 1]

$$= \begin{bmatrix} r_{11} & r_{12} & \vdots & r_{1M} \\ r_{21} & r_{22} & \vdots & r_{2M} \\ \vdots & \vdots & \ddots & \vdots \\ r_{N1} & r_{N2} & \vdots & r_{NM} \end{bmatrix} \begin{bmatrix} s_1 \\ s_2 \\ \vdots \\ s_M \end{bmatrix} + \begin{bmatrix} n_1 \\ n_2 \\ \vdots \\ n_N \end{bmatrix}$$

$$= Hs + n$$

where s represents a transmitted signal vector whose elements are represented by the signals transmitted from respective transmission antennas 21-1-21-M, and n a Gaussian noise vector whose elements are represented by Gaussian noises added by respective reception antennas 11-1-11-N.

Nulling device 10 generates nulling signal z using nulling matrix A. Nulling signal z can be expressed as:

$$Z = Ar = AHs + An$$

The nulling represents orthogonalization of received signals. If $s_M, s_M + s_{M-1}, s_M + s_{M-1} + s_{M-2}, \ldots, s_M + s_{M-1} + \ldots + s_1$ are selected as M orthogonal axes, then nulling signal z is described as:

$$z = \begin{bmatrix} z_1 \\ z_2 \\ \vdots \\ z_M \end{bmatrix}$$ [Equation 2]

$$= Rs + n'$$

$$= \begin{bmatrix} r_{11} & r_{12} & \ldots & r_{1M} \\ 0 & r_{22} & \ldots & r_{2M} \\ 0 & 0 & \ddots & \vdots \\ 0 & 0 & 0 & r_{MM} \end{bmatrix} \begin{bmatrix} s_1 \\ s_2 \\ \vdots \\ s_M \end{bmatrix} + \begin{bmatrix} n'_1 \\ n'_2 \\ \vdots \\ n'_M \end{bmatrix}$$

As nulling matrix A, there can be used a complex transposed matrix of a Q matrix that is determined by performing QR decomposition of channel matrix H, for example, as follows:

$$H = \begin{bmatrix} h_{11} & h_{12} & \ldots & h_{1M} \\ h_{21} & \ddots & & \vdots \\ \vdots & & \ddots & \vdots \\ h_{N1} & \ldots & \ldots & h_{NM} \end{bmatrix}$$ [Equation 3]

$$= \begin{bmatrix} q_{11} & q_{12} & \ldots & q_{1M} \\ q_{21} & \ddots & & \vdots \\ \vdots & & \ddots & \vdots \\ q_{N1} & \ldots & \ldots & q_{NM} \end{bmatrix}$$

$$= \begin{bmatrix} r_{11} & r_{12} & \ldots & r_{1M} \\ r_0 & r_{22} & \ldots & r_{2M} \\ \vdots & \ddots & \ddots & \vdots \\ 0 & \ldots & 0 & r_{MM} \end{bmatrix}$$

$$= QR$$

In this case, the nulling process is described as follows:

$$Z = Q^H y$$
$$= Q^H (Hs + n)$$
$$= Q^H (QRs + n)$$
$$= Q^H QRs + Q^H n$$
$$= Rs + n'$$

Generally, the Q matrix satisfies $Q^H Q = I$ (I is a unit matrix).

Transmitted sequence estimator 15 prepares symbol candidates in a descending order from $s_M$ to $s_1$, and estimates and outputs a transmitted signal vector $s_1, s_2, \ldots, s_M$. In this manner, M signals that are simultaneously transmitted from transmitting apparatus 2 which has M transmission antennas 21-1-21-M can be demodulated. According to the embodiment of the present invention, therefore, signals can be demodulated with a much simpler arrangement than heretofore, by using an appropriate number of sequences.

Embodiment 1

Figure 3:
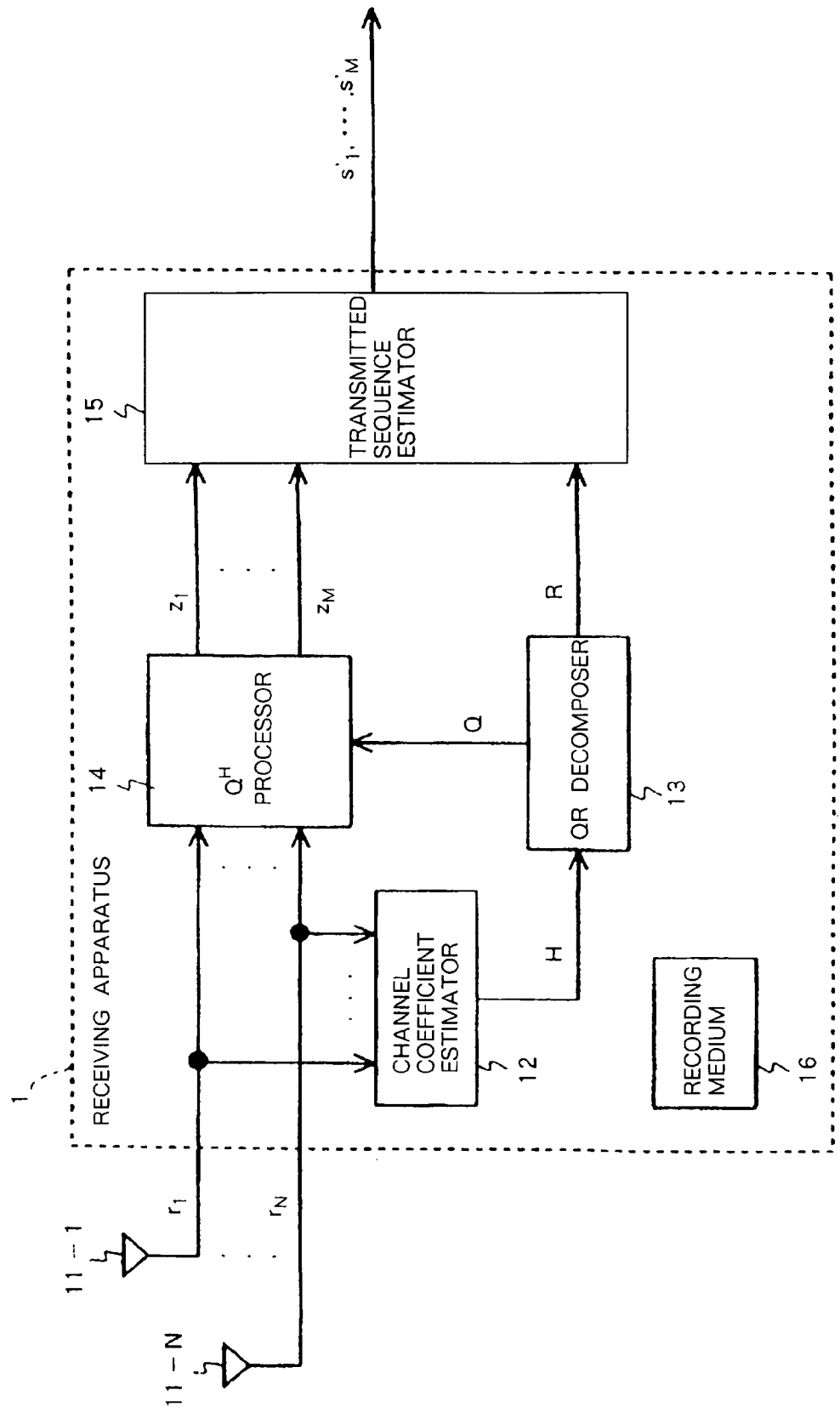
FIG. 3 is a block diagram of a receiving apparatus according to a first embodiment of the present invention.

FIG. 3 is a block diagram of a receiving apparatus according to a first embodiment of the present invention. The arrangement of a wireless communication system according to the first embodiment of the present invention is similar to the arrangement of the wireless communication system according to the embodiment of the present invention shown in FIG. 1. In FIG. 3, receiving apparatus 1 according to the first embodiment of the present invention receives signals which have been sent from M (M is an integer of 2 or greater) transmission antennas 21-1-21-M, with N (N is an integer of 2 or greater) reception antennas 11-1-11-N.

Receiving apparatus 1 comprises N reception antennas 11-1-11-N, channel coefficient estimator 12, QR decomposer 13, $Q^H$ processor 14, transmitted sequence estimator 15, and recording medium 16 for storing a program (a program executable by a computer) for realizing processes in various parts of receiving apparatus 1. Channel coefficient estimator 12, QR decomposer 13, and $Q^H$ processor 14 correspond to nulling device 10 described above. Specifically, according to the present embodiment, a QR decomposing process is carried out as the nulling process.

Reception antenna 11-1 receives a signal. Channel coefficient estimator 12 is supplied with received signals as its inputs and estimates channel coefficients. QR decomposer 13 is supplied with a matrix of channel coefficients as its input, performs QR decomposition on the channel matrix, and outputs a Q matrix and an R matrix.

$Q^H$ processor 14 is supplied with the Q matrix and the received signals as its inputs and outputs a converted sequence that is produced by multiplying the received signals by the complex conjugate transposed matrix of the Q matrix. Transmitted sequence estimator 15 is supplied with the converted sequence and the R matrix as its inputs and estimates and outputs transmitted sequences.

Depending on the arrangement of the overall receiver, transmitted sequence estimator 15 is capable of outputting a likelihood for the transmitted signal sequence or a likelihood for bits that have been transmitted by the transmitted signal sequence. The received signal vector r whose elements are represented by the signals received by respective reception antennas 11-1-11-N has been described above.

The Q matrix that is output from QR decomposer 13 is a unitary matrix of N rows and M columns, and satisfies $Q^H Q = I$ where H represents a conjugate complex transposition and I a unit matrix. The R matrix comprises an upper triangular matrix of M rows and M columns.

A processing operation performed by $Q^H$ processor 14 is described as follows:

$$z = \begin{bmatrix} z_1 \\ z_2 \\ \vdots \\ z_M \end{bmatrix} \quad \text{[Equation 4]}$$

$$= Q^H r$$

$$= Q^H (Hs + n)$$

$$= Q^H (QRs + n)$$

$$= Rs + Q^H n$$

$$= \begin{bmatrix} r_{11} & r_{12} & \cdots & r_{1M} \\ 0 & r_{22} & \cdots & r_{2M} \\ 0 & 0 & \ddots & \vdots \\ 0 & 0 & 0 & r_{MM} \end{bmatrix} \begin{bmatrix} s_1 \\ s_2 \\ \vdots \\ s_M \end{bmatrix} + \begin{bmatrix} n'_1 \\ n'_2 \\ \vdots \\ n'_M \end{bmatrix}$$

Transmitted sequence estimator 15 is supplied with converted signal vector z and the R matrix as its inputs, estimates transmitted sequences, and outputs a transmitted signal sequence $s'_1, \ldots, s'_M$ having a maximum likelihood. In this manner, M signals that are simultaneously transmitted from transmitting apparatus 2 which has M transmission antennas 21-1-21-M can be demodulated.

According to the present embodiment, as described above, a channel matrix as QR-decomposed is used, and pseudo received signals generated from a plurality of likely sequences and actually received signals are used to estimate transmitted sequences. Using a suitable number of sequences, signals can be demodulated with a much simpler arrangement than heretofore.

Embodiment 2

Figure 4:
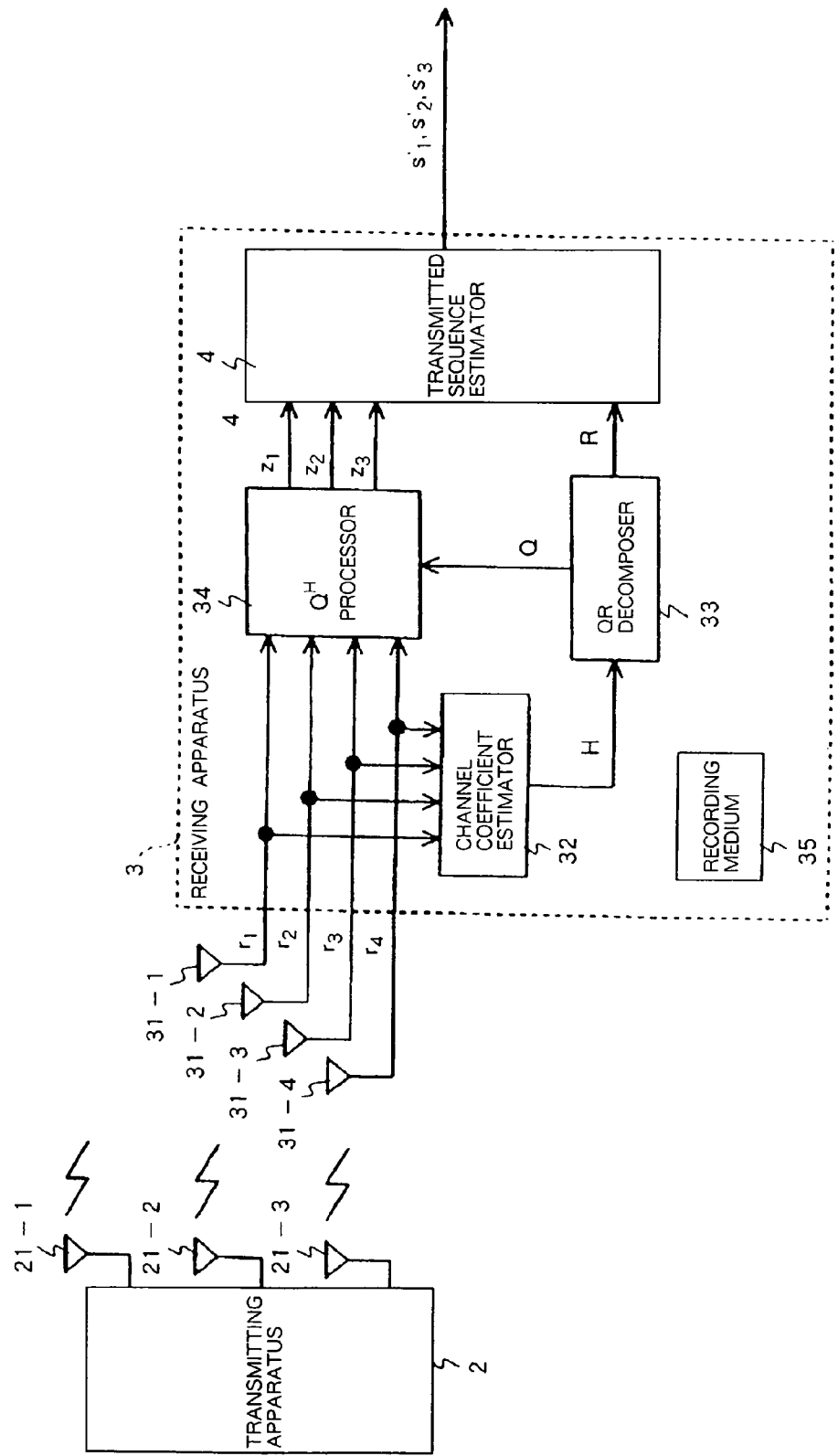
FIG. 4 is a block diagram of a receiving apparatus according to a second embodiment of the present invention.
Figure 5:
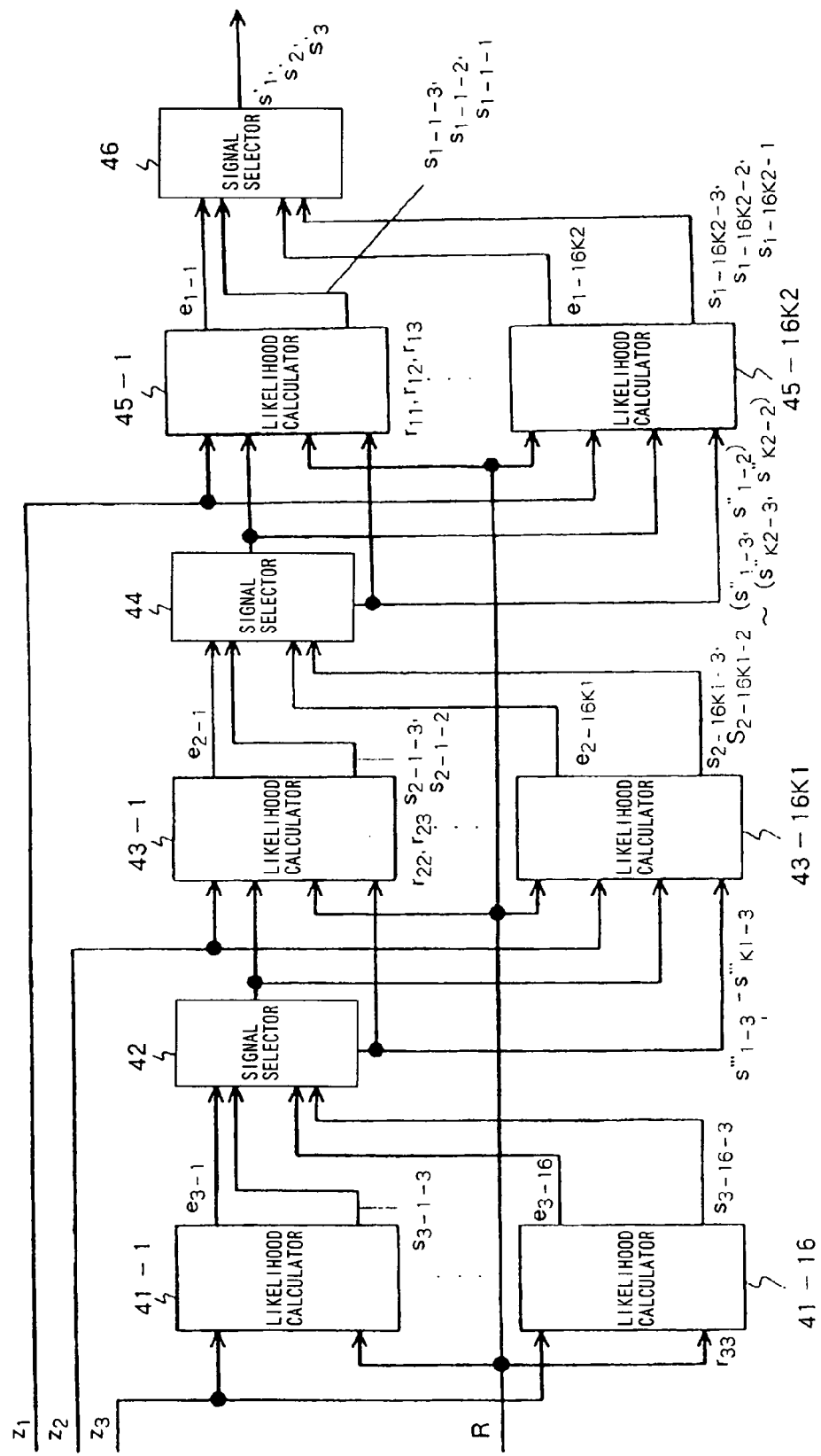
FIG. 5 is a block diagram of a transmitted sequence estimator shown in FIG. 4.
Figure 6:
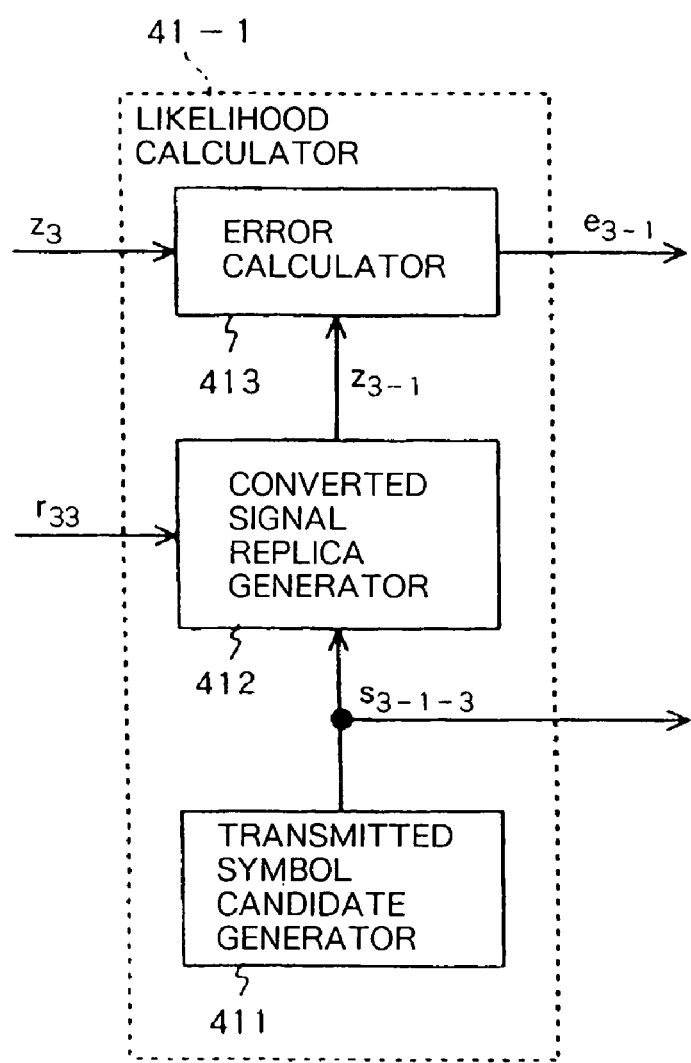
FIG. 6 is a block diagram of a third-stage likelihood calculator shown in FIG. 5.
Figure 7:
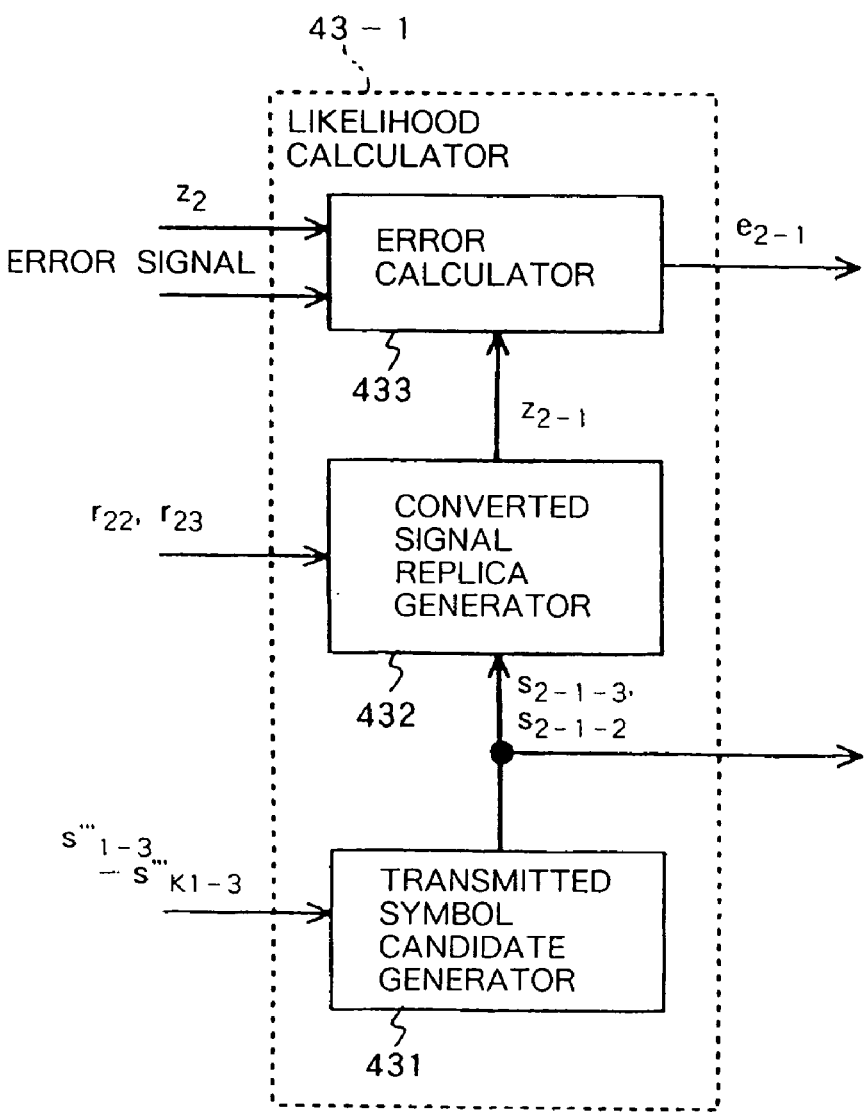
FIG. 7 is a block diagram of a second-stage likelihood calculator shown in FIG. 5.
Figure 8:
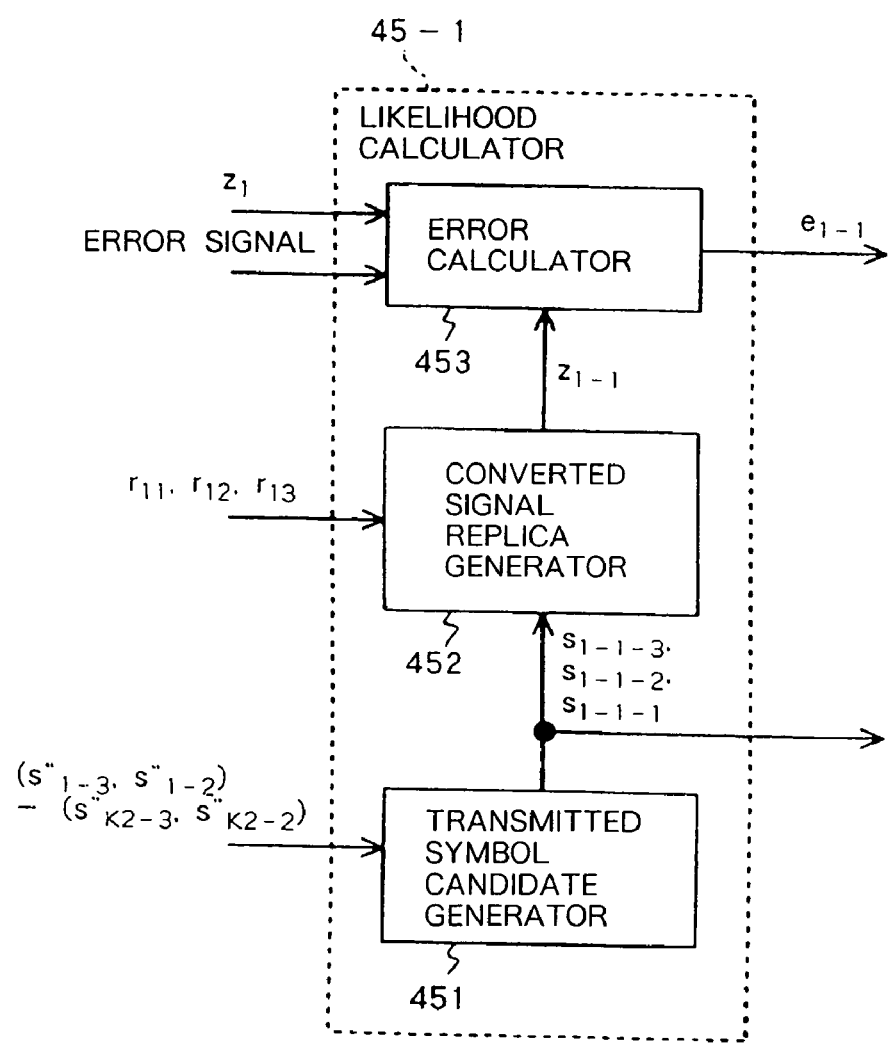
FIG. 8 is a block diagram of a first-stage likelihood calculator shown in FIG. 5.

FIG. 4 is a block diagram of a receiving apparatus according to a second embodiment of the present invention, FIG. 5 is a block diagram of a transmitted sequence estimator shown in FIG. 4, FIG. 6 is a block diagram of a third-stage likelihood calculator shown in FIG. 5, FIG. 7 is a block diagram of a second-stage likelihood calculator shown in FIG. 5, and FIG. 8 is a block diagram of a first-stage likelihood calculator shown in FIG. 5. The arrangement of a wireless communication system according to the second embodiment of the present invention is the same as the arrangement of the wireless communication system according to the embodiment shown in FIG. 1 above, except that receiving apparatus 3 is provided instead of receiving apparatus 1.

In FIG. 4, receiving apparatus 3 according to the second embodiment receives signals transmitted from transmitting apparatus 2 having three transmission antennas 21-1-21-3, with four reception antennas 31-1-31-4. It is assumed that either one of 16-valued signals $c_1$-$c_{16}$ is transmitted from each of transmission antennas 21-1-21-3.

Receiving apparatus 3 comprises four reception antennas 31-1-31-4, channel coefficient estimator 32, QR decomposer 33, $Q^H$ processor 34, transmitted sequence estimator 4, and recording medium 35 for storing a program (a program executable by a computer) for realizing processes in various parts of receiving apparatus 3.

Reception antennas 31-1-31-4 receive respective signals. Channel coefficient estimator 32 is supplied with received signals $r_1$-$r_4$ as its inputs, estimates channel coefficients, and outputs channel matrix H of the estimated channel coefficients. QR decomposer 33 is supplied with channel matrix H as its inputs, performs QR decomposition on channel matrix H, and outputs a Q matrix and an R matrix.

$Q^H$ processor 34 is supplied with the Q matrix and received signals $r_1$-$r_4$ as its inputs, multiplies received signals $r_1$-$r_4$ by the complex conjugate transposed matrix of the Q matrix, and outputs converted sequence z. Transmitted sequence estimator 4 is supplied with converted sequence z and the R matrix as its inputs and estimates and outputs signals transmitted from respective transmission antennas 21-1-21-3.

As shown in FIG. 5, transmitted sequence estimator 4 comprises three-stage likelihood calculator groups of likelihood calculators 41-1-41-16, 43-1-43-16K1, 45-1-45-16K2, and three-stage signal selectors 42, 44, 46. Transmitted sequence estimator 4 performs signal processing in the order of the third stage, the second stage, and the first stage. According to the present embodiment, if signals transmitted from respective transmission antennas 21-1-21-3 are 16-valued, then the likelihood calculator group in the third stage is made up of 16 likelihood calculators 41-1-41-16. Likelihood calculators 41-1-41-16 are supplied with converted signal $z_3$ and element $r_{33}$ of the R matrix as its inputs and outputs an error signal group of error signals $e_{3-1}$-$e_{3-16}$ and a transmitted symbol candidate group of transmitted symbol candidates $s_{3-1-3}$-$s_{3-16-3}$.

As shown in FIG. 6, first likelihood calculator 41-1 in the third stage comprises transmitted symbol candidate generator 411, converted signal replica generator 412, and error calculator 413. Other likelihood calculators 41-2-41-16 are identical in structure to likelihood calculator 41-1.

In likelihood calculator 41-1, transmitted symbol candidate generator 411 generates and outputs transmitted symbol candidate $s_{3-1-3}$ which comprises a symbol of either one of signals $c_1$-$c_{16}$. Converted signal replica generator 412 is supplied with element $r_{33}$ of the R matrix and transmitted symbol candidate $s_{3-1-3}$ as its inputs, and generates and outputs converted signal replica $z_{3-1}$.

Error calculator 413 is supplied with converted signal $z_3$ and converted signal replica $z_{3-1}$ as its inputs, calculates an error between the two signals, and outputs error signal $e_{3-1}$. Converted signal replica $z_{3-1}$ is calculated according to the equation:

$$z_{3-1} = r_{33} s_{3-1-3}$$

and error signal $e_{3-1}$ is calculated according to the equation:

$$e_{3-1}=|z_3-z_{3-1}|^2$$

First likelihood calculator 41-1 outputs error signal $e_{3-1}$ and transmitted symbol candidate $s_{3-1-3}$. Similarly, second likelihood calculator 41-2 outputs error signal $e_{3-2}$ and transmitted symbol candidate $s_{3-2-3}$. 16th likelihood calculator 41-16 outputs error signal $e_{3-16}$ and transmitted symbol candidate $s_{3-16-3}$.

Signal selector 42 in the third stage is supplied with the error signal group and the transmitted symbol candidate group which have been calculated by 16 likelihood calculators 41-1-41-16 in the third stage, as its inputs and outputs K1 error signals $e'''_1$-$e'''_{K1}$ of a smallest error and K1 transmitted symbol candidates $s'''_{1-3}$-$s'''_{K1-3}$ which give the error. The K1 transmitted symbol candidates that are output are either one of signals $c_1$-$c_{16}$.

The likelihood calculator group in the second stage is made up of 16K1 likelihood calculators 43-1-43-16K1. First through 16th likelihood calculators 43-1-43-16 are supplied with converted signal $z_2$, elements $r_{22}$, $r_{23}$ of the R matrix, error signal $e'''_1$, and transmitted symbol candidate $s'''_{1-3}$ as its inputs. 17th through 32nd likelihood calculators 43-17-43-32 are supplied with converted signal $z_2$, elements $r_{22}$, $r_{23}$ of the R matrix, error signal $e'''_2$, and transmitted symbol candidate $s'''_{2-3}$ as its inputs. {16(K1-1)+1}th through 16K1th likelihood calculators 43-16(K1-1)+1-43-16K1 are supplied with converted signal $z_2$, elements $r_{22}$, $r_{23}$ of the R matrix, error signal $e'''_{K1}$, and transmitted symbol candidate $s'''_{K1-3}$ as their inputs.

As shown in FIG. 7, first likelihood calculator 43-1 in the second stage comprises transmitted symbol candidate generator 431, converted signal replica generator 432, and error calculator 433. Other likelihood calculators 43-2-43-16K1 are identical in structure to likelihood calculator 43-1.

In likelihood calculator 43-1, transmitted symbol candidate generator 431 is supplied with transmitted symbol candidate $s'''_1$ as its input and outputs transmitted symbol candidates $s_{2-1-3}$, $s_{2-1-2}$ which comprise a symbol of either one of signals $c_1$-$c_{16}$. Converted signal replica generator 432 is supplied with elements $r_{22}$, $r_{23}$ of the R matrix and transmitted symbol candidates $s_{2-1-3}$, $s_{2-1-2}$ as its inputs and outputs converted signal replica $z_{2-1}$.

Error calculator 433 is supplied with converted signal $z_2$, converted signal replica $z_{2-1}$, and error signal $e'''_1$ as its inputs and outputs error signal $e_{2-1}$. Converted signal replica $z_{2-1}$ is calculated according to the equation:

$$z_{2-1}=r_{22}s_{2-1-2}+r_{23}s_{2-1-3}$$

and error signal $e_{2-1}$ is calculated according to the equation:

$$e_{2-1}=|z_2-z_{2-1}|^2+e'''_1$$

First likelihood calculator 43-1 outputs error signal $e_{2-1}$ and transmitted symbol candidates $s_{2-1-3}$, $s_{2-1-2}$. Similarly, second likelihood calculator 43-2 outputs error signal $e_{2-2}$ and transmitted symbol candidates $s_{2-2-3}$, $s_{2-2-2}$.

In 17th likelihood calculator 43-17, transmitted symbol candidate generator 431 is supplied with transmitted symbol candidate $s'''_{2-3}$ as its input and outputs transmitted symbol candidates $s_{2-17-3}$, $s_{2-17-2}$ which comprise a symbol of either one of signals $c_1$-$c_{16}$. Converted signal replica generator 432 is supplied with elements $r_{22}$, $r_{23}$ of the R matrix and transmitted symbol candidates $s_{2-17-3}$, $s_{2-17-2}$ as its inputs and outputs converted signal replica $z_{2-17}$.

Error calculator 433 is supplied with converted signal $z_2$, converted signal replica $z_{2-17}$, and error signal $e'''_2$ as its inputs and outputs error signal $e_{2-17}$. Converted signal replica $z_{2-17}$ is calculated according to the equation:

$$z_{2-17}=r_{22}s_{2-17-2}+r_{23}s_{2-17-3}$$

and error signal $e_{2-17}$ is calculated according to the equation:

$$e_{2-17}=|z_2-z_{2-17}|^2+e'''_{17}$$

16K1th likelihood calculator 43-16K1 outputs error signal $e_{2-16K1}$ and transmitted symbol candidates $s_{2-16K1-3}$, $s_{2-16K1-2}$.

Signal selector 44 in the second stage is supplied with the error signals and the transmitted symbol candidates which have been calculated by 16K1 likelihood calculators 43-1-43-16K1 in the second stage, as its inputs and outputs K2 error signals $e''_1$-$e''_{K2}$ of a smallest error and K2 transmitted symbol candidate sets $(s''_{1-3}, s''_{1-2})$-$(s''_{K2-3}, s''_{K2-2})$ which give the error.

The likelihood calculator group in the first stage is made up of 16K2 likelihood calculators 45-1-45-16K2. First through 16th likelihood calculators 45-1-45-16 are supplied with converted signal $z_1$, elements $r_{11}$, $r_{12}$, $r_{13}$ of the R matrix, error signal $e''_1$, and symbol candidate set $(s''_{1-3}, s''_{1-2})$ as its inputs.

17th through 32nd likelihood calculators 45-17-45-32 are supplied with converted signal $z_1$, elements $r_{11}$, $r_{12}$, $r_{13}$ of the R matrix, error signal $e''_2$, and transmitted symbol candidate set $(s''_{2-3}, s''_{2-2})$ as its inputs.

{16(K2-1)+1}th through 16K2nd likelihood calculators 45-16(K2-1)+1-45-16K2 are supplied with converted signal $z_1$, elements $r_{11}$, $r_{12}$, $r_{13}$ of the R matrix, error signal $e''_{K2}$, and transmitted symbol candidate set $(s''_{K2-3}, s''_{K2-2})$ as its inputs.

As shown in FIG. 8, first likelihood calculator 45-1 in the first stage comprises transmitted symbol candidate generator 451, converted signal replica generator 452, and error calculator 453. Other likelihood calculators 45-2-45-16K1 are identical in structure to likelihood calculator 45-1.

In likelihood calculator 45-1, transmitted symbol candidate generator 451 is supplied with transmitted symbol candidate set $(s''_{1-3}, s''_{1-2})$ as its input and outputs transmitted symbol candidates $s_{1-1-3}$, $s_{1-1-2}$, $s_{1-1-1}$ which comprise a symbol of either one of 16-valued signals $c_1$-$c_{16}$. Converted signal replica generator 452 is supplied with elements $r_{11}$, $r_{12}$, $r_{13}$ of the R matrix and transmitted symbol candidates $s_{1-1-3}$, $s_{1-1-2}$, $s_{1-1-1}$ as its inputs and outputs converted signal replica $z_{1-1}$.

Error calculator 453 is supplied with converted signal $z_1$, converted signal replica $z_{1-1}$, and error signal $e''_1$ as its inputs and outputs error signal $e_{1-1}$. Converted signal replica $z_{1-1}$ is calculated according to the equation:

$$z_{1-1}=r_{11}s_{1-1-1}+r_{12}s_{1-1-2}+r_{13}s_{1-1-3}$$

and error signal $e_{1-1}$ is calculated according to the equation:

$$e_{1-1}=|z_1-z_{1-1}|^2+e''_1$$

First likelihood calculator 45-1 outputs error signal $e_{1-1}$ and transmitted symbol candidates $s_{1-1-3}$, $s_{1-1-2}$, $s_{1-1-1}$. Similarly, second likelihood calculator 45-2 outputs error signal $e_{1-2}$ and transmitted symbol candidates $s_{1-2-3}$, $s_{1-2-2}$, $s_{1-2-1}$. 16K2th likelihood calculator 45-16K2 outputs error signal $e_{1-16K2}$ and transmitted symbol candidates $s_{1-16K2-3}$, $s_{1-16K2-2}$, $s_{1-16K2-1}$.

Signal selector 46 in the final stage (16K2th stage) is supplied with the error signals and the transmitted symbol candidates which have been calculated by 16K2 likelihood calculators 45-1-45-16K2 in the first stage, as its inputs and outputs transmitted symbol candidates $s'_1$, $s'_2$, $s'_3$ which give smallest error signal $e'_1$.

According to the present embodiment, as described above, the transmitted symbol candidates that are input to the signal selectors in the respective stages include 16 transmitted symbol candidates from likelihood calculators 41-1-41-16 in the third stage, 16K1 transmitted symbol candidates from likelihood calculators 43-1-43-16K1 in the second stage, and 16K2 transmitted symbol candidates from likelihood calculators 45-1-45-16K2 in the first stage, and hence total 16(1+K1+K2).

According to the present invention, therefore, if K1 is set to "16" and K2 to "32", for example, then the total number of transmitted symbol candidates is "784". The number of processing cycles according to the present embodiment is much smaller than a conventional process where the total number of transmitted symbol candidates is "4096".

Figure 9:
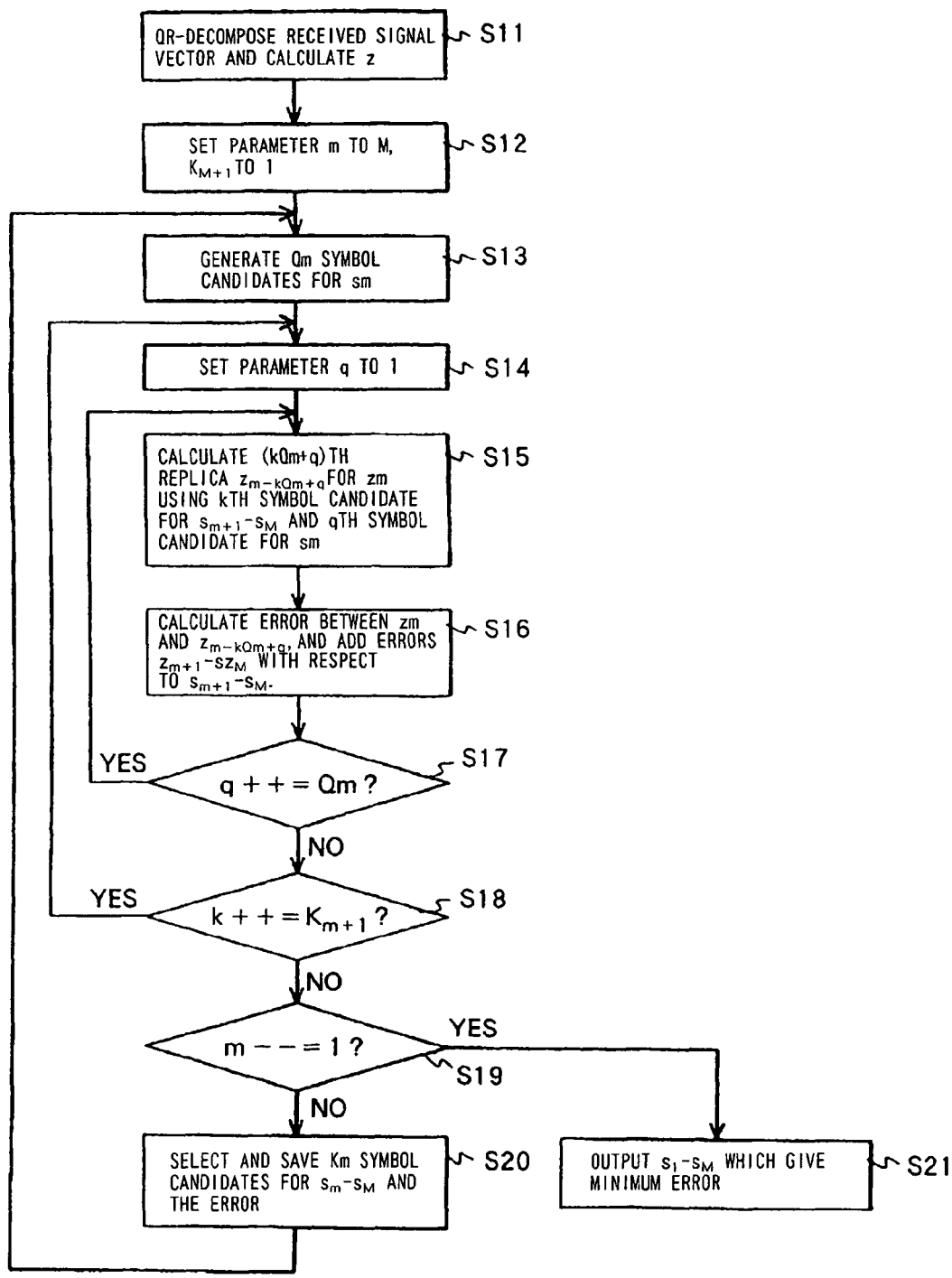
FIG. 9 is a flowchart of a demodulating process performed by the receiving apparatus according to the second embodiment of the present invention.

FIG. 9 is a flowchart of a demodulating process performed by receiving apparatus 3 according to the second embodiment of the present invention. The demodulating process of receiving apparatus 3 according to the second embodiment of the present invention will be described below with reference to FIGS. 4 through 9. The process shown in FIG. 9 is performed when a processor (CPU: central processing unit) of receiving apparatus 3 executes a program stored in recording medium 35. Though transmitting apparatus 2 has three transmission antennas 21-1-21-3 in the above description, transmitting apparatus 2 has M transmission antennas in the operation described below.

In receiving apparatus 3, QR decomposer 33 performs QR decomposition on channel matrix H. Based on QR-decomposed channel matrix H, $Q^H$ processor 34 calculates converted signal z (step S11 in FIG. 9). Transmitted sequence estimator 4 sets parameter m to M and $K_{M+1}$ to 1 (step S12 in FIG. 9), generates Qm symbol candidates for transmitted signal $s_m$ (step S13 in FIG. 9), and sets parameter q to 1 (step S14 in FIG. 9).

Transmitted sequence estimator 4 calculates (kQm+q)th replica $z_{m-kQm+q}$ for converted signal $z_m$ using a kth symbol candidate for transmitted signals $s_{m+1}$-$s_M$ and a qth symbol candidate for transmitted signal $s_m$ (step S15 in FIG. 9). Furthermore, transmitted sequence estimator 4 calculates an error between converted signal $z_m$ and replica $z_{m-kQm+q}$, and adds error $e_k$ with respect to the kth symbol candidate for transmitted signals $s_{m+1}$-$s_M$ (step S16 in FIG. 9).

If "q++=Qm" is not satisfied (step S17 in FIG. 9), if "k++=$K_{m+1}$" is not satisfied (step S18 in FIG. 9), and if "m--=1" is not satisfied (step S19 in FIG. 9), then transmitted sequence estimator 4 selects and saves Km symbol candidates for transmitted signals $s_m$-$s_M$ and the error (step S20 in FIG. 9). If "m--=1" is satisfied (step S19 in FIG. 9), then transmitted sequence estimator 4 outputs transmitted signals $s_1$-$s_M$ which give a minimum error (step S21 in FIG. 9).

Embodiment 3

Figure 10:
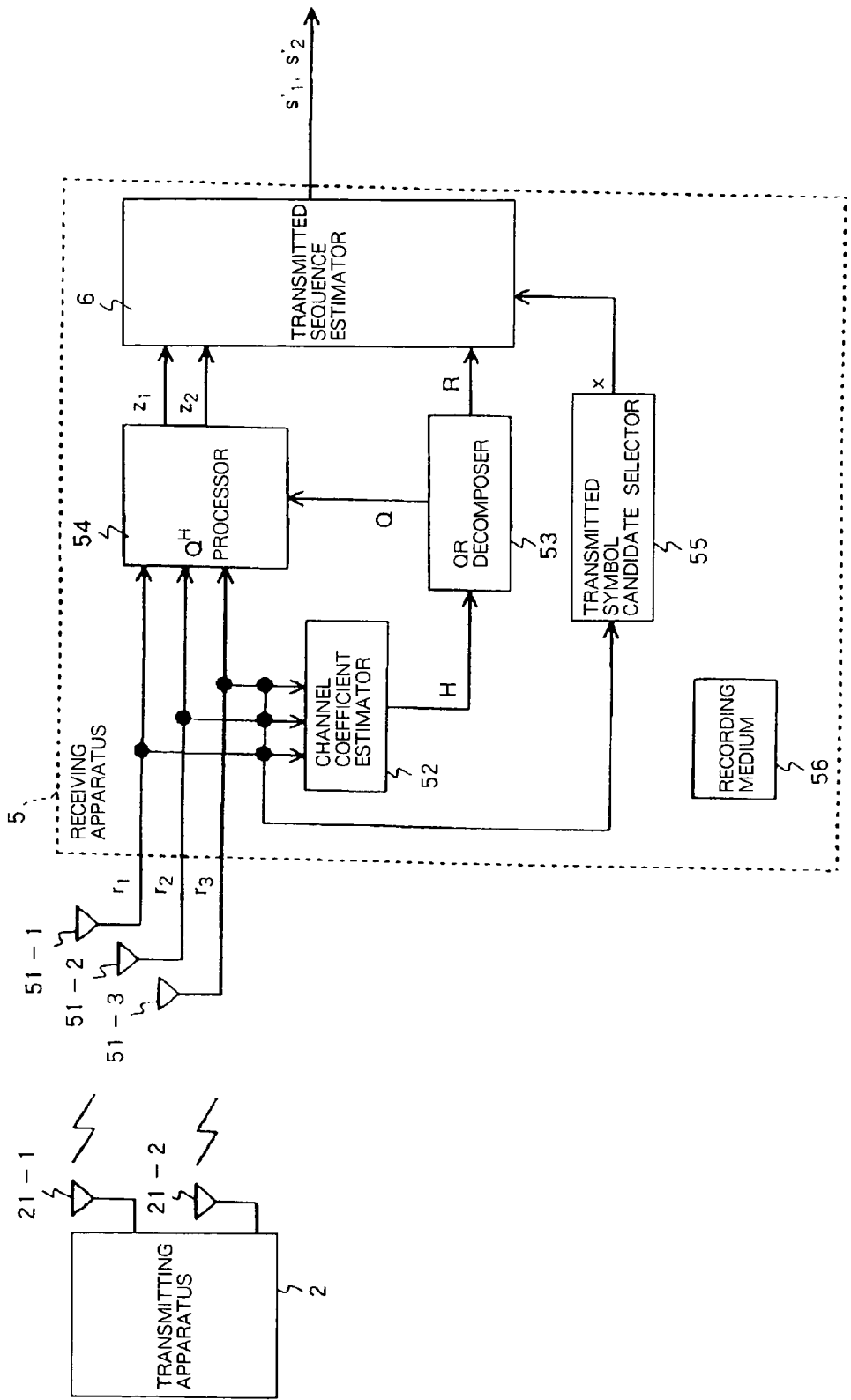
FIG. 10 is a block diagram of a receiving apparatus according to a third embodiment of the present invention.
Figure 11:
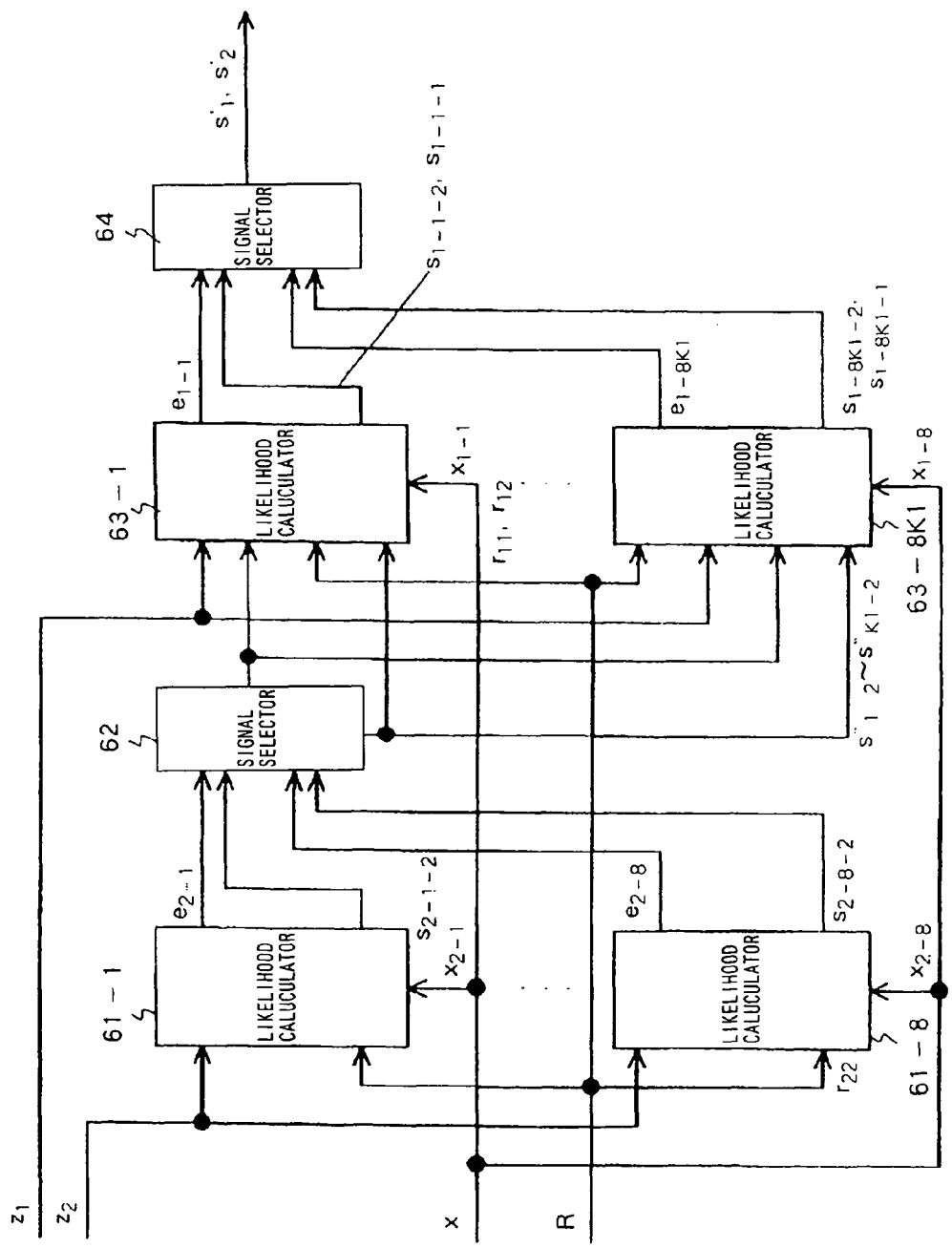
FIG. 11 is a block diagram of a transmitted sequence estimator shown in FIG. 10.
Figure 12:
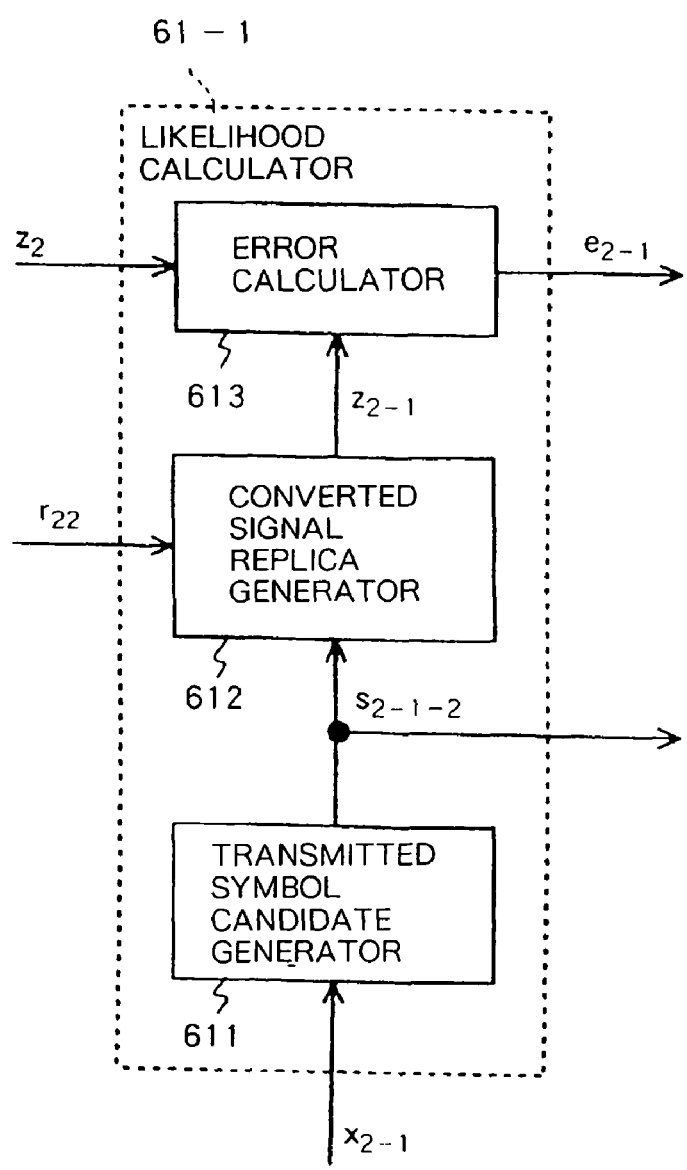
FIG. 12 is a block diagram of a second-stage likelihood calculator shown in FIG. 11.
Figure 13:
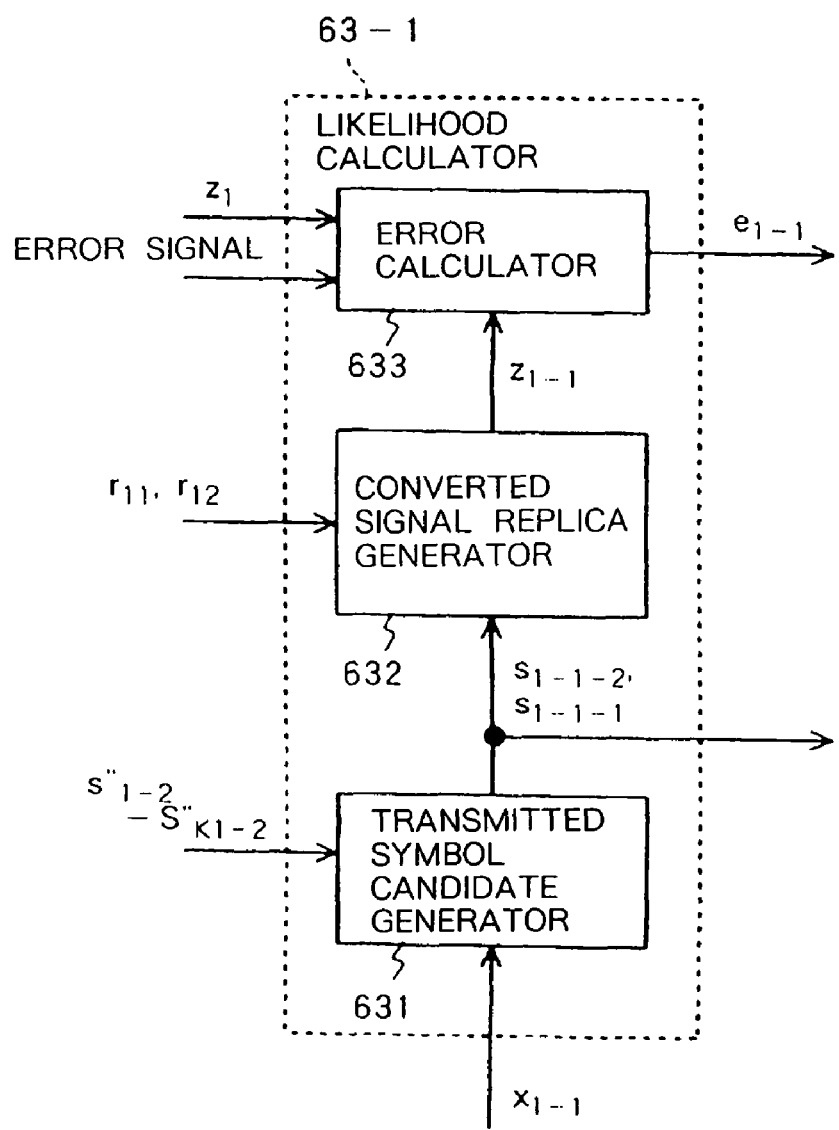
FIG. 13 is a block diagram of a first-stage likelihood calculator shown in FIG. 11.

FIG. 10 is a block diagram of a receiving apparatus according to a third embodiment of the present invention, FIG. 11 is a block diagram of a transmitted sequence estimator shown in FIG. 10, FIG. 12 is a block diagram of a second-stage likelihood calculator shown in FIG. 11, and FIG. 13 is a block diagram of a first-stage likelihood calculator shown in FIG. 11. The arrangement of a wireless communication system according to the third embodiment of the present invention is the same as the arrangement of the wireless communication system according to the embodiment shown in FIG. 1 above, except that receiving apparatus 5 is provided instead of receiving apparatus 1.

In FIG. 10, receiving apparatus 5 according to the third second embodiment receives signals transmitted from transmitting apparatus 2 having two transmission antennas 21-1, 21-2, with three reception antennas 51-1-51-3. It is assumed that either one of 16-valued signals $c_1$-$c_{16}$ is transmitted from each of transmission antennas 51-1-51-3.

Receiving apparatus 5 comprises three reception antennas 51-1-51-3, channel coefficient estimator 52, QR decomposer 53, $Q^H$ processor 54, transmitted symbol candidate selector 55, transmitted sequence estimator 6, and recording medium 56 for storing a program (a program executable by a computer) for realizing processes in various parts of receiving apparatus 5.

Reception antennas 51-1-51-3 receive respective signals. Channel coefficient estimator 52 is supplied with received signals $r_1$-$r_3$ as its inputs, estimates channel coefficients, and outputs channel matrix H of the estimated channel coefficients. QR decomposer 53 is supplied with channel matrix H as its inputs, performs QR decomposition on channel matrix H, and outputs a Q matrix and an R matrix.

$Q^H$ processor 54 is supplied with the Q matrix and received signals $r_1$-$r_3$ as its inputs, multiplies received signals $r_1$-$r_3$ by the complex conjugate transposed matrix of the Q matrix, and outputs converted sequence z. Transmitted symbol candidate selector 55 is supplied with received signals $r_1$-$r_3$ as its inputs, and selects transmitted symbol candidates for converted signal z. In the present embodiment, transmitted symbol candidate selector 55 selects eight signals as transmitted symbol candidates using an MMSE (Minimum Means Square Error) filter, for example.

Transmitted symbol candidate selector 55 has a weight vector prepared according to MMSE with respect to the signal transmitted from first transmission antenna 21-1 based on received signals $r_1$-$r_3$, and multiplies received signals $r_1$-$r_3$ by the weight vector to produce provisional demodulated signal $y_1$. Provisional demodulated signal $y_1$ is expressed as:

$$y_1 = w^H r \qquad \text{[Equation 5]}$$
$$= (w^*_{1-1} w^*_{1-2} w^*_{1-3}) \begin{bmatrix} r_1 \\ r_2 \\ r_3 \end{bmatrix}$$
$$= w^*_{1-1} r_1 + w^*_{1-2} r_2 + w^*_{1-3} r_3$$

where w represents a weight vector generated according to MMSE.

Then, squared Euclidean distances between provisional demodulated signal $y_1$ and 16-valued signals $c_1$-$c_{16}$ are calculated as follows:

Squared Euclidean distance with signal $c_i = |c_i - y_1|^2$

The obtained squared Euclidean distances are represented respectively by $q_{1-1}$-$q_{1-16}$.

Transmitted symbol candidate selector 55 selects smallest eight squared Euclidean distances among 16 squared Euclidean distances $q_{1-1}$-$q_{1-16}$, and selects eight symbols which give the error as symbol candidates for first transmission antenna 21-1. Similarly, transmitted symbol candidate selector 55 selects eight symbols for the signal transmitted from second transmission antenna 21-2.

Transmitted symbol candidate selector 55 outputs the symbol candidates obtained by the above process as symbol candidates $x_{1-1}$-$x_{1-8}$, $x_{2-1}$-$x_{2-8}$. Symbol candidate $x_{i-m}$ represents the mth transmitted symbol candidate for the signal transmitted from ith transmission antenna 21-$l$, and is either one of 16-valued signals $c_1$-$c_{16}$.

Transmitted sequence estimator 6 is supplied with converted signal z, the R matrix, and symbol candidates selected by transmitted symbol candidate selector 55 as its inputs, and estimates and outputs signals transmitted from respective transmission antennas 21-1, 21-2.

As shown in FIG. 11, transmitted sequence estimator 6 comprises two-stage likelihood calculator groups of likelihood calculators 61-1-61-8, 63-1-63-8K1, and two-stage signal selectors 62, 64. Transmitted sequence estimator 6 performs signal processing in the order of the likelihood calculator group in the second stage, signal selector 62 in the second stage, the likelihood calculator group in the first stage, and signal selector 64 in the first stage. According to the present embodiment, if transmitted symbol candidate selector 55 selects eight symbols as symbol candidates for transmission antennas 21-1, 21-2, then the likelihood calculator group in the second stage is made up of eight likelihood calculators 61-1-61-8.

First likelihood calculator 61-1 is supplied with converted signal $z_2$, element $r_{22}$ of the R matrix, and symbol candidate $x_{2-1}$ as its inputs. Second likelihood calculator 61-2 is supplied with converted signal $z_2$, element $r_{22}$ of the R matrix, and symbol candidate $x_{2-2}$ as its inputs. Eighth likelihood calculator 61-8 is supplied with converted signal $z_2$, element $r_{22}$ of the R matrix, and symbol candidate $x_{2-8}$ as its inputs.

As shown in FIG. 12, first likelihood calculator 61-1 in the second stage comprises transmitted symbol candidate generator 611, converted signal replica generator 612, and error calculator 613. Other likelihood calculators 61-2-61-8 are identical in structure to likelihood calculator 61-1.

In likelihood calculator 61-1, transmitted symbol candidate generator 611 is supplied with symbol candidate $x_{2-1}$ as its input and outputs transmitted symbol candidate $s_{2-1-2}$. Converted signal replica generator 612 is supplied with received signal vector $r_{22}$ and transmitted symbol candidate $s_{2-1-2}$ as its inputs and outputs converted signal replica $z_{2-1}$. Error calculator 613 is supplied with converted signal $z_2$ and converted signal replica $z_{2-1}$ and outputs error signal $e_{2-1}$.

Converted signal replica $z_{2-1}$ is calculated according to the equation:

$$z_{2-1} = r_{22}s_{2-1-2}$$

and error signal $e_{2-1}$ is calculated according to the equation:

$$e_{2-1} = |z_2 - z_{2-1}|^2$$

First likelihood calculator 61-1 outputs error signal $e_{2-1}$ and transmitted symbol candidate $s_{2-1-2}$. Similarly, second likelihood calculator 61-2 outputs error signal $e_{2-2}$ and transmitted symbol candidate $s_{2-2-2}$. Eighth likelihood calculator 61-8 outputs error signal $e_{2-8}$ and transmitted symbol candidate $s_{2-8-2}$.

Signal selector 62 in the second stage is supplied with the error signals and the transmitted symbol candidates which have been calculated by eight likelihood calculators 61-1-61-8 in the second stage, as its inputs and outputs K1 error signals $e''_1$-$e''_{K1}$ of a smallest error and K1 transmitted symbol candidates $s''_{1-2}$-$s''_{K1-2}$ which give the error.

The likelihood calculator group in the first stage is made up of 8K1 likelihood calculators 63-1-61-8K1. First through eighth likelihood calculators 63-1-63-8 are supplied with converted signal $z_1$, elements $r_{11}, r_{12}$ of the R matrix, and transmitted symbol candidate $s''_{1-2}$ as its inputs. First likelihood calculator 63-1 is also supplied with symbol candidate $x_{1-1}$ as its input. Second likelihood calculator 63-2 is also supplied with symbol candidate $x_{1-2}$ as its input. Eighth likelihood calculator 63-8 is also supplied with symbol candidate $x_{1-8}$ as its input.

Ninth through 16th likelihood calculators 63-9-63-16 are supplied with converted signal $z_1$, elements $r_{11}, r_{12}$ of the R matrix, error signal $e''_1$, and transmitted symbol candidate $s''_{2-2}$ as its inputs. Ninth likelihood calculator 63-9 is also supplied with symbol candidate $x_{1-1}$ as its input. Tenth likelihood calculator 63-10 is also supplied with symbol candidate $x_{1-2}$ as its input. 16th likelihood calculator 63-16 is also supplied with symbol candidate $x_{1-8}$ as its input.

{8(K1-1)+1}th through 8K1th likelihood calculators 63-8(K1-1)+1-63-8K1 are supplied with converted signal $z_1$, elements $r_{11}, r_{12}$ of the R matrix, error signal $e''_1$, and transmitted symbol candidate $s''_{K1-2}$ as their inputs. {8(K1-1)+1}th likelihood calculators 63-8(K1-1)+1 is also supplied with symbol candidate $x_{1-1}$ as its input. 8(K1-1)th+2 likelihood calculators 63-8(K1-1)+2 is also supplied with symbol candidate $x_{1-2}$ as its input. 8K1th likelihood calculators 63-8K1 is also supplied with symbol candidate $x_{1-8}$ as its input.

As shown in FIG. 13, first likelihood calculator 63-1 comprises transmitted symbol candidate generator 631, converted signal replica generator 632, and error calculator 633. Other likelihood calculators 63-2-63-8K1 are identical in structure to likelihood calculator 63-1.

In first likelihood calculator 63-1, transmitted symbol candidate generator 631 is supplied with transmitted symbol candidate $s''_{1-1}$ and symbol candidate $x_{1-1}$ as its input and outputs transmitted symbol candidates $s_{1-1-2}, s_{1-1-1}$ which are either one of 16-valued signals $c_1$ through $c_{16}$. Converted signal replica generator 632 is supplied with elements $r_{11}, r_{12}$ of the R matrix and transmitted symbol candidates $s_{1-1-2}, s_{1-1-1}$ as its inputs and outputs error signal $e_{1-1}$.

Converted signal replica $z_{1-1}$ is calculated according to the equation:

$$z_{1-1} = r_{11}s_{1-1-1} + r_{12}s_{1-1-2}$$

and error signal $e_{1-1}$ is calculated according to the equation:

$$e_{1-1} = |z_1 - z_{1-1}|^2 + e''_1$$

First likelihood calculator 63-1 outputs error signal $e_{1-1}$ and transmitted symbol candidates $s_{1-1-2}, s_{1-1-2}$. Similarly, second likelihood calculator 63-2 outputs error signal $e_{1-2}$ and transmitted symbol candidates $s_{1-2-2}, s_{1-2-1}$. 8K1th likelihood calculator 63-8K1 outputs error signal $e_{1-8K1}$ and transmitted symbol candidates $s_{1-8K1-2}, s_{1-8K1-1}$. Signal selector 62 in the first stage is supplied with the error signals and the transmitted symbol candidates which have been calculated by 8K1 likelihood calculators 63-1-63-8K1 in the first stage, as its inputs and outputs transmitted symbol candidates $s'_1, s'_2$ which give a smallest error.

According to the present embodiment, as described above, the transmitted symbol candidates that are input to the signal selectors in the respective stages include 8 transmitted symbol candidates from likelihood calculators 61-1-61-8 in the second stage, and 8K1 transmitted symbol candidates from likelihood calculators 63-1-63-8K1 in the first stage, and hence total 8(1+K1).

According to the present invention, therefore, if K1 is set to "8", for example, then the total number of transmitted symbol candidates is "72". The number of processing cycles according to the present embodiment is much smaller than a conventional process where 256 transmitted symbol candidates are required.

In the present embodiment, eight candidates are selected for a symbol transmitted from each of transmission antennas 21-1, 21-2. The number of eight candidates is given by way of example, and the same numbers of candidates may not necessarily be employed for the respective antennas. The same process of selecting transmitted symbol candidates may not necessarily be employed for transmission antennas 21-1, 21-2.

Figure 14:
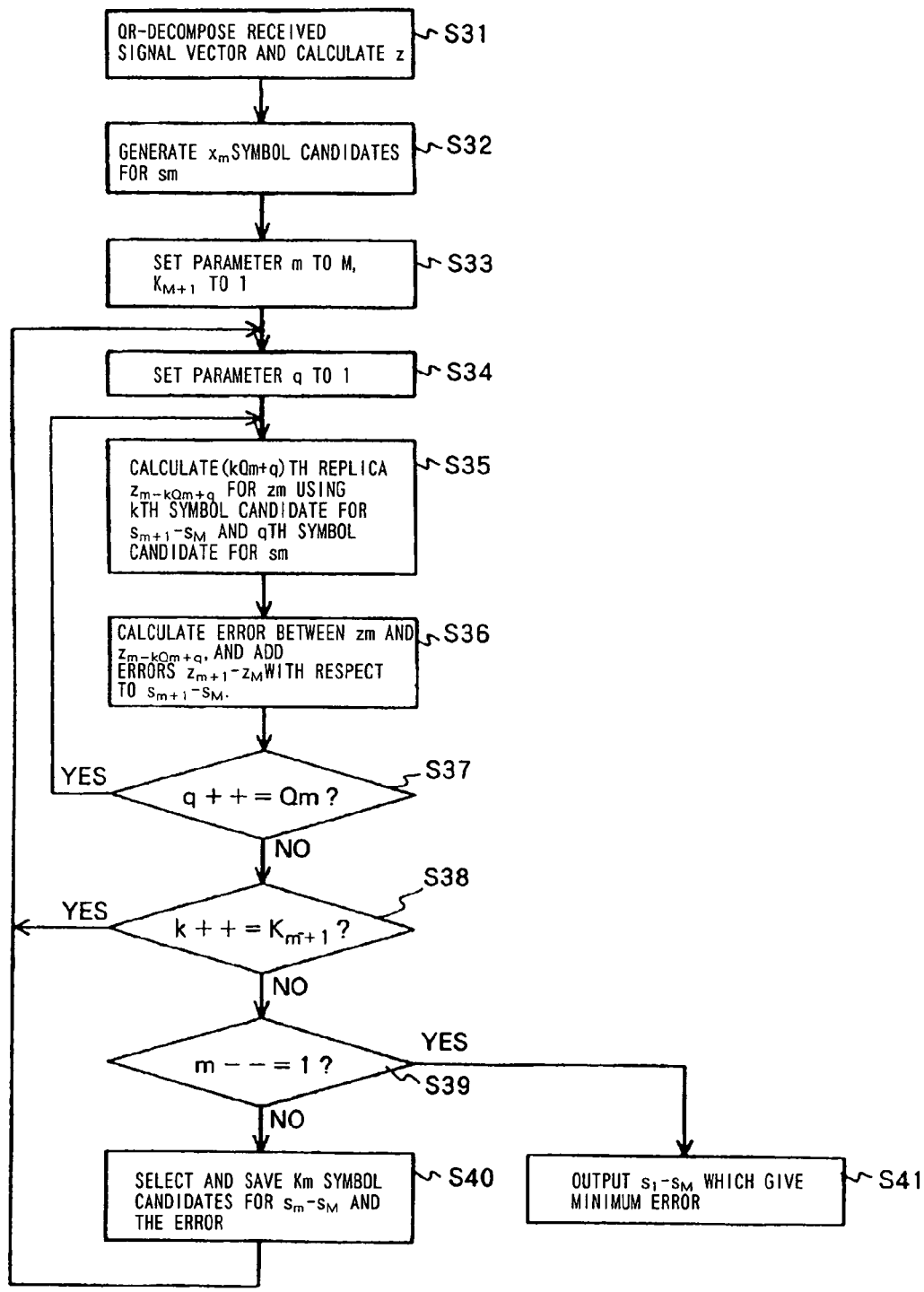
FIG. 14 is a flowchart of a demodulating process performed by the receiving apparatus according to the third embodiment of the present invention.

FIG. 14 is a flowchart of a demodulating process performed by receiving apparatus 5 according to the third embodiment of the present invention. The demodulating process of receiving apparatus 5 according to the third embodiment of the present invention will be described below with reference to FIGS. 10 through 14. The process shown in FIG. 14 is performed when a processor (CPU: central processing unit) of receiving apparatus 5 executes a program stored in recording medium 56. Though transmitting apparatus 2 has two transmission antennas 21-1, 21-2 in the above description, transmitting apparatus 2 has M transmission antennas in the operation described below.

In receiving apparatus 5, QR decomposer 53 performs QR decomposition on channel matrix H. Based on QR-decomposed channel matrix H, $Q^H$ processor 54 calculates converted signal z (step S31 in FIG. 14). Transmitted sequence estimator 6 generates $x_m$ symbol candidates for transmitted signal $s_m$ (step S32 in FIG. 14), sets parameter m to M and $K_{M+1}$ to 1 (step S33 in FIG. 14), and sets parameter q to 1 (step S34 in FIG. 14).

Transmitted sequence estimator 6 calculates (kQm+q)th replica $z_{m-kqm+q}$ for replica $z_m$ using a kth symbol candidate for transmitted signals $s_{m+1}$-$s_M$ and a qth symbol candidate for transmitted signal $s_m$ (step S35 in FIG. 14). Furthermore, transmitted sequence estimator 6 calculates an error between replica $z_m$ and replica $z_{m-kQm+q}$, and adds errors $z_{m+1}$-$z_M$ with respect to transmitted signals $s_{m+1}$-$s_M$ (step S36 in FIG. 14).

If "q++=Qm" is not satisfied (step S37 in FIG. 14), if "k++=$K_{m+1}$" is not satisfied (step S38 in FIG. 14), and if "m--=1" is not satisfied (step S39 in FIG. 14), then transmitted sequence estimator 6 selects and saves $K_m$ symbol candidates for transmitted signals $s_m$-$s_M$ and the error (step S40 in FIG. 14). If "m--=1" is satisfied (step S39 in FIG. 14), then transmitted sequence estimator 6 outputs transmitted signals $s_1$-$s_M$ which give a minimum error (step S41 in FIG. 14).

Embodiment 4

Figure 15:
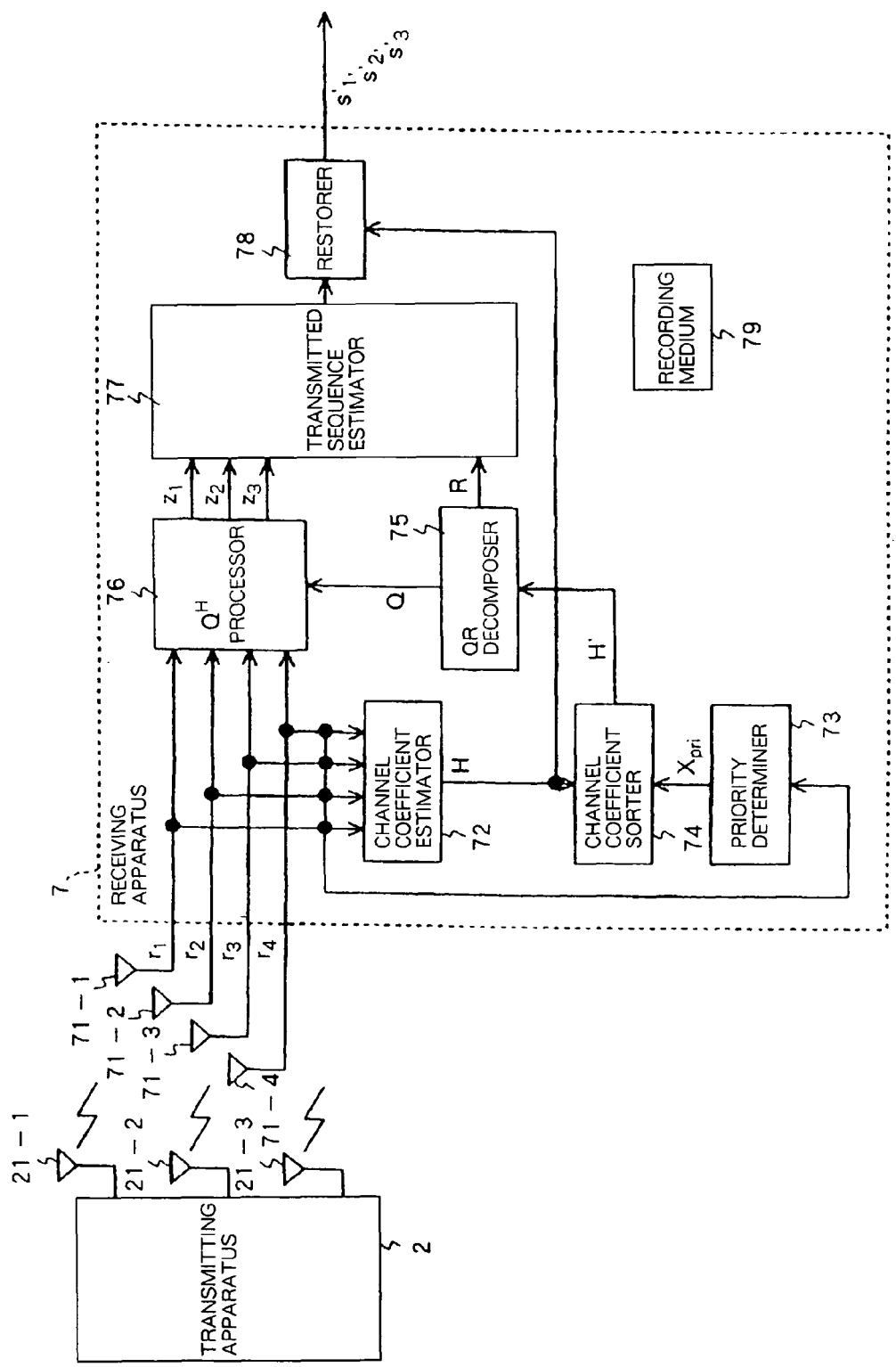
FIG. 15 is a block diagram of a receiving apparatus according to a fourth embodiment of the present invention.

FIG. 15 is a block diagram of a receiving apparatus according to a four embodiment of the present invention. The arrangement of a wireless communication system according to the fourth embodiment of the present invention is the same as the arrangement of the wireless communication system according to the embodiment shown in FIG. 1 above, except that receiving apparatus 7 is provided instead of receiving apparatus 1.

In FIG. 15, receiving apparatus 7 according to the fourth embodiment receives signals transmitted from transmitting apparatus 2 having three transmission antennas 21-1-21-3, with four reception antennas 71-1-71-4. It is assumed that 16-valued signals $c_1$-$c_{16}$ are transmitted from each of transmission antennas 21-1-21-3.

Receiving apparatus 7 comprises four reception antennas 71-1-71-4, channel coefficient estimator 72, priority determiner 73, channel coefficient sorter 74, QR decomposer 75, $Q^H$ processor 76, transmitted sequence estimator 77, restorer 78, and recording medium 79 for storing a program (a program executable by a computer) for realizing processes in various parts of receiving apparatus 3.

Reception antennas 71-1-71-4 receive respective signals. Channel coefficient estimator 72 is supplied with received signals $r_1$-$r_4$ as its inputs, estimates channel coefficients, and outputs channel matrix H of the estimated channel coefficients. Priority determiner 73 is supplied with received signals $r_1$-$r_4$ as its inputs, determines a priority between transmission antennas 21-1-21-3, and outputs a signal $X_{pri}$ representative of the determined priority.

Priority determiner 73 calculates the norms of three column vectors of channel matrix H, regards the calculated norms as electric power levels for respective transmitted sequences, and gives higher priorities to transmitted sequences with higher electric power levels. Channel coefficient sorter 74 is supplied with channel matrix H and signal $X_{pri}$ as its inputs, sorts the column vectors of channel matrix H, and outputs modified channel matrix H'.

At this time, channel coefficient sorter 74 sorts the column vectors in the ascending order of priorities. For example, channel matrix H is represented by:

$$H = \begin{bmatrix} h_{11} & h_{12} & h_{13} \\ h_{21} & h_{22} & h_{23} \\ h_{31} & h_{32} & h_{33} \\ h_{41} & h_{42} & h_{43} \end{bmatrix}$$ [Equation 6]

If higher priorities are given to transmitted sequences 2, 1, 3 in that order, then modified channel matrix H' is represented by:

$$H = \begin{bmatrix} h_{13} & h_{11} & h_{12} \\ h_{23} & h_{21} & h_{22} \\ h_{33} & h_{31} & h_{32} \\ h_{43} & h_{41} & h_{42} \end{bmatrix}$$ [Equation 7]

QR decomposer 75, $Q^H$ processor 76, and transmitted sequence estimator 77 perform QR decomposition, perform $Q^H$ processing, and estimate transmitted sequences, respectively. Transmitted sequence estimator 77 outputs a transmitted symbol sequence which gives a minimum error.

Restorer 78 is supplied with channel matrix H from channel coefficient estimator 72 and transmitted symbol sequences from transmitted sequence estimator 77 as its inputs, and sorts the transmitted symbol sequences. Restorer 78 sorts the transmitted symbol sequences in order that transmitted sequences estimated with respect to modified channel matrix H' will serve as transmitted sequences estimated with respect to channel matrix H.

Transmitted sequence estimator 77 can process sequences successively in the order from higher priorities for increased sequence estimating accuracy by estimating transmitted sequences using modified channel matrix H'.

While priorities are determined based on the received electric powers of respective transmitted sequences according to the present embodiment, priorities may be determined by measuring received electric power vs. noise electric power ratios or received electric power vs. noise electric power ratios and interference electric power ratios.

Figure 16:
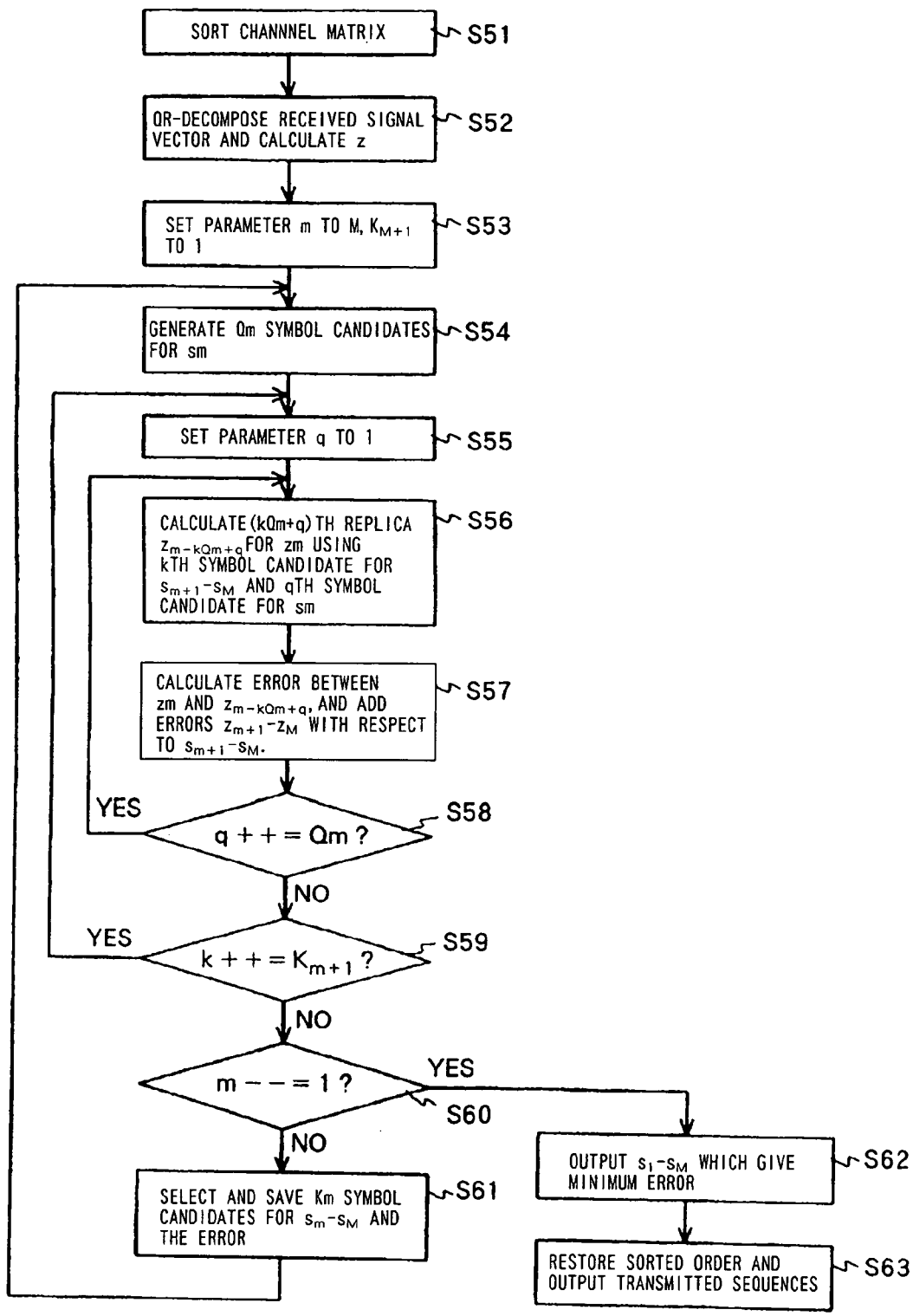
FIG. 16 is a flowchart of a demodulating process performed by the receiving apparatus according to the fourth embodiment of the present invention.

FIG. 16 is a flowchart of a demodulating process performed by receiving apparatus 7 according to the fourth embodiment of the present invention. The process shown in FIG. 16 is performed when a processor (CPU: central processing unit) of receiving apparatus 7 executes a program stored in recording medium 79. Though transmitting apparatus 2 has three transmission antennas 21-1-21-3 in the above description, transmitting apparatus 2 has M transmission antennas in the operation described below.

In receiving apparatus 7, channel coefficient sorter 74 sorts channel matrix H (step S51 in FIG. 16). Thereafter, QR decomposer 75 performs QR decomposition on channel matrix H. Based on QR-decomposed channel matrix H, $Q^H$ processor 76 calculates converted signal z (step S52 in FIG.

16). Transmitted sequence estimator 77 sets parameter m to M and $K_{M+1}$ to 1 (step S53 in FIG. 16), generates Qm symbol candidates for transmitted signal $s_m$ (step S54 in FIG. 16), and sets parameter q to 1 (step S55 in FIG. 16).

Transmitted Sequence Estimator 77

Transmitted sequence estimator 6 calculates (kQm+q)th replica $z_{m-kQm+q}$ for replica $z_m$ using a kth symbol candidate for transmitted signals $s_{m+1}$–$s_M$ and a qth symbol candidate for transmitted signal $s_m$ (step S56 in FIG. 16). Furthermore, transmitted sequence estimator 77 calculates an error between replica $z_m$ and replica $z_{m-kQm+q}$, and adds errors $z_{m+1}$–$z_M$ with respect to transmitted signals $s_{m+1}$–$s_M$ (step S57 in FIG. 16).

If "q++=Qm" is not satisfied (step S58 in FIG. 16), if "k++=$K_{m+1}$" is not satisfied (step S59 in FIG. 16), and if "m--=1" is not satisfied (step S60 in FIG. 16), then transmitted sequence estimator 77 selects and saves $K_m$ symbol candidates for transmitted signals $s_m$–$s_M$ and the error (step S61 in FIG. 16).

If "m--=1" is satisfied (step S60 in FIG. 16), then transmitted sequence estimator 77 outputs transmitted signals $s_1$–$s_M$ which give a minimum error (step S62 in FIG. 16). Restorer 78 restores the order that has been sorted, and outputs transmitted sequences estimated with respect to channel matrix H (step S63 in FIG. 16).

Embodiment 5

Figure 17:
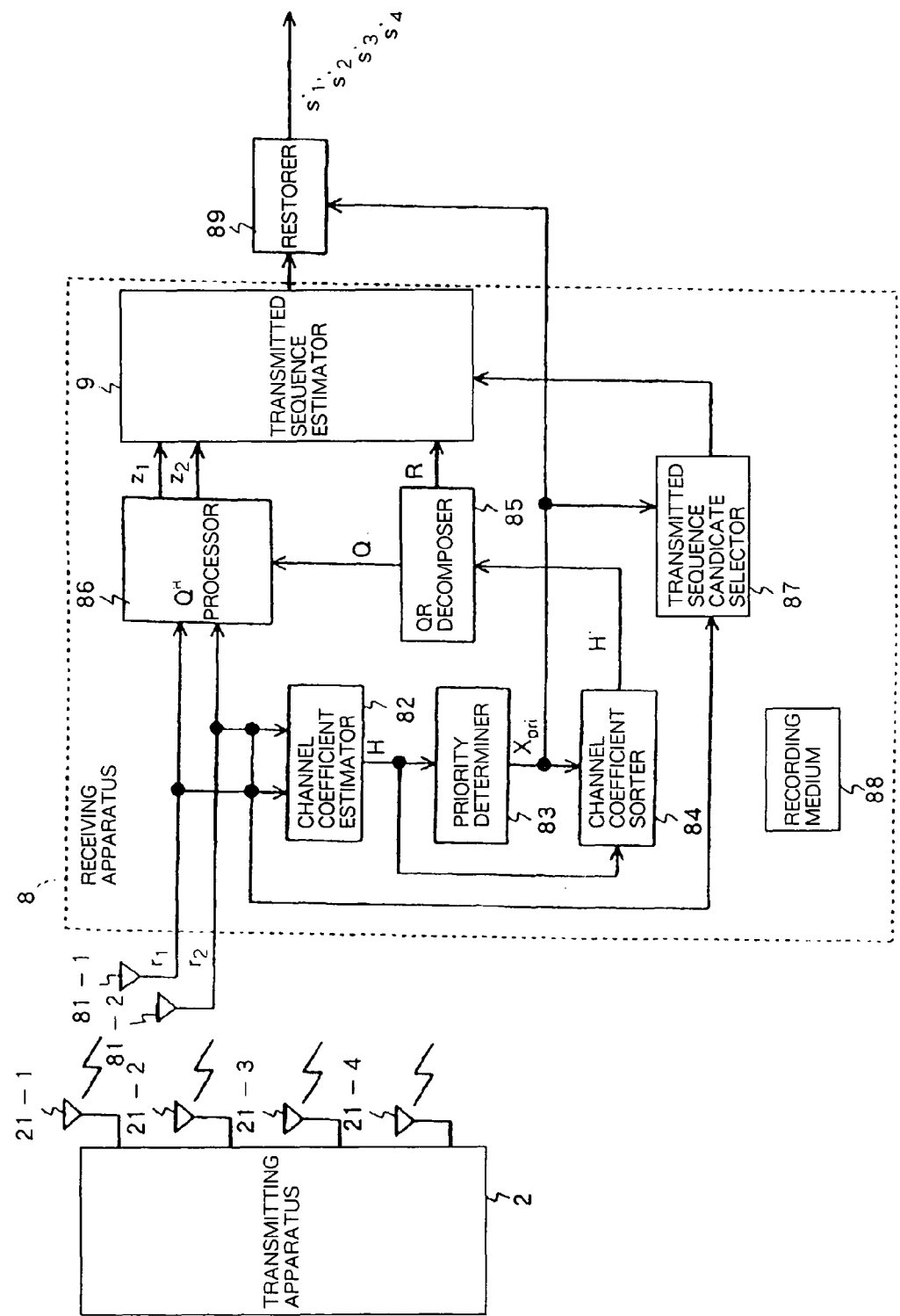
FIG. 17 is a block diagram of a receiving apparatus according to a fifth embodiment of the present invention.
Figure 18:
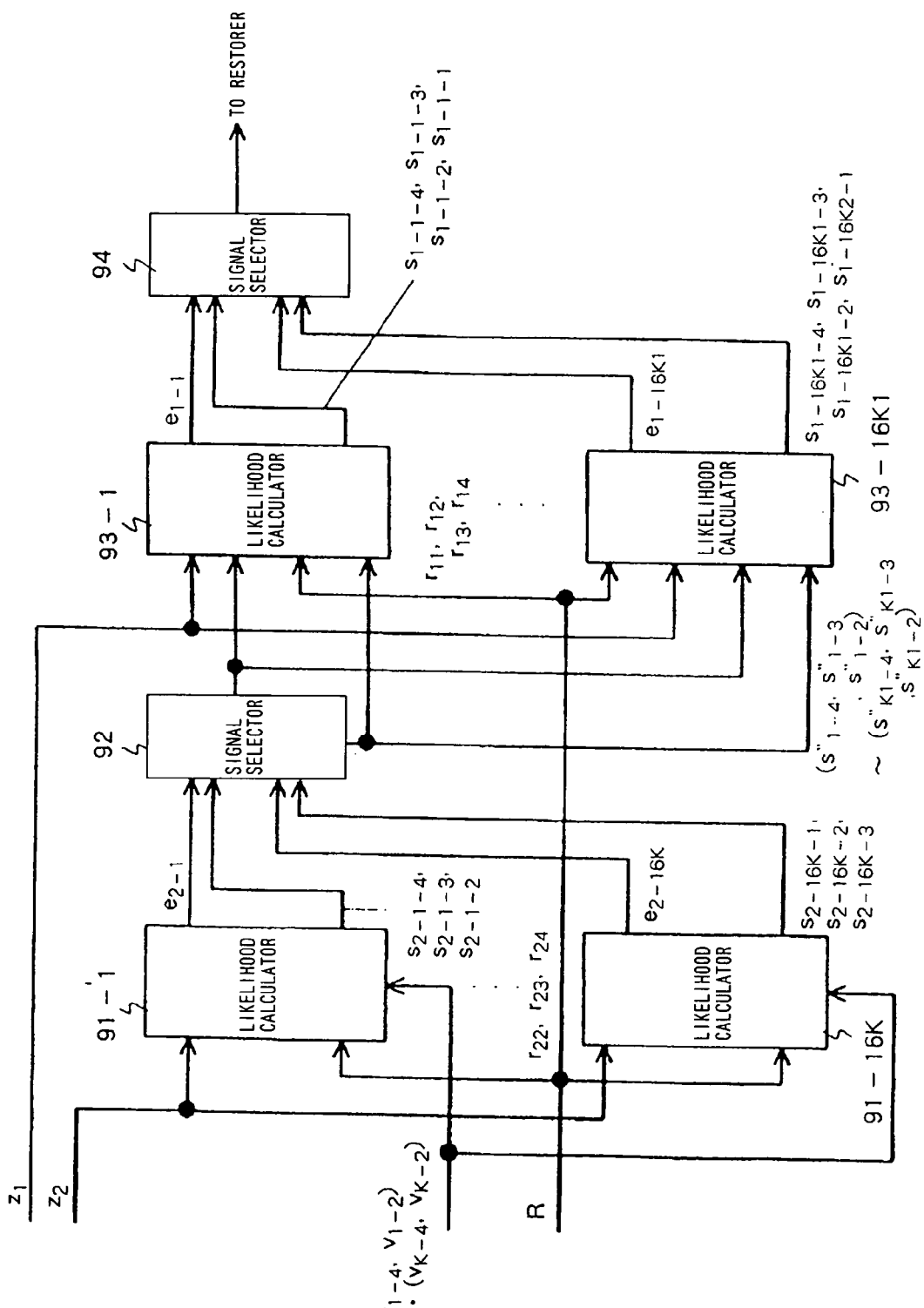
FIG. 18 is a block diagram of a transmitted sequence estimator shown in FIG. 17.
Figure 19:
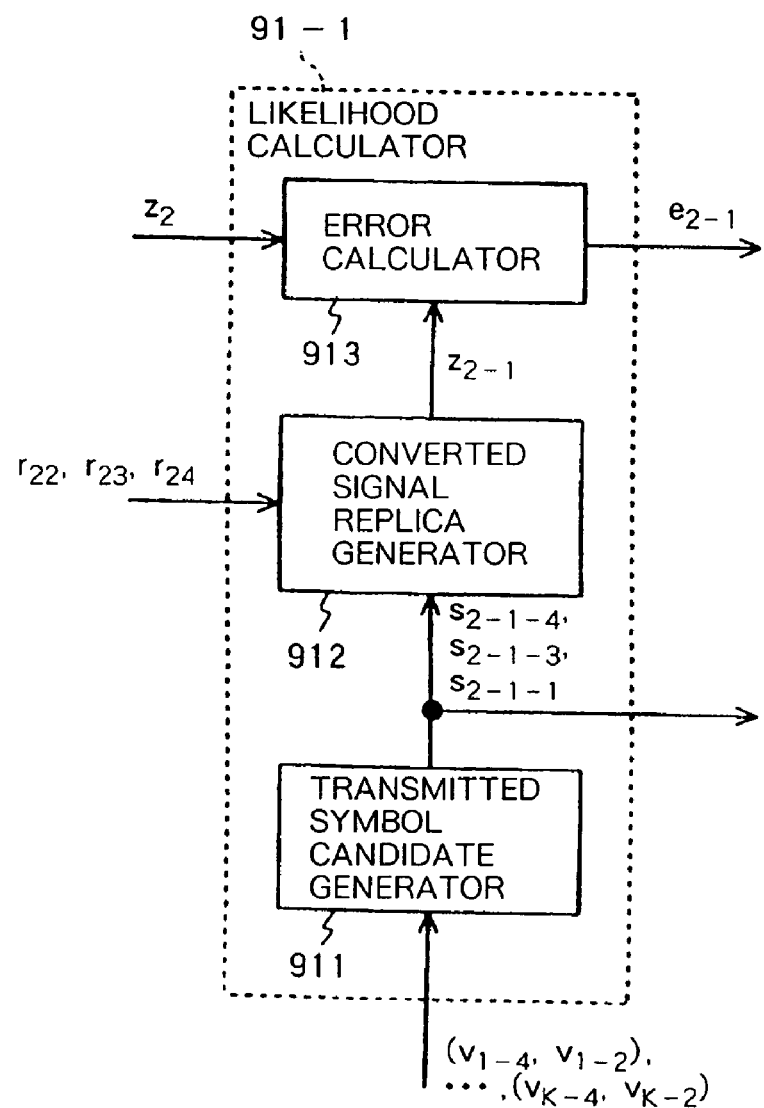
FIG. 19 is a block diagram of a second-stage likelihood calculator shown in FIG. 18.
Figure 20:
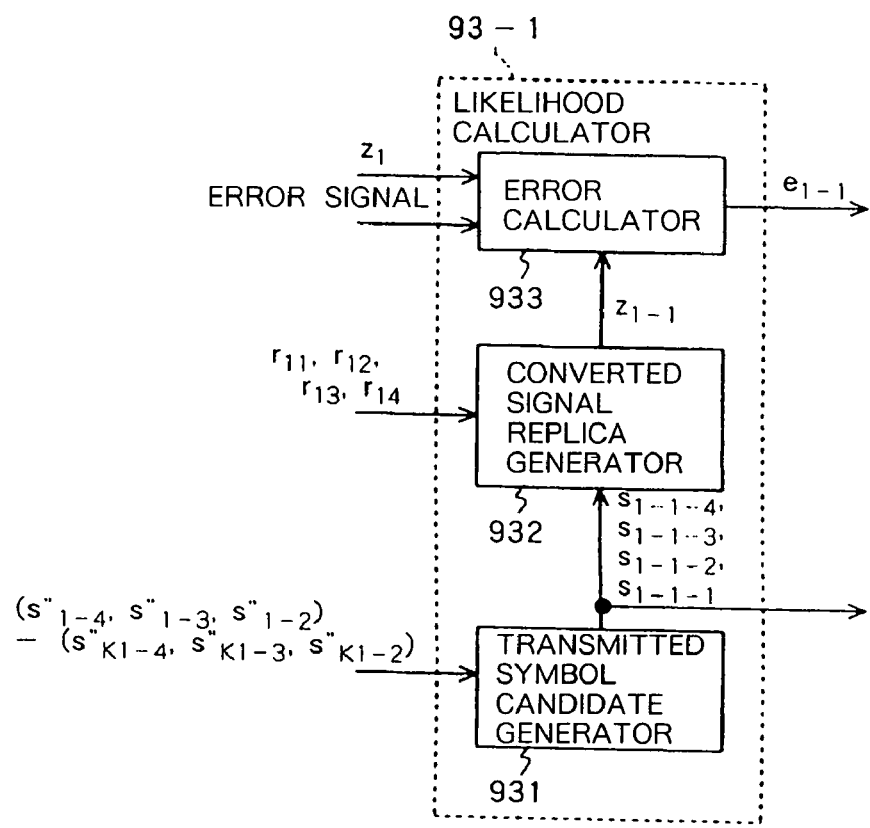
FIG. 20 is a block diagram of a first-stage likelihood calculator shown in FIG. 18.

FIG. 17 is a block diagram of a receiving apparatus according to a fifth embodiment of the present invention, FIG. 18 is a block diagram of a transmitted sequence estimator shown in FIG. 17, FIG. 19 is a block diagram of a second-stage likelihood calculator shown in FIG. 18, and FIG. 20 is a block diagram of a first-stage likelihood calculator shown in FIG. 18. The arrangement of a wireless communication system according to the fifth embodiment of the present invention is the same as the arrangement of the wireless communication system according to the embodiment shown in FIG. 1 above, except that receiving apparatus 8 is provided instead of receiving apparatus 1.

In FIG. 17, receiving apparatus 8 according to the fifth embodiment receives signals transmitted from transmitting apparatus 2 having four transmission antennas 21-1-21-4, with two reception antennas 81-1, 81-2.

Receiving apparatus 8 comprises two reception antennas 81-1, 81-2, channel coefficient estimator 82, priority determiner 83, channel coefficient sorter 84, QR decomposer 85, $Q^H$ processor 86, transmitted sequence estimator 9, transmitted sequence candidate selector 87, and recording medium 88 for storing a program (a program executable by a computer) for realizing processes in various parts of receiving apparatus 8. Receiving apparatus 8 is connected to restorer 89.

Reception antennas 81-1, 81-2 receive respective signals. Channel coefficient estimator 82 is supplied with received signals $r_1$, $r_2$ as its inputs, estimates channel coefficients, and outputs channel matrix H. Priority determiner 83 is supplied with received signals $r_1$, $r_2$ as its inputs, determines a priority for converted sequences, and outputs a signal $X_{pri}$ representative of the determined priority. Channel coefficient sorter 84 is supplied with channel matrix H and signal $X_{pri}$ as its inputs, sorts channel matrix H, and outputs modified channel matrix H'.

QR decomposer 85 is supplied with modified channel matrix H', performs QR decomposition on modified channel matrix H', and outputs a Q matrix and an R matrix. $Q^H$ processor 86 is supplied with received signals $r_1$, $r_2$ and the Q matrix as its inputs, multiplies received signal vector r by the complex conjugate transposed matrix of the Q matrix, and outputs converted signal z. Transmitted sequence estimator 9 is supplied with converted signal z and the R matrix as its inputs and estimates and outputs transmitted sequences.

It is assumed that channel matrix H estimated by channel coefficient estimator 82 is represented by:

$$H = \begin{bmatrix} h_{11} & h_{12} & h_{13} & h_{14} \\ h_{21} & h_{22} & h_{23} & h_{24} \end{bmatrix} \quad \text{[Equation 8]}$$

If higher priorities are given to transmitted sequences 4, 2, 1, 3 in that order, then modified channel matrix H' that has been sorted by sorter 84 is represented by:

$$H = \begin{bmatrix} h_{13} & h_{11} & h_{12} & h_{14} \\ h_{23} & h_{21} & h_{22} & h_{24} \end{bmatrix} \quad \text{[Equation 9]}$$

It is also assumed that channel coefficient estimator 82 estimates two transmitted sequences of higher priorities.

Transmitted sequence candidate selector 87 outputs K sequence candidates $(x_{1-4}, x_{1-2})$-$(x_{K-4}, x_{K-2})$ for minimizing a value calculated according the equation:

$$E_{i,j} = |r_1 - h_{14xi} - h_{12xj}|^2 + |r_2 - h_{24xi} - h_{22xj}|^2$$

for example, as transmitted sequence candidates $(v_{1-4}, v_{1-2})$-$(v_{K-4}, v_{K-2})$ for transmission antennas 21-4, 21-2, with respect to transmitted sequences 4, 2 of higher priorities. Each of the candidate symbols is either one of signals $c_1$–$c_{16}$.

If transmitted sequence candidates are selected with respect to transmitted sequences 4, 2 of higher priorities, then, as shown in FIG. 18, transmitted sequence estimator 9 comprises two-stage likelihood calculator groups of likelihood calculators 91-1-91-16K, 93-1-93-16K1, and two-stage signal selectors 92, 94. Transmitted sequence estimator 9 performs signal processing in the order of the likelihood calculator group in the second stage, signal selector 92 in the second stage, the likelihood calculator group in the first stage, and signal selector 94 in the first stage.

According to the present embodiment, if signals transmitted from respective transmission antennas 21-1-21-4 are 16-valued, and transmitted sequence candidate selector 87 outputs K transmitted sequence candidates $(v_{1-4}, v_{1-2})$-$(v_{K-4}, v_{K-2})$, then the likelihood calculator group in the second stage is made up of 16K likelihood calculators 91-1-91-16K.

First through 16th likelihood calculators 91-1-91-16 are supplied with converted signal $z_2$, elements $r_{22}, r_{23}, r_{24}$ of the R matrix, and transmitted sequence candidates $(v_{1-4}, v_{1-2})$-$(v_{K-4}, v_{K-2})$ as their inputs. 17th through 32nd likelihood calculators 91-17-91-32 are supplied with converted signal $z_2$, elements $r_{22}, r_{23}, r_{24}$ of the R matrix, and transmitted sequence candidates $(v_{2-4}, v_{2-2})$-$(v_{K-4}, v_{K-2})$ as their inputs. {16(K-1)+1}th through 16Kth likelihood calculators 91-16(K-1)+1-91-16K are supplied with converted signal $z_2$, elements $r_{22}, r_{23}, r_{24}$ of the R matrix, and transmitted sequence candidates $(v_{K-4}, v_{K-2})$-$(v_{K-4}, v_{K-2})$ as their inputs.

As shown in FIG. 19, first likelihood calculator 91-1 in the second stage comprises transmitted symbol candidate generator 911, converted signal replica generator 912, and error calculator 913. Other likelihood calculators 91-2-91-16K are identical in structure to likelihood calculator 91-1.

In first likelihood calculator 91-1, transmitted symbol candidate generator 911 is supplied with transmitted sequence candidates $(v_{1-4}, v_{1-2})$-$(v_{K-4}, v_{K-2})$ as its inputs, and generates and outputs transmitted symbol candidates $s_{2-1-4}, s_{2-1-3}, s_{2-1-2}$ which are either one of signals $c_1$-$c_{16}$. Converted signal replica generator 912 is supplied with elements $r_{22}$, $r_{23}$, $r_{24}$ and transmitted symbol candidates $s_{2-1-4}$, $s_{2-1-3}$, $s_{2-1-2}$ as its inputs, and calculates and outputs converted signal replica $z_{2-1}$ according to the equation:

$$z_{2-1} = r_{22}s_{2-1-2} + r_{23}s_{2-1-3} + r_{24}s_{2-1-4}$$

Error calculator 913 is supplied with converted signal $z_2$ and converted signal replica $z_{2-1}$ as its inputs, and calculates and outputs error signal $e_{2-1}$ according to the equation:

$$e_{2-1} = |z_2 - z_{2-1}|^2$$

First likelihood calculator 91-1 outputs error signal $e_{2-1}$ and transmitted symbol candidates $s_{2-1-4}$, $s_{2-1-3}$, $s_{2-1-2}$. Similarly, second likelihood calculator 91-2 outputs error signal $e_{2-2}$ and transmitted symbol candidates $s_{2-2-4}$, $s_{2-2-3}$, $s_{2-2-2}$, and 16Kth likelihood calculator 91-16K outputs error signal $e_{2-16K}$ and transmitted symbol candidates $s_{2-16K-4}$, $s_{2-16K-3}$, $s_{2-16K-2}$.

Signal selector 92 in the second stage outputs K1 error signals $e''_1$-$e''_{K1}$ having a smallest error and K1 symbol candidate sets $(s''_{1-4}, s''_{1-3}, s''_{1-2})$-$(s''_{K1-4}, s''_{K1-3}, s''_{K1-2})$ which give the error.

The likelihood calculator group in the first stage is made up of 16K1 likelihood calculators 93-1-93-16K1. First through 16th likelihood calculators 93-1-93-16 are supplied with converted signal $z_1$, elements $r_{11}, r_{12}, r_{13}, r_{14}$ of the R matrix, and symbol candidate set $(s''_{1-4}, s''_{1-3}, s''_{1-2})$ as its inputs. $\{16(K1-1)+1\}$th through 16K1th likelihood calculators 93-16(K1-1)+1-93-16K1 are supplied with converted signal $z_1$, elements $r_{11}, r_{12}, r_{13}, r_{14}$ of the R matrix, and symbol candidate set $(s''_{K1-4}, s''_{K1-3}, s''_{K1-2})$ as its inputs.

As shown in FIG. 20, first likelihood calculator 93-1 comprises transmitted symbol candidate generator 931, converted signal replica generator 932, and error calculator 933. Other likelihood calculators 93-2-93-16K1 are identical in structure to likelihood calculator 93-1.

In likelihood calculator 93-1, transmitted symbol candidate generator 931 generates and outputs transmitted symbol candidates $s_{1-1-4}$, $s_{1-1-3}$, $s_{1-1-2}$, $s_{1-1-1}$ which are either one of signals $c_1$-$c_{16}$. Converted signal replica generator 932 is supplied with elements $r_{11}, r_{12}, r_{13}, r_{14}$ and transmitted symbol candidates $s_{1-1-4}$, $s_{1-1-3}$, $s_{1-1-2}$, $s_{1-1-1}$ as its inputs, and calculates and outputs converted signal replica $z_{1-1}$ according to the equation:

$$z_{1-1} = r_{11}s_{1-1-1} + r_{12}s_{1-1-2} + r_{13}s_{1-1-3} + r_{14}s_{1-1-4}$$

Error calculator 933 is supplied with converted signal $z_1$, converted signal replica $z_{1-1}$, and error signal $e''_1$ as its inputs, and calculates and outputs error signal $e_{1-1}$ according to the equation:

$$e_{1-1} = |z_1 - z_{1-1}|^2 + e''_1$$

First likelihood calculator 93-1 outputs error signal $e_{1-1}$ and transmitted symbol candidates $s_{1-1-4}$, $s_{1-1-3}$, $s_{1-1-2}$, $s_{1-1-1}$. Similarly, second likelihood calculator 93-2 outputs error signal $e_{1-2}$ and transmitted symbol candidates $s_{1-2-4}$, $s_{1-2-3}$, $s_{1-2-2}$, $s_{1-2-1}$, and 16K1th likelihood calculator 93-16K1 outputs error signal $e_{2-16K1}$ and transmitted symbol candidates $s_{1-16K1-4}$, $s_{1-16K1-3}$, $s_{1-16K1-2}$, $s_{1-16K1-1}$.

Signal selector 94 in the first stage is supplied with the error signals and the transmitted symbol candidates output from 16K1 likelihood calculators 93-1-93-16K1, and outputs transmitted sequences $s'_1, s'_2, s'_3, s'_4$ which give a smallest error.

According to the present embodiment, as described above, since transmitted sequence estimator 9 estimates sequences that are indefinite in the upper triangular part of the R matrix which is calculated by QR decomposer 85, transmitted signal sequences can be demodulated even if the reception antennas are fewer than the transmission antennas.

Figure 21:
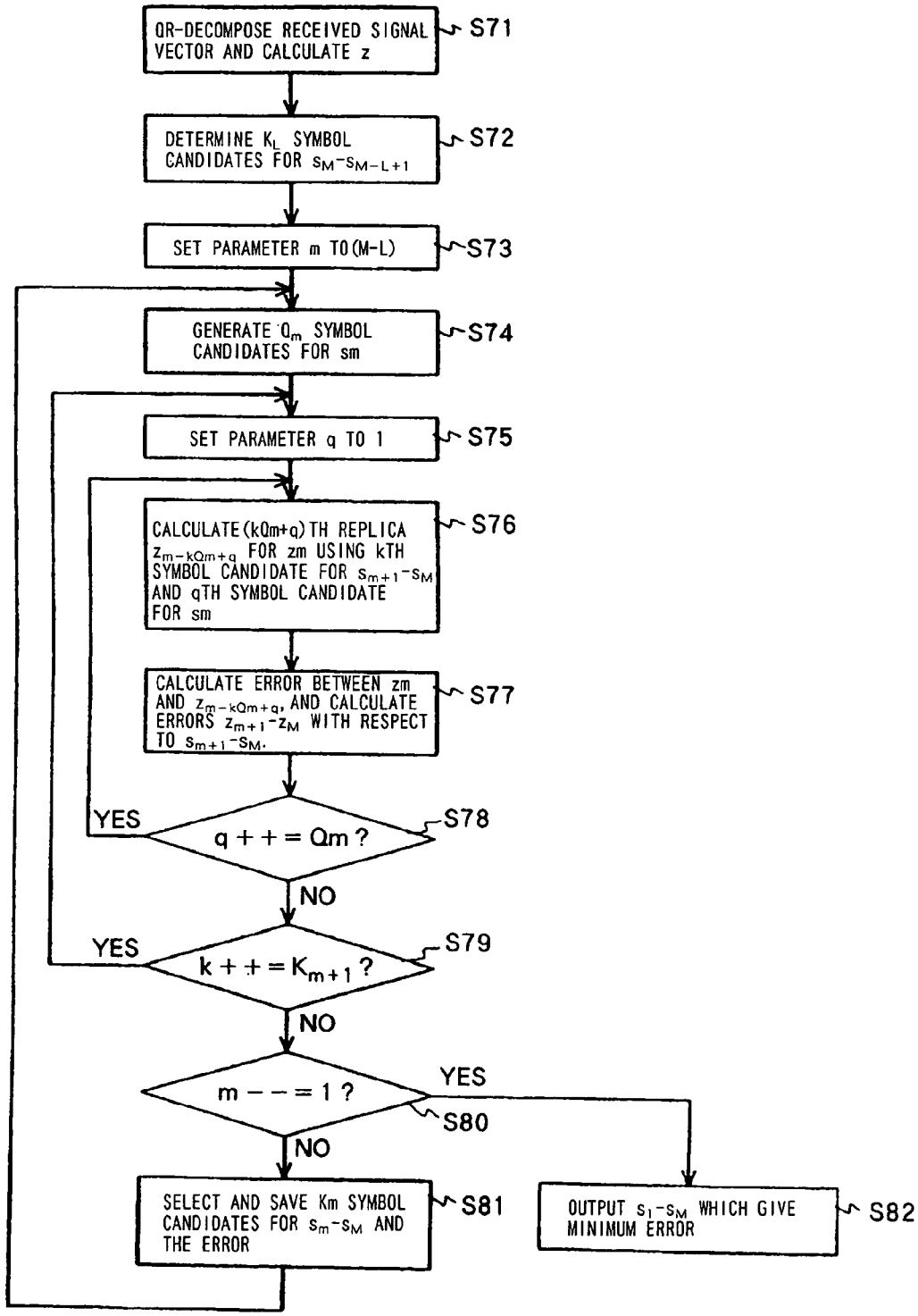
FIG. 21 is a flowchart of a demodulating process performed by the receiving apparatus according to the fifth embodiment of the present invention.

FIG. 21 is a flowchart of a demodulating process performed by receiving apparatus 8 according to the fifth embodiment of the present invention. The demodulating process of receiving apparatus 8 according to the fifth embodiment of the present invention will be described below with reference to FIGS. 17 through 21. The process shown in FIG. 21 is performed when a processor (CPU: central processing unit) of receiving apparatus 8 executes a program stored in recording medium 88. Though transmitting apparatus 2 has four transmission antennas 21-1-21-4 in the above description, transmitting apparatus 2 has M transmission antennas in the operation described below.

In receiving apparatus 8, QR decomposer 85 performs QR decomposition on channel matrix H. Based on QR-decomposed channel matrix H, $Q^H$ processor 86 calculates converted signal z (step S71 in FIG. 21). Transmitted sequence candidate selector 87 determines $K_L$ symbol candidates sets for transmitted signals $s_M$-$s_{M-L+1}$ (step S72 in FIG. 21).

Transmitted sequence estimator 9 sets parameter m to (M-L) (step S73 in FIG. 21), generates Qm symbol candidates for transmitted signal $s_m$ (step S74 in FIG. 21), and sets parameter q to 1 (step S75 in FIG. 21).

Transmitted sequence estimator 9 calculates (kQm+q)th replica $z_{m-kQm+q}$ for converted signal $z_m$ using a kth symbol candidate for transmitted signals $s_{m+1}$-$s_M$ and a qth symbol candidate for transmitted signal $s_m$ (step S76 in FIG. 21). Furthermore, transmitted sequence estimator 9 calculates an error between replica $z_m$ and replica $z_{m-kQm+q}$, and adds errors $z_{m+1}$-$z_M$ with respect to transmitted signals $s_{m+1}$-$s_M$ (step S77 in FIG. 21).

If "q++=Qm" is not satisfied (step S78 in FIG. 21), if "k++=$K_{m+1}$" is not satisfied (step S79 in FIG. 21), and if "m--=1" is not satisfied (step S80 in FIG. 21), then transmitted sequence estimator 9 selects and saves $K_m$ symbol candidates for transmitted signals $s_m$-$s_M$ and the error (step S81 in FIG. 21). If "m--=1" is satisfied (step S80 in FIG. 21), then transmitted sequence estimator 9 outputs transmitted signals $s_1$-$s_M$ which give a minimum error (step S82 in FIG. 21).

According to the first through fifth embodiments described above, the output of the signal selector represents transmitted symbol candidates for giving a minimum error. However, depending on the arrangement of the overall receiver, the output of the signal selector may represent a likelihood for each transmitted symbol or a likelihood for bits that have been transmitted by each transmitted symbol.

Embodiment 6

Figure 22:
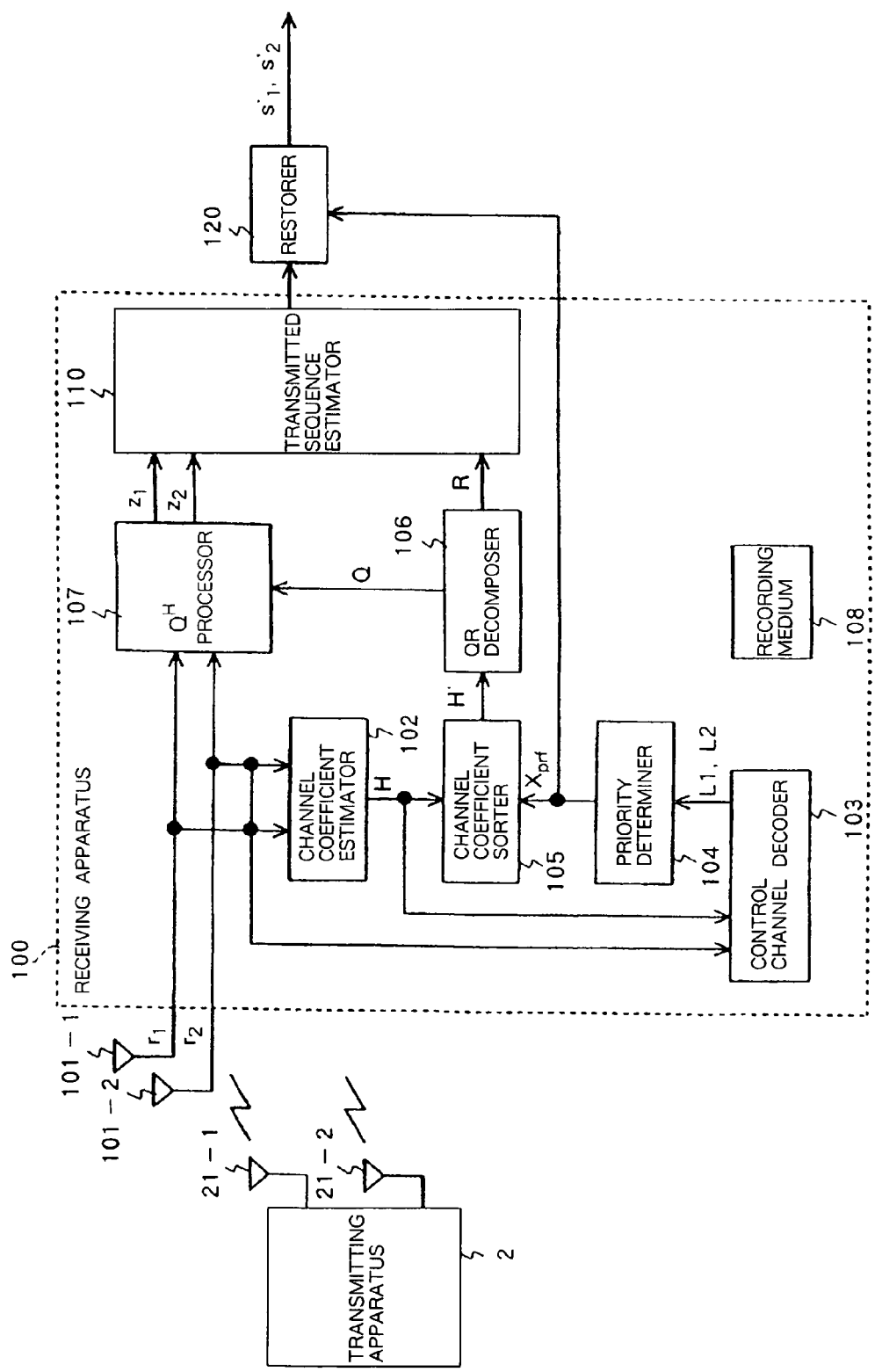
FIG. 22 is a block diagram of a receiving apparatus according to a sixth embodiment of the present invention.
Figure 23:
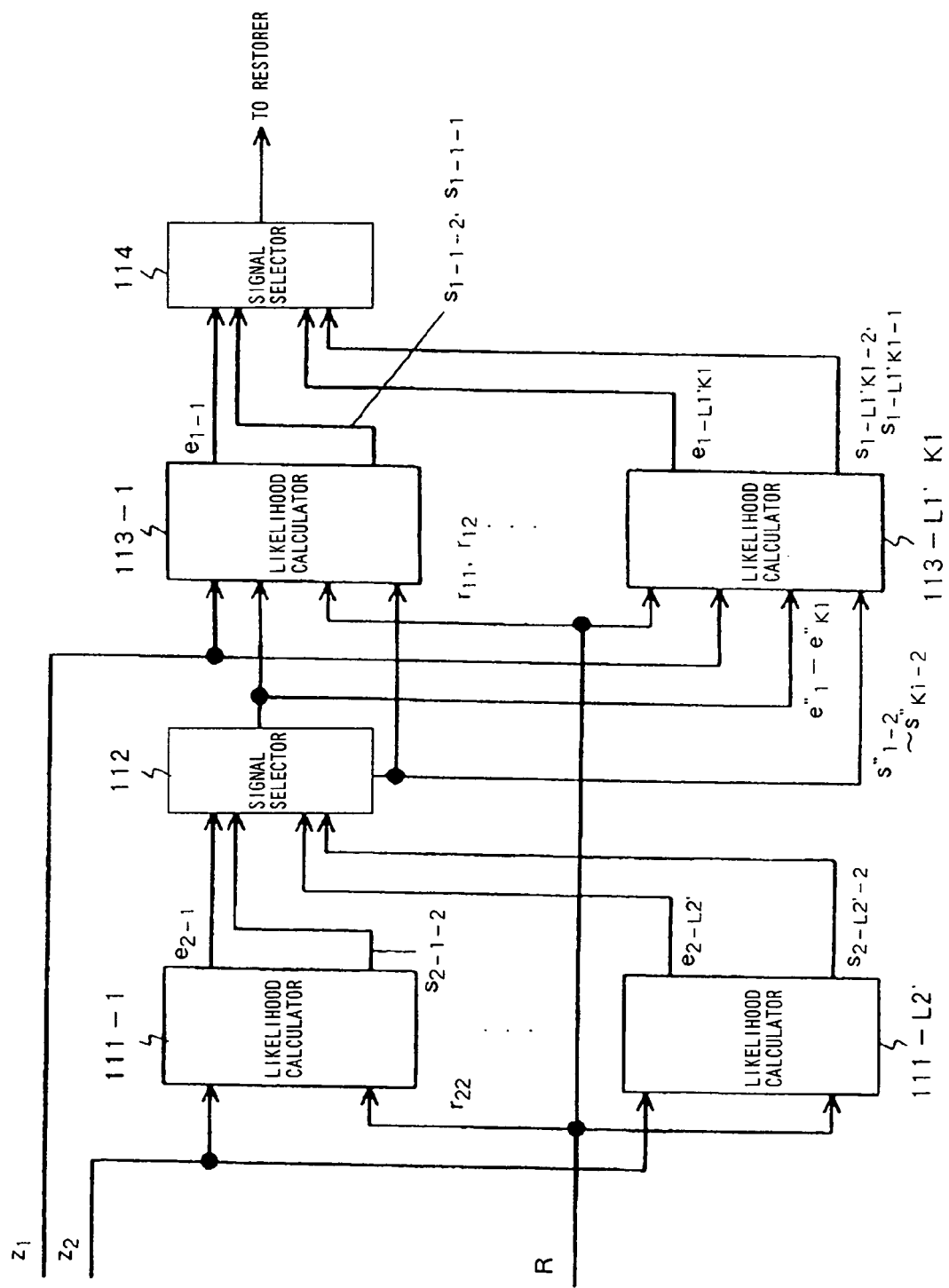
FIG. 23 is a block diagram of a transmitted sequence estimator shown in FIG. 22.
Figure 24:
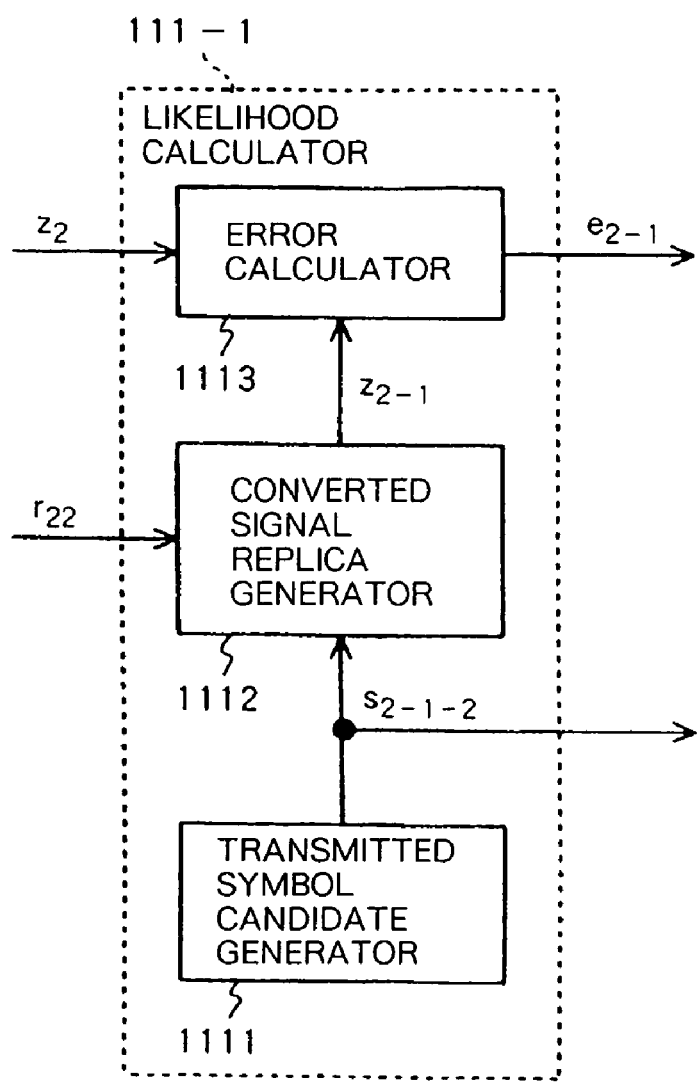
FIG. 24 is a block diagram of a second-stage likelihood calculator shown in FIG. 23.
Figure 25:
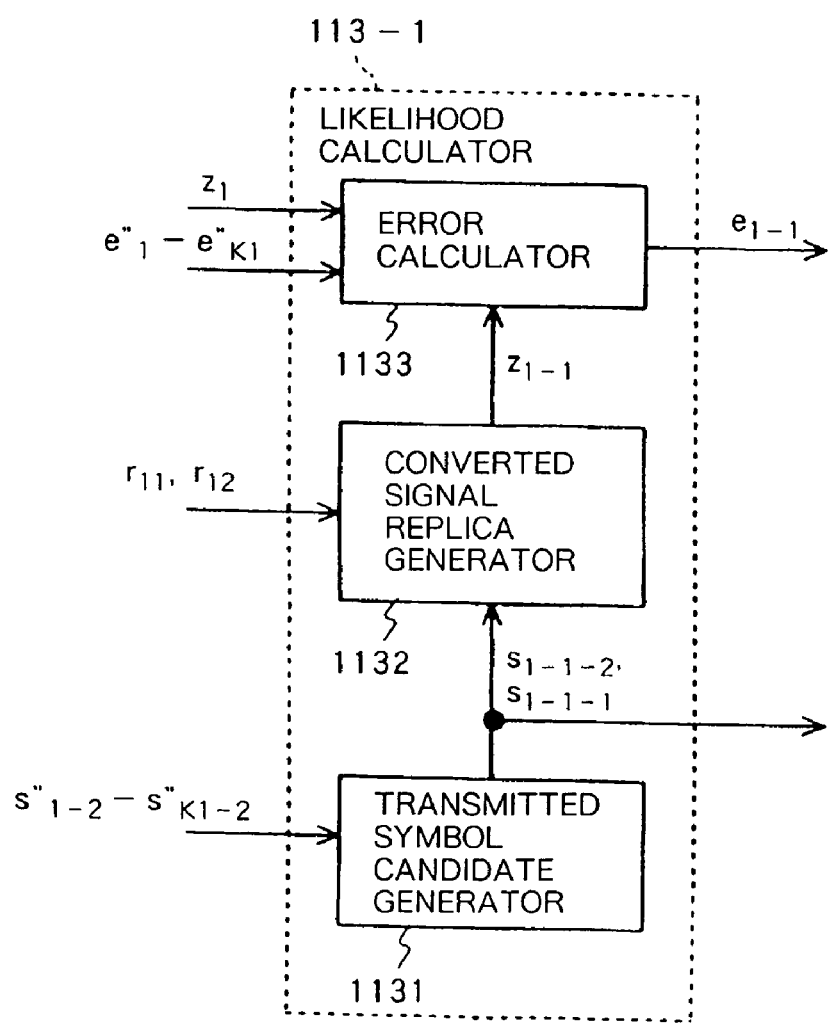
FIG. 25 is a block diagram of a first-stage likelihood calculator shown in FIG. 23.

FIG. 22 is a block diagram of a receiving apparatus according to a sixth embodiment of the present invention, FIG. 23 is a block diagram of a transmitted sequence estimator shown in FIG. 22, FIG. 24 is a block diagram of a second-stage likelihood calculator shown in FIG. 23, and FIG. 25 is a block diagram of a first-stage likelihood calculator shown in FIG. 23. The arrangement of a wireless communication system according to the sixth embodiment of the present invention is the same as the arrangement of the wireless communication system according to the embodiment shown in FIG. 1 above, except that receiving apparatus 100 is provided instead of receiving apparatus 1.

In FIG. 22, receiving apparatus 100 according to the sixth embodiment receives signals transmitted from transmitting apparatus 2 having two transmission antennas 21-1, 21-2, with two reception antennas 101-1, 101-2.

Receiving apparatus 100 comprises two reception antennas 101-1, 101-2, channel coefficient estimator 102, control channel decoder 103, priority determiner 104, channel coefficient sorter 105, QR decomposer 106, $Q^H$ processor 107, transmitted sequence estimator 110, and recording medium 108 for storing a program (a program executable by a computer) for realizing processes in various parts of receiving apparatus 100. Receiving apparatus 100 is connected to restorer 120.

Transmission antennas 101-1, 101-2 are modulated by independent modulating processes. It is assumed that transmission antenna 21-1 is transmitting either one of signals $c_1$-$c_{L1}$ and transmission antenna 21-2 is transmitting either one of signals $c_1$-$c_{L2}$. If the modulating process for transmission antenna 21-1 is QPSK (Quarternary Phase Shift Keying), then $L_1$=4, and if the modulating process for transmission antenna 21-2 is 16 QAM (Quadrature Amplitude Modulation), then $L_2$=16.

Receiving apparatus 100 has two reception antennas 101-1, 101-2, and reception antennas 101-1, 101-2 receive respective signals. Channel coefficient estimator 102 is supplied with received signals $r_1$, $r_2$ as its inputs, estimates channel coefficients, and outputs channel matrix H of the estimated channel coefficients.

QR decomposer 106 is supplied with channel matrix H as its inputs, performs QR decomposition on channel matrix H, and outputs a Q matrix and an R matrix. $Q^H$ processor 107 is supplied with the Q matrix and received signals $r_1$, $r_2$ as its inputs, multiplies the received signals by the complex conjugate transposed matrix of the Q matrix, and outputs converted signal z.

Priority determiner 104 is supplied with signal point numbers ($L_1$, $L_2$) of respective transmission antennas 21-1, 21-2 which are indicated from control channel decoder 103, determines a priority between the transmission antennas, and outputs a signal $X_{pri}$ representative of the determined priority. It is assumed that the modulating processes employed for transmission antennas 21-1, 21-2 have been indicated from the transmission side through a control channel using a predetermined format. Priority determiner 104 gives a priority to an antenna which has transmitted sequences of a smaller signal point number (transmitted sequences of a lower modulation multi-valued number).

Channel coefficient sorter 105 is supplied with channel matrix H and signal $X_{pri}$ indicative of the priority as its inputs, sorts the column vectors of channel matrix H, and outputs modified channel matrix H'. Channel coefficient sorter 105 sorts the column vectors in an ascending order of priorities. In the present embodiment, the signal point number of an antenna of a lower priority is represented by L1', and the signal point number of an antenna of a higher priority by L2'. Transmitted sequence estimator 110 is supplied with converted signal z and the R matrix as its inputs, and estimates and outputs signals transmitted from transmission antennas 21-1, 21-2.

As shown in FIG. 23, transmitted sequence estimator 110 comprises two-stage likelihood calculator groups of likelihood calculators 111-1-111-L2', 113-1-113-L1'K1, and two-stage signal selectors 112, 114. Transmitted sequence estimator 110 performs signal processing in the order of the likelihood calculator group in the second stage, signal selector 112 in the second stage, the likelihood calculator group in the first stage, and signal selector 114 in the first stage.

If the maximum signal point number of signals transmitted from transmission antennas 21-1, 21-2 is $L_{MAX}$ in the present embodiment, then the likelihood calculator group in the second stage comprises $L_{MAX}$ likelihood calculators. Likelihood calculators 111-1-111-L2' are supplied with element $r_{22}$ of the R matrix and outputs an error signal group and a transmitted symbol candidate group.

As shown in FIG. 24, first likelihood calculator 111-1 in the second stage comprises transmitted symbol candidate generator 1111, converted signal replica generator 1112, and error calculator 1113. Other likelihood calculators 111-2-111-L2' are identical in structure to likelihood calculator 111-1.

In likelihood calculator 111-1, transmitted symbol candidate generator 1111 generates and outputs transmitted symbol candidate $s_{2-1-2}$ which comprises a symbol of either one of signals $c_1$-$c_{L2}$'. Converted signal replica generator 1112 is supplied with element $r_{22}$ and transmitted symbol candidate $s_{2-1-2}$ as its inputs, and generates and outputs converted signal replica $z_{2-1}$.

Error calculator 1113 is supplied with converted signal $z_2$ and converted signal replica $z_{2-1}$ as its inputs and outputs error signal $e_{2-1}$. Converted signal replica $z_{2-1}$ is calculated according to the equation:

$$z_{2-1} = r_{22} s_{2-1-2}$$

Error signal $e_{2-1}$ is calculated according to the equation:

$$e_{2-1} = |z_2 - z_{2-1}|^2$$

First likelihood calculator 111-1 outputs error signal $e_{2-1}$ and transmitted symbol candidate $s_{2-1-2}$. Signal selector 112 in the second stage is supplied with the error signal group and the transmitted symbol candidate group which have been calculated by L2' likelihood calculators 111-1-111-L2' in the second stage, as its inputs and outputs $K_1$ error signals $e''_1$-$e''_{K1}$ of a smallest error and $K_1$ transmitted symbol candidates $s''_{1-2}$-$s''_{K1-2}$ which give the error. The K1 transmitted symbol candidates that are output are either one of signals $c_1$-$c_{L2}$.

The likelihood calculator group in the first stage is made up of $L_{MAX} K_1$ likelihood calculators. First through L1' likelihood calculators 113-1-113-$L_1$' are supplied with converted signal $z_1$, elements $r_{11}$, $r_{12}$ of the R matrix, error signal $e''_1$, and transmitted symbol candidate $s''_{1-2}$ as its inputs. {L1'(K1-1)+1}th through L1'K1th likelihood calculators 113-L1'(K1-1)+1-113-L1'K1 are supplied with converted signal $z_1$, elements $r_{11}$, $r_{12}$ of the R matrix, error signal $e''_{K1}$, and transmitted symbol candidate $s''_{K1-2}$ as its inputs.

As shown in FIG. 25, first likelihood calculator 113-1 in the first stage comprises transmitted symbol candidate generator 1131, converted signal replica generator 1132, and error calculator 1133. Other likelihood calculators 113-2-113-L1'K1 are identical in structure to likelihood calculator 113-1.

In likelihood calculator 113-1, transmitted symbol candidate generator 1131 is supplied with transmitted symbol candidate $s''_{1-2}$ as its input and outputs transmitted symbol candidates $s_{1-1-2}$, $s_{1-1-1}$ which comprise a symbol of either one of signals $c_1$-$c_{L1}$'. Converted signal replica generator 1132 is supplied with elements $r_{11}$, $r_{12}$ of the R matrix and transmitted symbol candidates $s_{1-1-2}$, $s_{1-1-1}$ as its inputs and outputs converted signal replica $z_{1-1}$.

Error calculator 1133 is supplied with converted signal $z_1$, converted signal replica $z_{1-1}$, and error signal $e''_1$ as its inputs and outputs error signal $e_{1-1}$. Converted signal replica $z_{1-1}$ is calculated according to the equation:

$$z_{1-1} = r_{11} s_{1-1-2}$$

Error signal $e_{1-1}$ is calculated according to the equation:

$$e_{1-1} = |z_1 - z_{1-1}|^2 + e''_1$$

First likelihood calculator 113-1 outputs error signal $e_{1-1}$ and transmitted symbol candidates $s_{1-1-2}$, $s_{1-1-1}$. L1'K1th likelihood calculator 113-L1'K1 outputs error signal $e_{1-L1}'K_1$ and transmitted symbol candidates $s_{1-L1}'K_{1-2}$, $s_{1-L1}'K_{1-1}$.

Signal selector 114 in the first stage is supplied with the error signals and the transmitted symbol candidates which have been calculated by $L'_1 K_1$ likelihood calculators 113-1-113-L1'K1 in the first stage, as its inputs and outputs transmitted symbol candidates $s'_{1-2}$, $s'_{1-1}$ which give a smallest error signal $e'_1$ where $s'_{1-2}$ represents a transmitted symbol candidate selected from $s_{1-1-2}$ through $s_{1-L1}'K_{1-2}$.

Restorer 120 is supplied with signal Xpri representative of a priority which is generated by priority determiner 104 as its input, sorts the transmitted symbol sequences, and outputs transmission antenna numbers $s'_1$, $s'_2$.

Signal selector 112 in the second stage selects K1 transmitted symbol candidates of a smallest error. As the difference between L2' and K1 is greater, the possibility for correct transmitted symbols to be deleted in error from candidates is higher, resulting in degraded reception characteristics. According to the present embodiment, antennas of smaller signal point numbers are given priority, and channel coefficients are sorted. It is thus possible to process signals in the order of antennas of smaller signal point numbers, and the number of times that a large candidate reduction is made in a previous stage is reduced, resulting in improved reception characteristics.

In the sixth embodiment of the present invention as described above, transmitted sequence candidate selector 87 selects K sequence candidates which reduce an error signal, with respect to transmitted sequences 4, 2 of higher priorities. If the signal point numbers of transmission sequences 4, 2 are cL4, cL2, respectively, then transmitted sequence candidate selector 87 selects K sequence candidates from a combination of cL4×cL2. If a transmission sequence of a smaller signal point number is processed preferentially, then K candidates may be selected from a smaller combination, and any characteristic degradations due to a selection error of transmitted sequence candidate selector 87 are reduced. If the relationship $c_{L4} \times c_{L2} < K$ is satisfied, then transmitted sequence candidate selector 87 itself is unnecessary.

Embodiment 7

A seventh embodiment of the present invention will be described below. Since the seventh embodiment of the present invention is identical in arrangement to the sixth embodiment of the present invention, the seventh embodiment of the present invention will be described below with reference to FIGS. 22 through 25.

If the maximum signal point number of signals transmitted from transmission antennas is $L_{MAX}$, then the likelihood calculator group in the second stage is made up of $L_{MAX}$ likelihood calculators, and tall he likelihood calculator group in the first stage is made up of $L_{MAX} K_1$ likelihood calculators.

A situation where the modulating process for each transmission antenna, i.e., the signal point number, changes due to adaptive modulation or the like will be considered below. Of the $L_{MAX} K_1$ likelihood calculators prepared as the likelihood calculator group in the first stage, the number of likelihood calculators that are in actual use is L1'K1. Therefore, if L1' is smaller than $L_{MAX}$, then all the prepared likelihood calculators are not used.

According to the present invention, the number of K1 is established depending on L1'. If the maximum number of the likelihood calculator group in the first stage is $J1_{MAX}$, then all the $J1_{MAX}$ likelihood calculators can be utilized by establishing K1 depending on L1' according to the equation:

$$K1 = \frac{J1_{MAX}}{L1'} \quad \text{[Equation 10]}$$

According to the present invention, therefore, the total reception characteristics are improved.

Embodiment 8

An eighth embodiment of the present invention will be described below. Since the eighth embodiment of the present invention is identical in arrangement to the sixth embodiment of the present invention, the eighth embodiment of the present invention will be described below with reference to FIGS. 22 through 25.

According to the process of determining priorities for antennas in each of the above embodiments, the priorities are determined based on received electric powers, received electric power vs. noise electric power ratios or received electric power vs. noise electric power ratios and interference electric power ratios, and the priorities are determined based on the modulating process. According to the present embodiment, the priorities for antennas are determined based on the coding ratio.

If data sequences transmitted from transmission antennas 21-1, 21-2 are coded at respective independent coding ratios, priority determiner 104 determines priorities based on the coding ratios for respective transmission antennas 21-1, 21-2.

A situation where the coding ratios for the respective transmission antennas are changed. With the transmission sequence estimator according to the present invention, the signal separation characteristics of antennas differ from each other depending on the order in which the antennas are processed. Specifically, the signal separation characteristics are worse for antenna signals that are processed in earlier stages and better for antenna signals that are processed in later stages. The reasons are considered to be that since the effect of interference by another antenna remains even after the orthogonalization due to QR decomposition, the selection of candidate points at earlier stages is subject to errors.

According to the present embodiment, antennas with lower coding ratios are given higher priorities for thereby assigning earlier stages with worse signal separation characteristics to signals with higher error-correcting capabilities (lower coding ratios) and assigning later stages with better signal separation characteristics to signals with lower error-correcting capabilities (higher coding ratios), so that the total reception characteristics will be improved and the characteristics are uniformized between the antennas.

Embodiment 9

Figure 26:
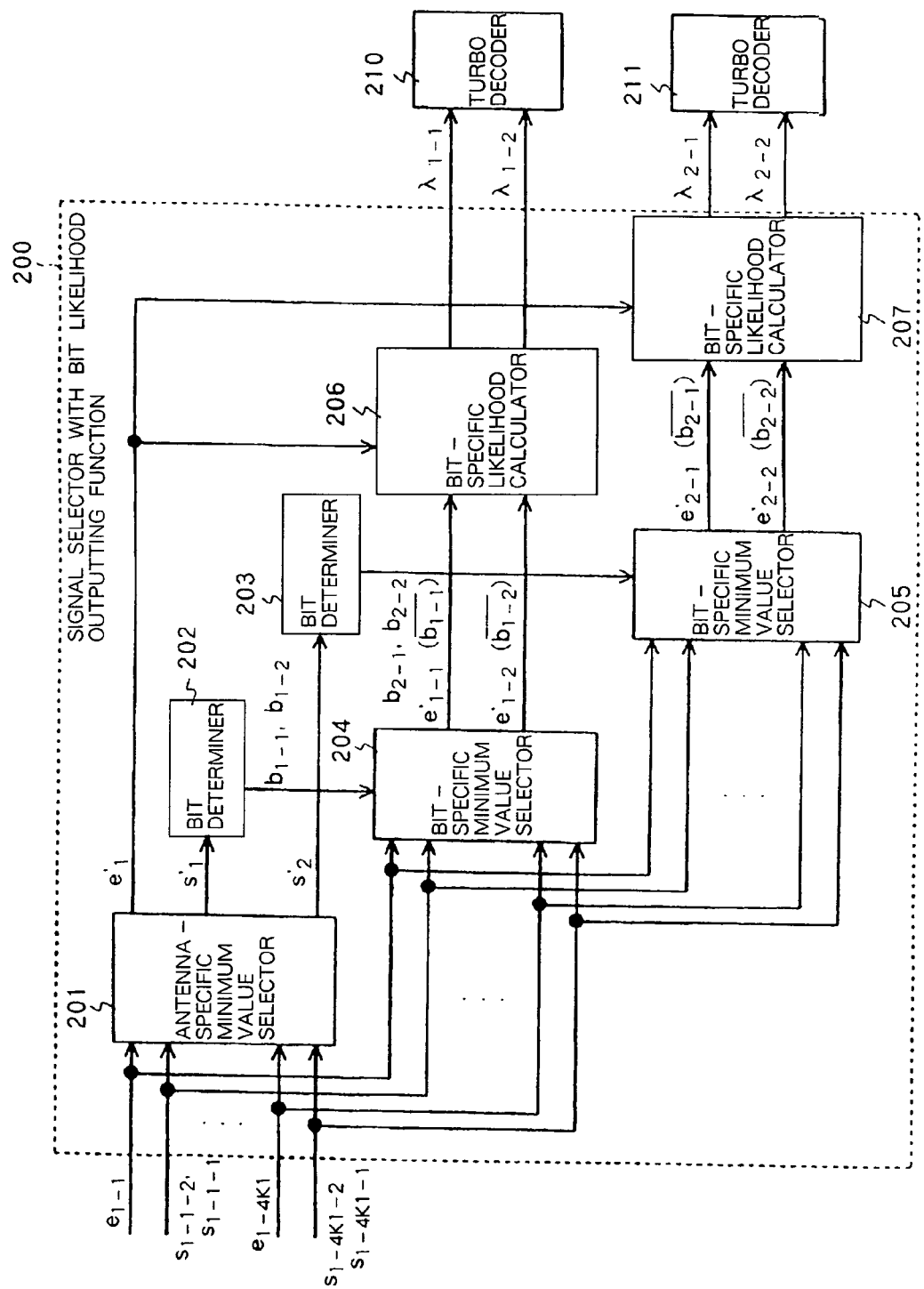
FIG. 26 is a block diagram of a signal selector according to a ninth embodiment of the present invention.

FIG. 26 is a block diagram of a signal selector according to a ninth embodiment of the present invention. As shown in FIG. 26, signal selector 200 according to the ninth embodiment of the present invention has a bit likelihood outputting function, and comprises antenna-specific minimum value selector 201, bit determiners 202, 203, bit-specific minimum value selectors 204, 205, and bit-specific likelihood calculators 206, 207. Signal selector 200 is connected to turbo decoders 210, 211.

Figure 27:
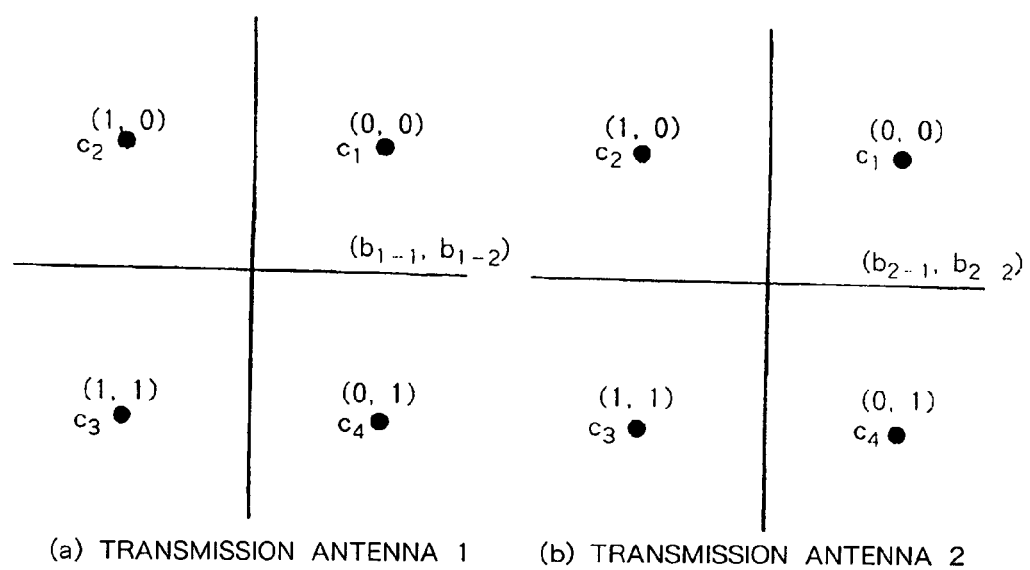
FIG. 27 is a diagram showing examples in which information is assigned to transmitted signals.

For use in combination with an error-correcting decoder using soft-decision bit information, such as turbo decoders 210, 211, signal selector 200 needs to have a function to output bit likelihoods for data sequences that have been output. It is assumed that either one of 4-valued signals $c_1$-$c_4$ is transmitted from each of two transmission antennas 21-1, 21-2 of transmitting apparatus 2. As shown in FIG. 27, 2-bit information is assigned to each signal. The bits of signal points transmitted from transmission antenna 21-1 are represented by $b_{1-1}$, $b_{1-2}$, and the bits of signal points transmitted from transmission antenna 21-2 by $b_{2-1}$, $b_{2-2}$.

Antenna-specific minimum value selector 201 is supplied with the error signals and transmitted symbol candidates that have been calculated by 4K1 likelihood calculators (not shown) in the first stage, and outputs smallest error signal $e'_1$ and transmitted symbol candidates $s'_1$, $s'_2$ for the respective antennas which give error signal $e'_1$. Bit determiners 202, 203, which are provided in combination with the antennas, respectively, are supplied with the respective transmitted symbol candidates as their inputs and determine the bits of the respective signals.

Bit-specific minimum value selectors 204, 205, which are provided in combination with the antennas, respectively, are supplied with decision bits output from bit determiners 202, 203 and the error signals and transmitted symbol candidates that have been calculated by 4K1 likelihood calculators in the first stage, and outputs a smallest error signal among transmitted symbol candidates which have bits (inverted bits) different from the decision bits.

For example, if decision bit $b_{i-j}$ of the jth bit of transmission antenna I is 0, then bit-specific minimum value selectors 204, 205 output smallest error signal E among signal points whose jth bit is 1 of $c_1$-$c_4$. Error signal E is expressed as follows:

$$E = e'_{i-j}(\overline{b_{i-j}}) \quad \text{[Equation 11]}$$

Bit-specific likelihood calculators 206, 207 which are provided in combination with the antennas, respectively, are supplied with error signal $e'_1$ output from antenna-specific minimum value selector 204, 205 and error signal E output from bit-specific minimum value selectors 204, 205, and outputs bit-specific likelihood $\square_{i-j}$. Bit-specific likelihood $\square_{i-j}$ is determined according to the equations:

$$\lambda_{i=j} = e'_{i-j}(\overline{b_{i-j}}) - e'_1 \quad \text{[Equation 12]}$$

(when $b_{i-j} = 0$)

$$\lambda_{i=j} = e'_1 - e'_{i-j}(\overline{b_{i-j}}) \quad \text{[Equation 13]}$$

(when $b_{i-j} = 1$)

Signal selector 200 supplies the bit likelihood determined by the above process to turbo decoders 210, 211 for performing an error-correcting decoding process based on soft-decision information. It is assumed here that coding is performed for each transmission antenna. If process sorting is carried out based on priorities as shown in FIG. 22, then the outputs of bit-specific likelihood calculators 206, 207 are input to a restorer (not shown), and after bit likelihoods are sorted according to transmission antenna numbers, they are input to predetermined turbo decoders for processing.

Embodiment 10

Figure 28:
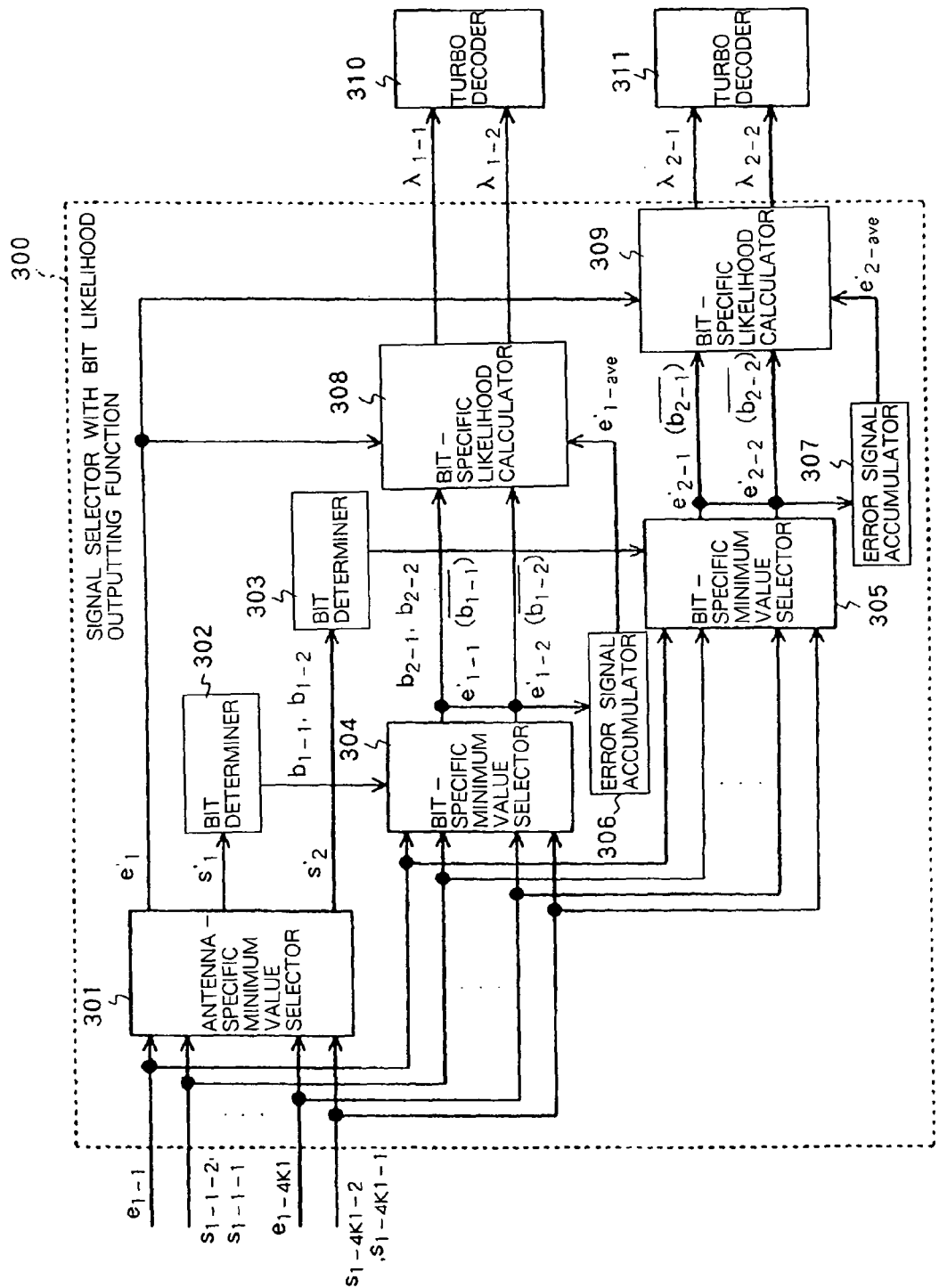
FIG. 28 is a block diagram of a signal selector according to a tenth embodiment of the present invention.

FIG. 28 is a block diagram of a signal selector according to a tenth embodiment of the present invention. As shown in FIG. 28, signal selector 300 according to the tenth embodiment of the present invention has a bit likelihood outputting function, and comprises antenna-specific minimum value selector 301, bit determiners 302, 303, bit-specific minimum value selectors 304, 305, error signal accumulators 306, 307, and bit-specific likelihood calculators 308, 309. Signal selector 300 is connected to turbo decoders 310, 311.

Bit-specific minimum value selector 301 searches for a smallest error signal among transmitted symbol candidates which have bits (inverted bits) different from the decision bits for transmitted symbol candidates whose error signal is smallest. However, all symbol candidates for inverted bits may have been deleted by narrowing down transmitted symbol candidates with a signal selector in the preceding stage (e.g., signal selector 112).

At this time, it is no possible to perform the calculation of $\square_{i-j}$ according to the above equations, and no likelihood can be calculated. For example, if the signal point detected by antenna-specific minimum value selector 301 is $c_i$, then $b_{1-1} = 0$. At this time, if signal points $c_1$, $c_2$ have not been selected, but deleted, by the signal selector in the preceding stage, then bit-specific minimum value selectors 304, 305 are not supplied with an error signal of an inverted bit where $b_{1-1} = 1$ as their inputs, no bit likelihood can be calculated.

To solve the above problem, error signal accumulators 306, 307 are provided according to the present embodiment. Error signal accumulators 306, 307 accumulate error signal E for inverted bits over a certain period. Then, error signal accumulators 306, 307 average the results that have been accumulated over the certain period, thereby outputting provisional error signals $e'_{1-ave}$, $e'_{2-ave}$ for inverted bits for inverted bits.

Bit-specific likelihood calculators 308, 309 are supplied with error signal $e'_1$ output from antenna-specific minimum value selector 301, error signal E output from bit-specific minimum value selectors 304, 305, and provisional error signals $e'_{i-ave}$ from error signal accumulators 306, 307 as their inputs, and output bit-specific likelihood $\square_{i-j}$. Provisional error signals $e'_{i-ave}$ are used as a substitute in calculating bit-specific likelihood if bit-specific minimum value selectors 304, 305 are unable to outputting error signals for inverted bits.

According to the present embodiment, it is thus possible to calculate bit likelihood at all times even if symbol candidates are narrowed down by the signal selector in the previous stage according to the above process.

Embodiment 11

Figure 29:
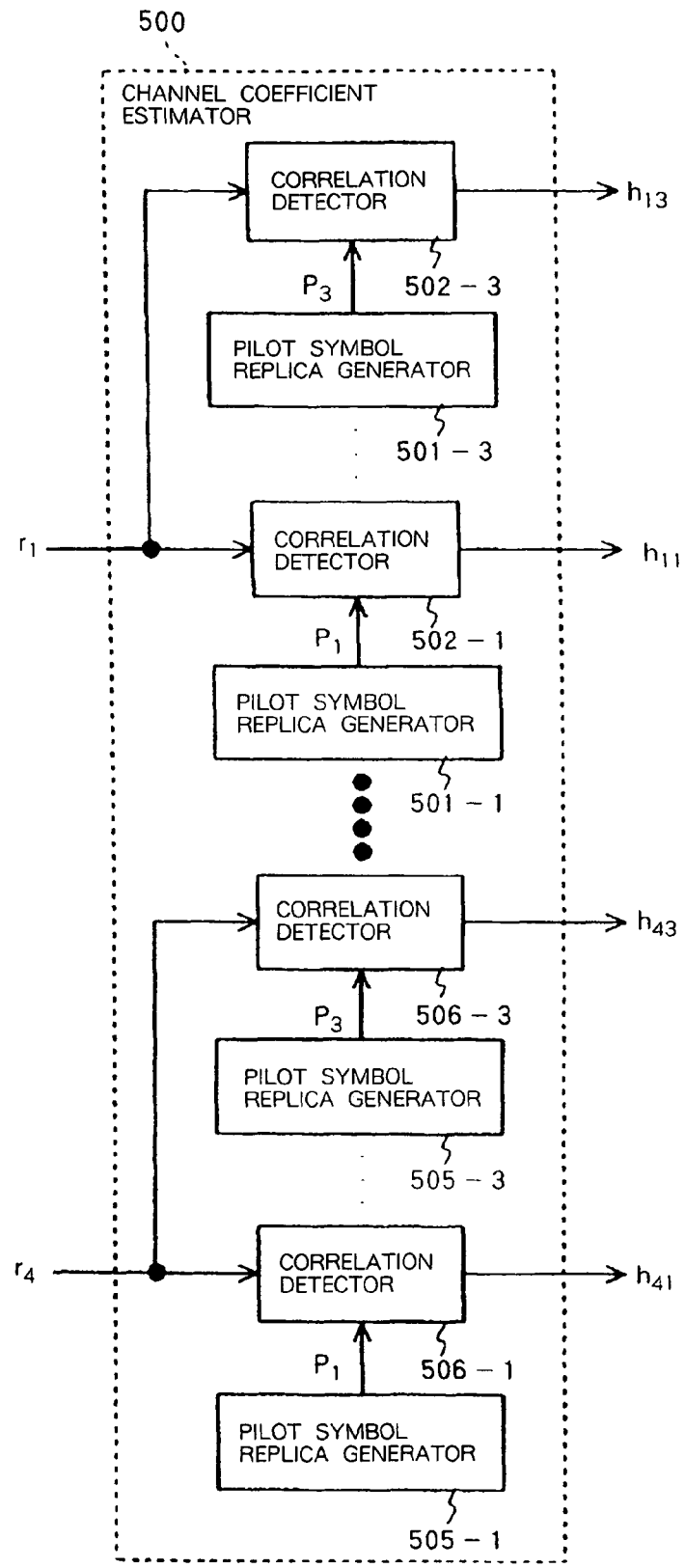
FIG. 29 is a block diagram of a channel coefficient estimator according to an eleventh embodiment of the present invention.
Figure 30:
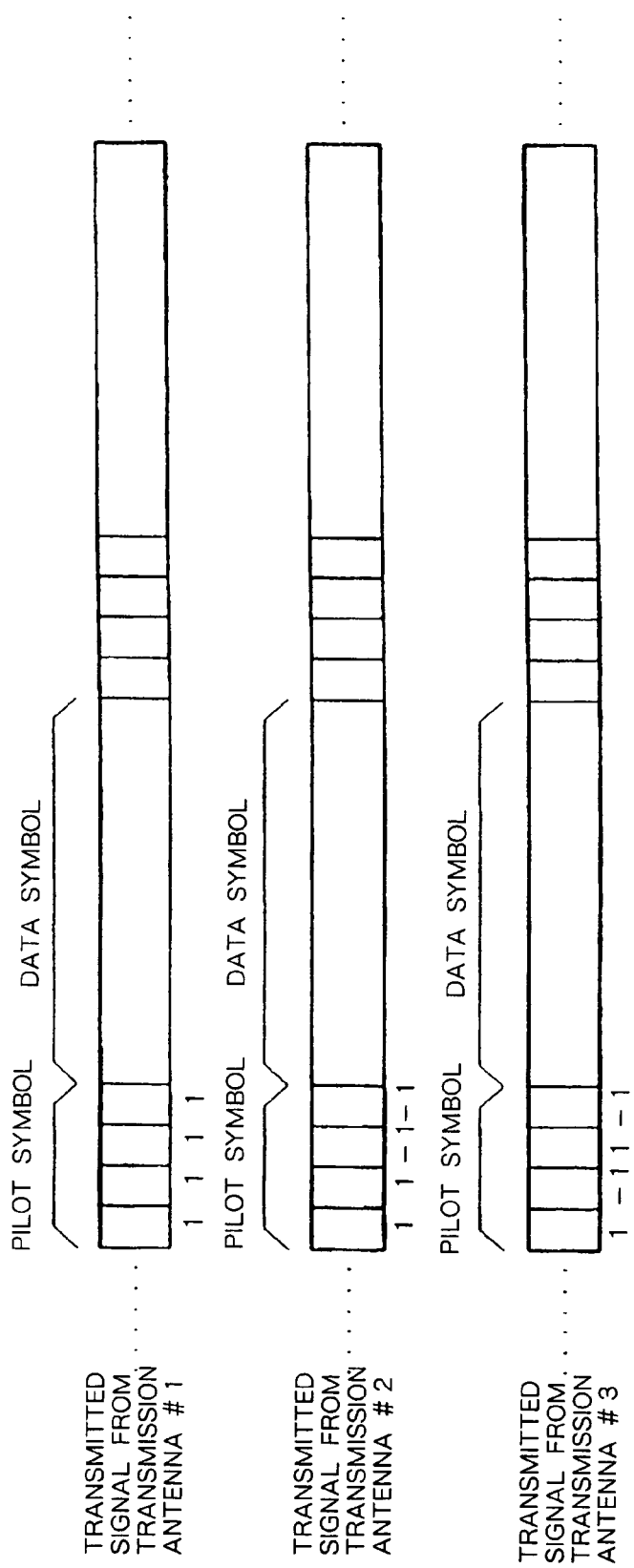
FIG. 30 is a diagram showing transmitted signal formats employed when the channel coefficient estimator shown in FIG. 29 is used.

FIG. 29 is a block diagram of a channel coefficient estimator according to an eleventh embodiment of the present invention, and FIG. 30 is a diagram showing transmitted signal formats employed when the channel coefficient estimator shown in FIG. 29 is used. As shown in FIG. 29, channel coefficient estimator 500 comprises pilot symbol replica generators 501-1-501-3, 505-1-505-3, . . . (pilot symbol replica generators 501-2, 505-2 being not shown), and correlation detectors 502-1-502-3, 506-1-506-3, . . . (correlation detectors 502-2, 506-2 being not shown).

As shown in FIG. 30, pilot symbols that are of a 4-symbol length which are different for respective transmission antennas #1-#3 are inserted periodically into data symbols by respective transmission antennas #1-#3. In the example shown in FIG. 30, the pilot symbol patterns from respective transmission antennas #1-#3 are orthogonal to each other.

Such orthogonal patterns can be generated by using a Walsh sequence having the same length as the pilot symbol number. A pilot symbol sequence of transmission antenna #m will subsequently be represented by pm(n) where n represents a symbol number.

In channel coefficient estimator 500, received signal $r_1$ is input to correlation detector 502-1. Pilot symbol replica generator 501-1 generates pilot symbol sequence $p_1$ for transmission antenna #1 (not shown) and outputs generated pilot symbol sequence $p_1$ to correlation detector 502-1.

Correlation detector 502-1 averages as many values as four pilot symbols produced by multiplying received signal $r_1$ by the complex conjugate value of pilot symbol sequence $p_1$ of transmission antenna #1, thereby estimating and outputting channel coefficient $h_{11}$ between transmission antenna #1 and reception antenna #1. Channel coefficient $h_{11}$ is estimated according to the equation:

$$h_{11} = \frac{1}{4}\sum_{n=1}^{4} r_1(n) \cdot p_1(n)^* \qquad \text{[Equation 14]}$$

where $r_1 n$ represents received signal $r_1$ at the time pilot symbol n is received. Actually, it is possible to determine channel coefficient $h_{11}$ by the weighted averaging of estimated channel coefficients obtained in a plurality of pilot symbol transmission intervals.

Similarly, correlation 502-$m$ (not shown) is supplied with received signal $r_1$ and pilot symbol sequence $p_m$ of transmission antenna #m, which is generated by pilot symbol replica generator 501-$m$ (not shown), and estimates and outputs channel coefficient $h_{1m}$.

Also similarly, correlation 506-1 is supplied with received signal $r_4$ and pilot symbol sequence $p_1$ of transmission antenna #1, which is generated by pilot symbol replica generator 505-1, and estimates and outputs channel coefficient $h_{41}$.

According to the present embodiment, the above process is repeated to estimate channel coefficients between three transmission antennas (not shown) and four reception antennas (not shown), and channel matrix H of the estimated channel coefficients is output. Though pilot symbols are time-multiplexed on data symbols in the present embodiment, they may be frequency-multiplexed or code-multiplexed or frequency- and code-multiplexed, and estimated channel coefficients may be obtained according to the same process as described above.

Embodiment 12

Figure 31:
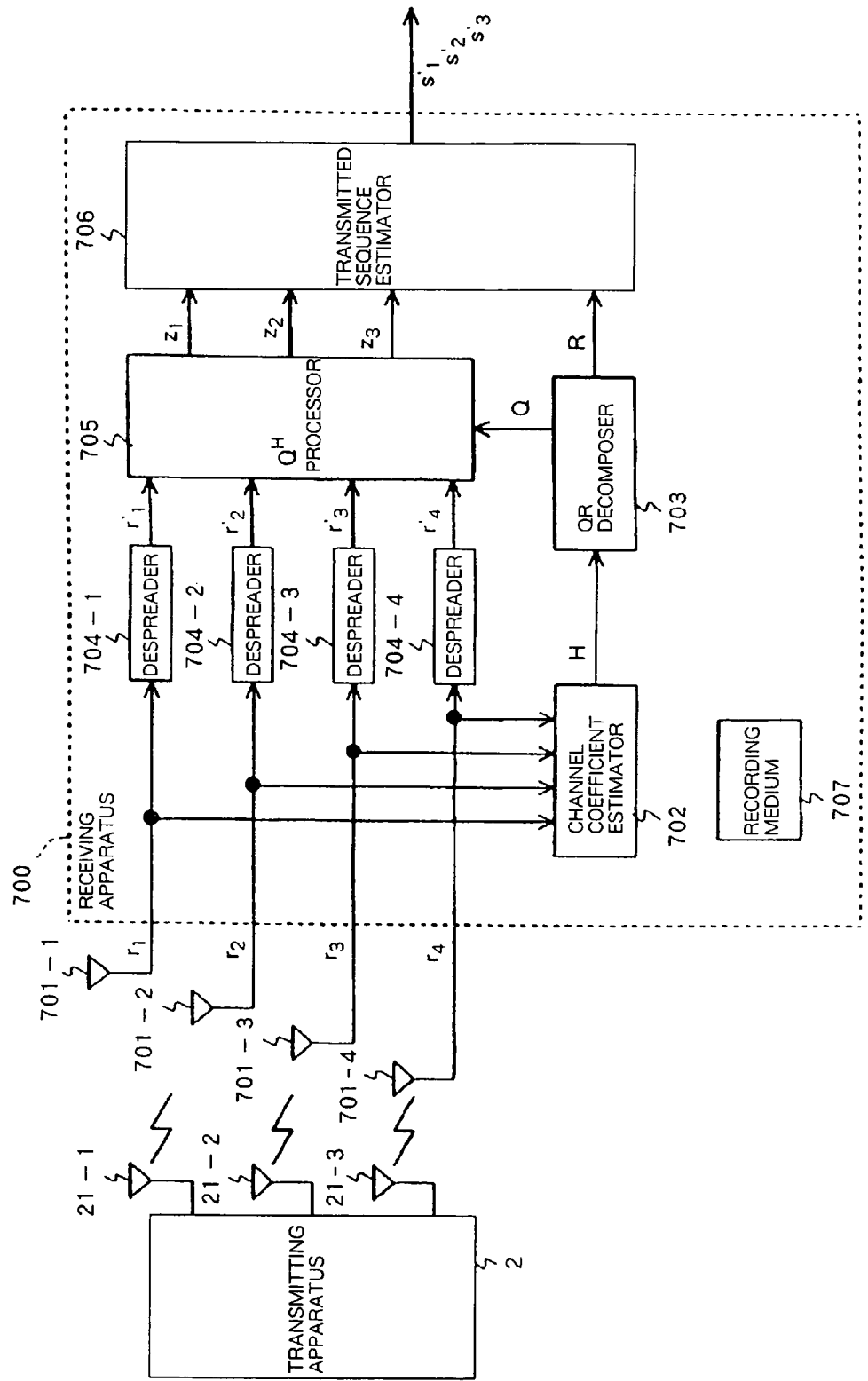
FIG. 31 is a block diagram of a receiving apparatus according to a twelfth embodiment of the present invention.
Figure 32:
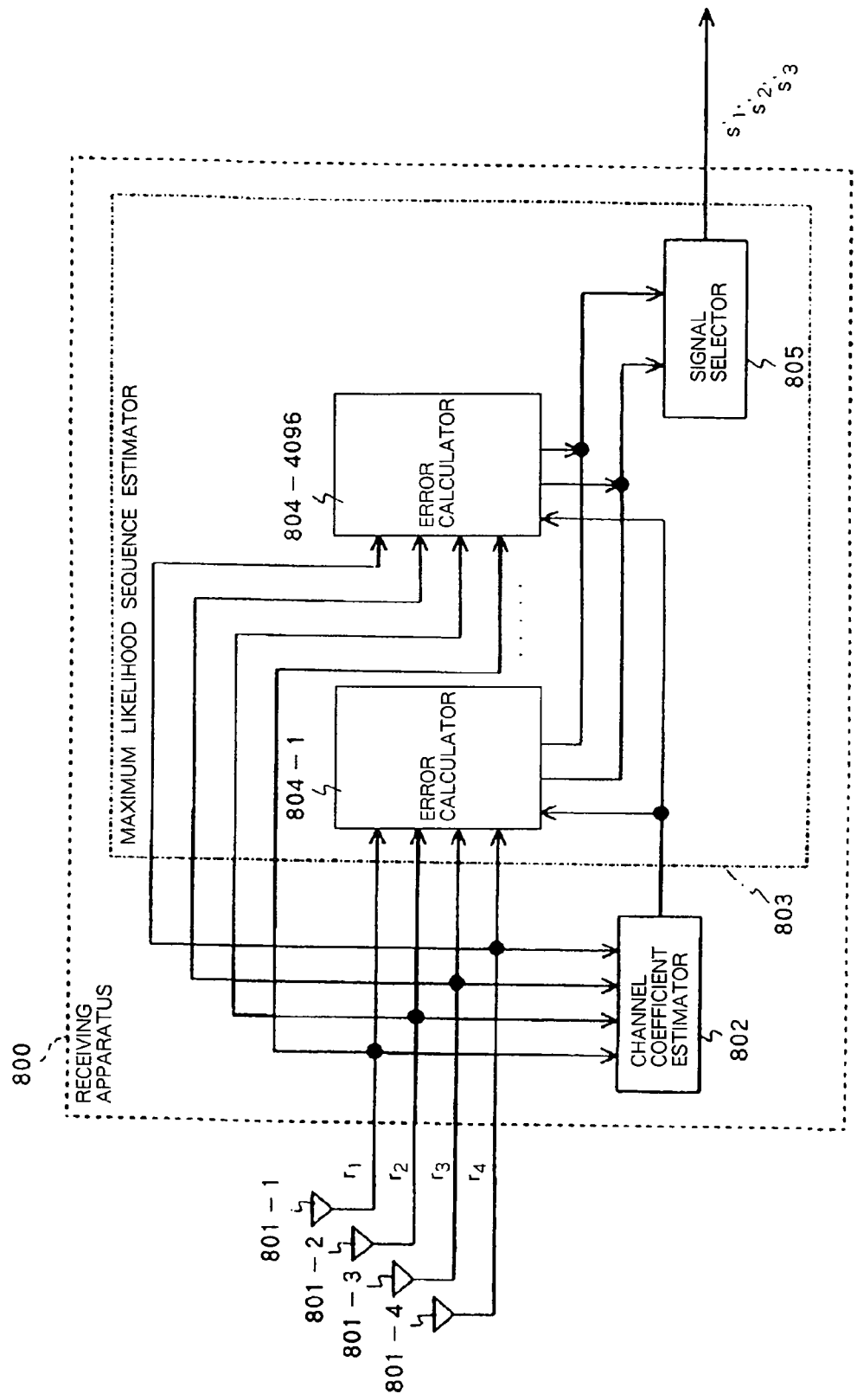
FIG. 32 is a block diagram of a conventional receiving apparatus.
Figure 33:
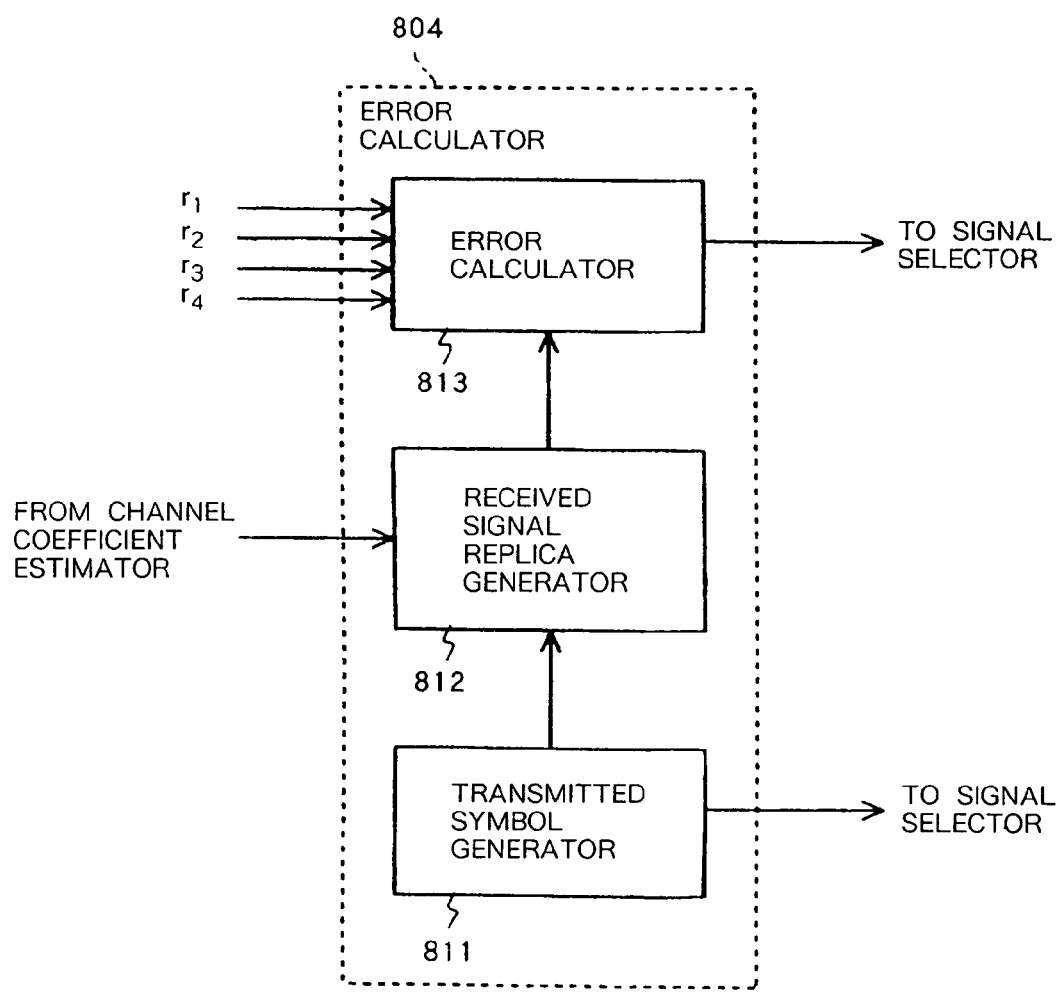
FIG. 33 is a block diagram of an error calculator shown in FIG. 32.

FIG. 31 is a block diagram of a receiving apparatus according to a twelfth embodiment of the present invention. The arrangement of a wireless communication system according to the twelfth embodiment of the present invention is the same as the arrangement of the wireless communication system according to the embodiment shown in FIG. 1 above, except that receiving apparatus 700 is provided instead of receiving apparatus 1.

In FIG. 31, receiving apparatus 700 according to the twelfth embodiment of the present invention receives signals transmitted from transmitting apparatus 2 having three transmission antennas 21-1-21-3, with four reception antennas 701-1-701-4. It is assumed that 16-valued signals $c_1$-$c_{16}$ are transmitted from each of transmission antennas 21-1-21-3.

Receiving apparatus 700 according to the twelfth embodiment of the present invention is applied to a situation where either one of transmitted signals $c_1$ through $c_{16}$ is spread in advance by a spread code.

Receiving apparatus 700 comprises four reception antennas 701-1-701-4, channel coefficient estimator 702, QR decomposer 703, four despreaders 704-1-704-4, $Q^H$ processor 705, transmitted sequence estimator 706, and recording medium 707 for storing a program (a program executable by a computer) for realizing processes in various parts of receiving apparatus 700.

Reception antennas 701-1-701-4 receive respective signals. Channel coefficient estimator 702 is supplied with received signals $r_1$-$r_4$ as its inputs, estimates channel coefficients, and outputs channel matrix H of the estimated channel coefficients. $Q^H$ processor 703 is supplied with channel matrix H as its inputs, QR decomposition on channel matrix H, and outputs a Q matrix and an R matrix.

Despreaders 704-1-704-4 are supplied with respective received signals $r_1$-$r_4$ as its inputs, despread received signals $r_1$-$r_4$ using a despread code replica which is the same as the spread code used to spread the transmitted signals in transmitting apparatus 2, and outputs despread received signals $r'_1$-$r'_4$.

$Q^H$ processor 705 performs the same processing operation as $Q^H$ processor 34 in receiving apparatus 3 according to the second embodiment of the present invention shown in FIG. 4, but differs therefrom in that it is supplied with despread received signals $r'_1$-$r'_4$ as its inputs rather than received signals $r_1$-$r_4$. $Q^H$ processor 705 multiplies despread received signals $r'_1$-$r'_4$ by the complex conjugate transposed matrix of the Q matrix, and outputs converted signal z.

Transmitted sequence estimator 706 is supplied with converted signal z and the R matrix as its inputs, performs the same processing operation as transmitted sequence estimator 4 in receiving apparatus 3 according to the second embodiment of the present invention shown in FIG. 4, and outputs estimated transmitted sequences $s'_1$, $s'_2$, $s'_3$. According to the present embodiment, the above arrangement is effective to reduce the amount of processing operation in transmitted sequence estimator 706 to 1/spreading ratio as compared with the estimation of transmitted sequences.

Embodiment 13

Figure 34:
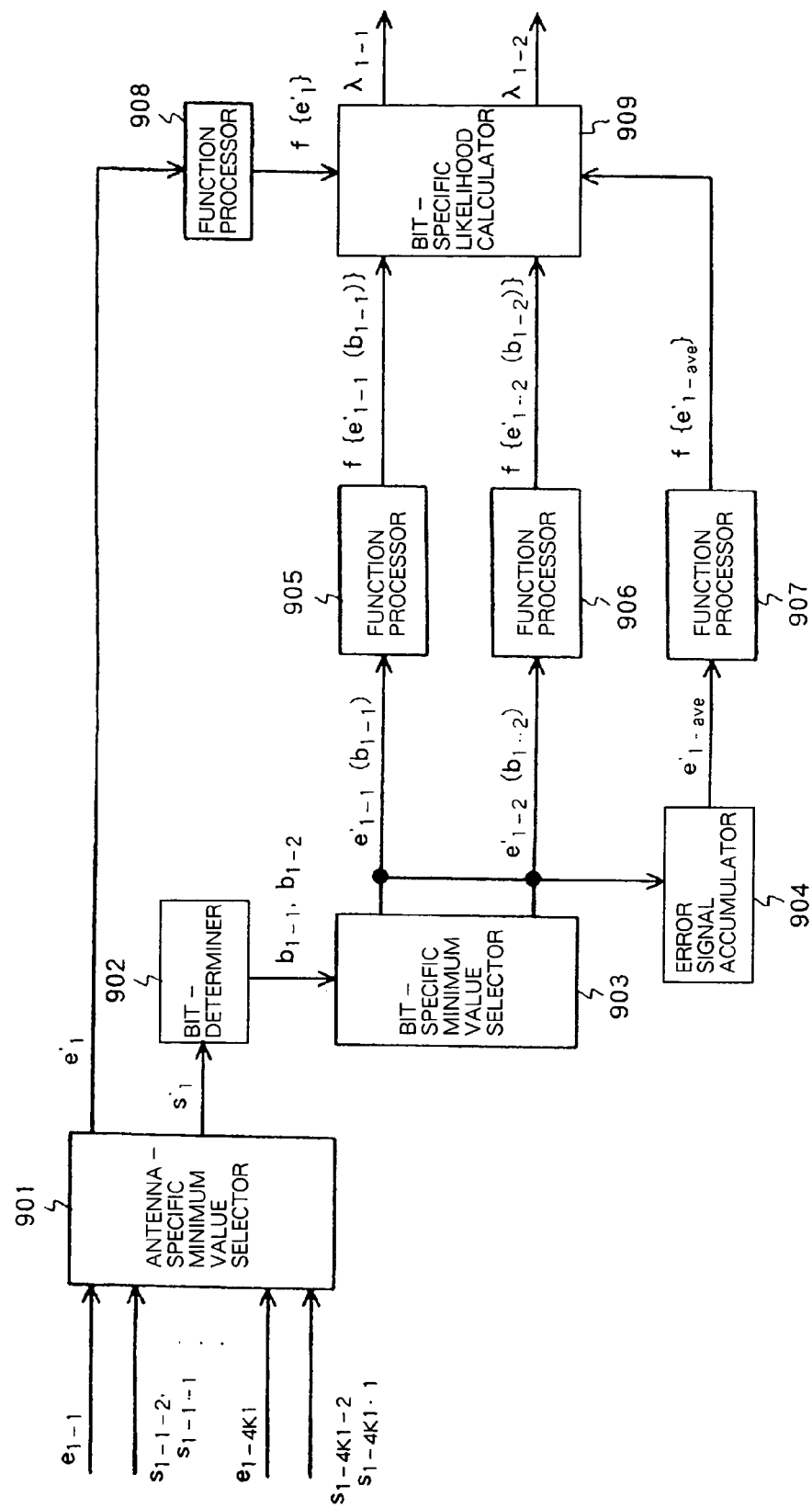
FIG. 34 is a block diagram of a signal selector according to a thirteenth embodiment of the present invention.

FIG. 34 is a block diagram of a signal selector according to a thirteenth embodiment of the present invention. Only a bit likelihood outputting apparatus for transmission antenna 1 is described. In FIG. 34, function processors 905-908 perform a given processing operation on the error signals (squared Euclidean distances) that are output respectively from antenna-specific minimum value selector 901, bit-specific minimum value selector 903, and error signal accumulator 904 for thereby converting the error signals. For example, if the processing operation is to find the square root, then a squared Euclidean distance is converted to a Euclidean distance.

If the function operator is defined as $f\{\cdot\}$, then the likelihood of a jth bit of transmission antenna I is determined by the equations:

$$\lambda_{i,j} = f\{e'_{i,j}(\overline{b}_{i,j})\} - f\{e'_1\} \text{ (when } b_{i,j}=0) \qquad \text{[Equation 15]}$$

(when $b_{i,j}=0$)

$$\lambda_{i,j} = f\{e'_1\} - f\{e'_{i,j}(\overline{b}_{i,j})\} \text{ (when } b_{i,j}=1) \qquad \text{[Equation 16]}$$

(when $b_{i,j}=1$)

If the processing operation is to find the square root, then the likelihood is determined by the equations:

$$\lambda_{i,j} = \sqrt{e'_{i,j}(\overline{b}_{i,j})} - \sqrt{e'_1} \text{ (when } b_{i,j}=0) \qquad \text{[Equation 17]}$$

(when $b_{i,j}=0$)

$$\lambda_{i,j} = \sqrt{e'_1} - \sqrt{e'_{i,j}(\overline{b}_{i,j})} \text{ (when } b_{i,j}=1) \qquad \text{[Equation 18]}$$

(when $b_{i,j}=1$)

Embodiment 14

According to the tenth embodiment of the present invention, the signal selector with the bit likelihood outputting function has been described to solve the problem caused when all symbol candidates for inverted bits are deleted. If a signal selector with a bit likelihood outputting function is used, then signals can be demodulated by an arrangement to be described below.

Figure 35:
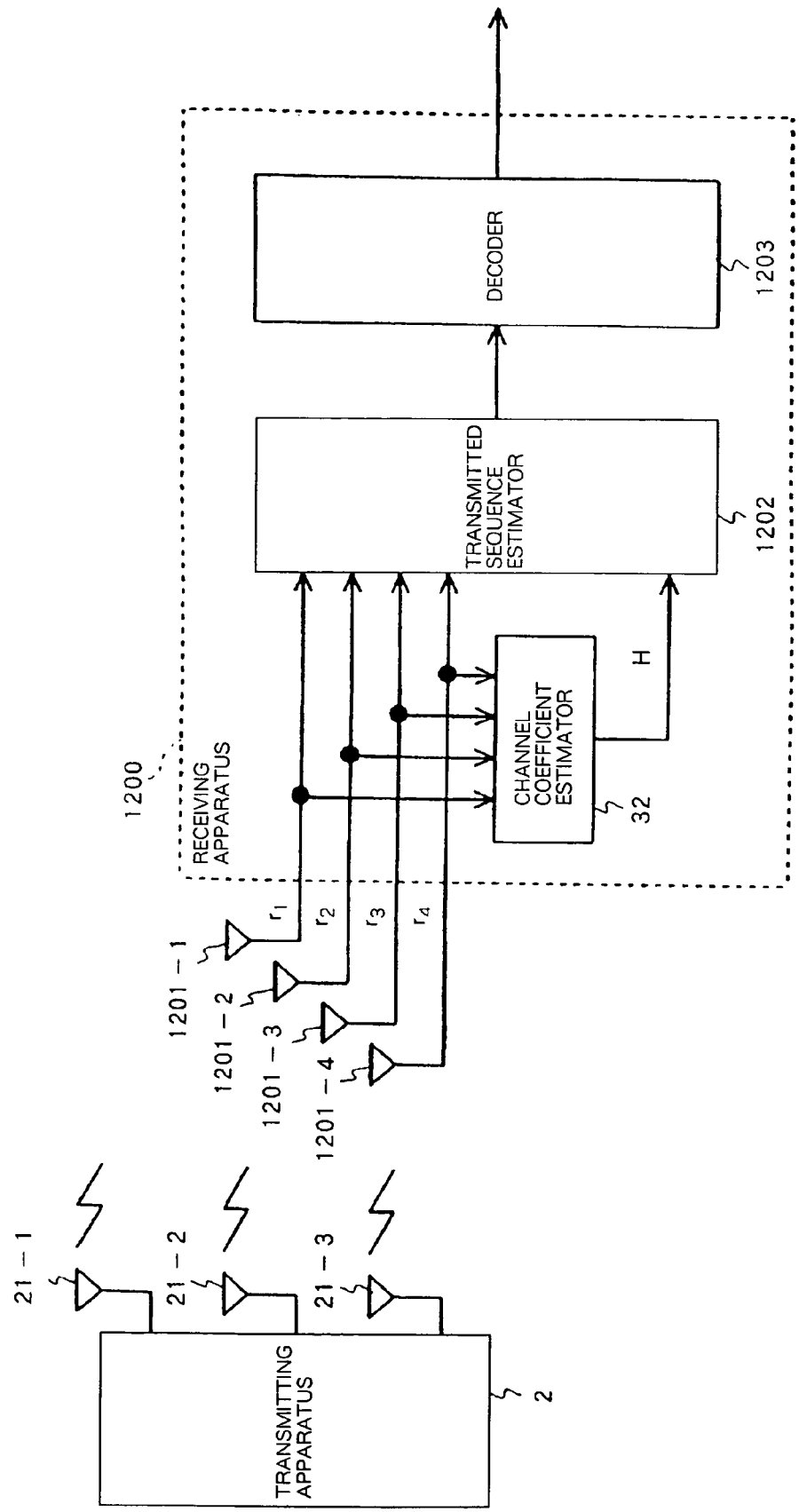
FIG. 35 is a block diagram of a signal selector according to a fourteenth embodiment of the present invention.

FIG. 35 is a block diagram of a signal selector according to a fourteenth embodiment of the present invention. According to the present embodiment, it is assumed that each transmitted signal takes an either one of 16 values. In FIG. 35, receiving apparatus 1200 has four reception antennas for receiving signals $r_1, r_2, r_3, r_4$, respectively. Channel coefficient estimator 32 estimates and outputs channels between the transmission antennas. Transmitted sequence estimator 1202 estimates transmitted sequences and outputs a bit likelihood ratio. Decoder 1203 decodes and outputs transmitted sequences.

Figure 36:
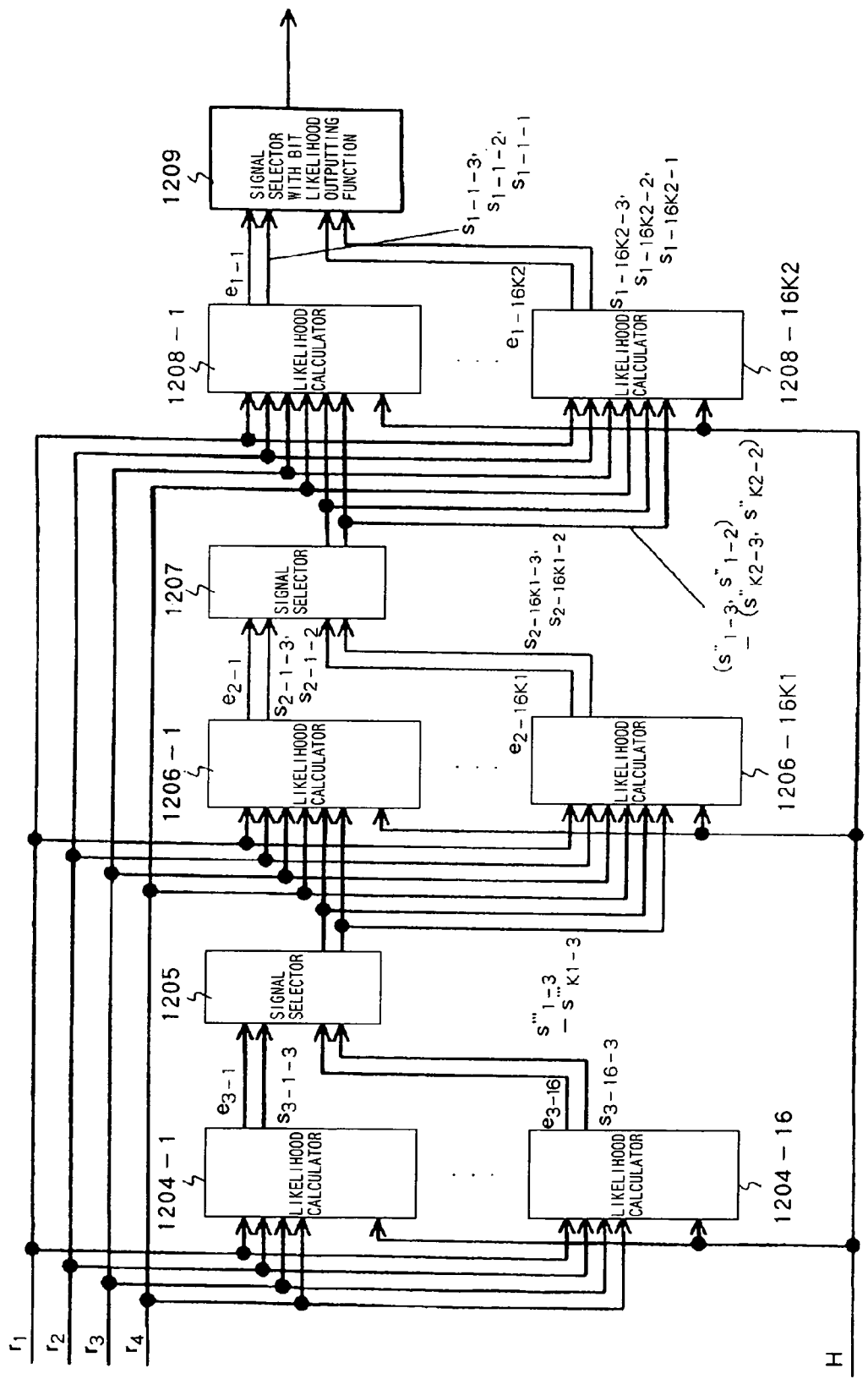
FIG. 36 is a block diagram of a transmitted sequence estimator shown in FIG. 35.

FIG. 36 is a block diagram of transmitted sequence estimator 1202 shown in FIG. 35. Transmitted sequence estimator 1202 will be described below with reference to FIG. 36. In FIG. 36, transmitted sequence estimator 1202 comprises three-stage likelihood calculator groups and three-stage signal selectors, like FIG. 5. Unlike FIG. 5, however, likelihood calculators 1204-1-1204-16, 1206-1-1206-16K1, 1208-1-1208-16K2 are supplied with received signals and estimated channels as their inputs, and signal selector 1209 in the third stage has a bit likelihood outputting function.

Likelihood calculator 1204-1 is supplied with received signals $r_1$-$r_4$ and channel matrix H as its inputs, and calculates and outputs error signal $e_{3\_1}$ as follows:

$$e_{3\_1} = \sum_{i=1}^{4} |r_i - h_{i3} \cdot S_3|^2 \qquad \text{[Equation 19]}$$

where $S_3$ represents a symbol candidate for a signal transmitted from the third transmission antenna.

Similarly, likelihood calculators 1204-2-1204-16 calculate and output error signals. Signal selector 1205 selects K1 error signals of a smallest error from the calculated error signals, and outputs a symbol candidate which gives the error.

Likelihood calculator 1206-1 calculates error signal $e_{2\_1}$, using received signals $r_1$-$r_4$ and the symbol candidate selected by signal selector 1205, as follows:

$$e_{2\_1} = \sum_{i=1}^{4} |r_i - h_{i3} \cdot S'''_{1\_3} - h_{i2} \cdot S_2|^2 \qquad \text{[Equation 20]}$$

where $S'''_{1\_3}$ represents a first candidate for a signal transmitted from the third transmission antenna which is selected by signal selector 1205, and $S_2$ a signal transmitted from the second transmission antenna.

Similarly, likelihood calculators 1206-2-1206-16K1 calculate error signals, and output calculated errors and symbol candidates which give the errors. Signal selector 1207 is supplied with the 16K1 error signals and the symbol candidates which have been calculated by likelihood calculators 1206-2-1206-16K1 as its inputs, and outputs smallest K2 symbol candidate sets $(S''_{1\_3} S''_{1\_2})$-$(S''_{K2\_3} S''_{K2\_2})$.

Likelihood calculator 1208-1 calculates error signal $e_{1\_1}$, using received signals $r_1$-$r_4$ and the symbol candidate selected by signal selector 1207, as follows:

$$e_{1\_1} = \sum_{i=1}^{4} |r_i - h_{i1} \cdot S_1 - h_{i2} \cdot S''_{1\_2} - h_{i3} \cdot S''_{1\_3}|^2 \qquad \text{[Equation 21]}$$

where $S''_{1\_3}$, $S''_{1\_2}$ represent first candidates for signals transmitted from the third and second transmission antennas which are selected by signal selector 1207, and $S_1$ a signal transmitted from the first transmission antenna.

Similarly, likelihood calculators 1208-2-1208-16K2 calculate error signals, and output calculated errors and symbol candidates which give the errors. The number of error signals and symbol candidates output from the likelihood calculator group in the third stage is 16K2. Therefore, depending on how K1 and K2 are set, inverted bit metrics may not be calculated due to a reduction of symbol candidates, as described above with respect to the tenth embodiment of the present invention.

Signal selector 1209 with the bit likelihood outputting function calculates and outputs likelihoods for all bits through the same calculations as those described in the tenth embodiment of the present invention. According to the present embodiment, as described above, transmitted sequence estimator 1202 having signal selector 1209 with the bit likelihood outputting function makes it possible to demodulate signals from received signals and a channel matrix.

The invention claimed is:

1. A wireless communication system for receiving and demodulating transmitted signals from a transmitting apparatus having M (M is an integer of 2 or greater) transmission antennas, with a receiving apparatus having N (N is an integer of 2 or greater), said receiving apparatus comprising:
   means for performing nulling representative of orthogonalization of the received signals, using a channel matrix having as elements channel coefficients between said reception antennas and said transmission antennas;
   means for outputting a likelihood for bits of said transmitted signals based on the nulled signals;
   wherein said means for performing nulling uses a complex conjugate transposed matrix of a Q matrix produced by QR-decomposing the channel matrix as nulling.

2. A wireless communication system for receiving and demodulating transmitted signals from a transmitting apparatus having M (M is an integer of 2 or greater) transmission antennas, with a receiving apparatus having N (N is an integer of 2 or greater), said receiving apparatus comprising:
   means for performing nulling representative of orthogonalization of the received signals, using a channel matrix having as elements channel coefficients between said reception antennas and said transmission antennas; and
   means for outputting a likelihood for bits of said transmitted signals based on the nulled signals;
   wherein said transmitted signals are demodulated in a descending order from a transmitted sequence transmitted from an Mth transmitted antenna to a transmitted sequence transmitted from a first transmitted antenna, based on the nulled signals.

3. A wireless communication system for receiving and demodulating transmitted signals from a transmitting apparatus having M (M is an integer of 2 or greater) transmission antennas, with a receiving apparatus having N (N is an integer of 2 or greater), said receiving apparatus comprising:

means for performing nulling representative of orthogonalization of the received signals, using a channel matrix having as elements channel coefficients between said reception antennas and said transmission antennas;

means for outputting a likelihood for bits of said transmitted signals based on the nulled signals;

a channel coefficient estimator for estimating and outputting said channel coefficients between said between said reception antennas and said transmission antennas based on said received signals;

a QR decomposer for performing QR decomposition on the channel matrix of said channel coefficients and outputting a Q matrix and an R matrix;

a QH processor for multiplying a received signal vector having said received signals as elements by a complex conjugate transposed matrix of said Q matrix and outputting the product as a converted signal; and a transmitted sequence estimator for outputting at least one of a transmitted sequence, a likelihood for said transmitted sequence, and a likelihood for bits transmitted by said transmitted sequence, based on said converted signal and said R matrix.

4. A wireless communication system according to claim 3, wherein said transmitted sequence estimator includes likelihood calculator groups and signal selectors in P stages (P is an integer of 1 or greater);

a likelihood calculator group in a pth (p is an integer ranging from 1 to P) stage comprising Kp (Kp is an integer of 1 or greater) likelihood calculators;

each of said likelihood calculators calculating a likelihood in the pth stage and generating said transmitted symbol candidates based on the converted signal, said R matrix, Lp−1 (Lp−1 is an integer of 1 or greater) error signals output from a signal selector in a (p−1)th stage, and the transmitted symbol candidates; and a signal selector in the pth stage outputting Lp (Lp is an integer of 1 or greater) maximum likelihoods and Lp transmitted symbol candidates which give the likelihoods, based on Kp likelihoods output from the likelihood calculator group in the pth stage and said transmitted symbol candidates.

5. A wireless communication system according to claim 4, wherein data sequences transmitted from M transmission antennas are modulated respectively by independent modulating processes, and said modulating processes have respective different numbers of signal points, and said signal selector determines the number of error signals and transmitted symbol candidates which are output depending on the modulating process for the transmission antenna to be processed by a likelihood calculator in a next stage.

6. A wireless communication system according to claim 3, wherein said transmitted sequence estimator includes likelihood calculator groups and signal selectors in P stages (P is an integer of 1 or greater);

a likelihood calculator group in a pth (p is an integer ranging from 1 to P) stage comprising Kp (Kp is an integer of 1 or greater) likelihood calculators;

each of said likelihood calculators calculating a likelihood in the pth stage and generating said transmitted symbol candidates based on the converted signal, said R matrix, Kp−1 (Kp−1 is an integer of 1 or greater) error signals output from a signal selector in a (p−1)th stage, and the transmitted symbol candidates; and a signal selector in the pth stage outputting Kp+1 maximum likelihoods and Kp+1 transmitted symbol candidates which give the likelihoods, based on Kp likelihoods output from the likelihood calculator group in the pth stage and said transmitted symbol candidates.

7. A wireless communication system according to claim 3, wherein said transmitted sequence estimator comprises likelihood calculator groups in M stages (M is an integer of 2 or greater) and signal selector groups in the M stages.

8. A wireless communication system according to claim 3, wherein said transmitted sequence estimator comprises likelihood calculator groups in N stages (N is an integer of 2 or greater) and signal selector groups in M stages.

9. A wireless communication system according to claim 3, wherein said transmitted sequence estimator includes signal selectors in a plurality of stages, and a signal selector in a final stage selects and outputs a most likely transmitted sequence.

10. A wireless communication system according to claim 3, wherein said transmitted sequence estimator includes signal selectors in a plurality of stages, and a signal selector in a final stage selects a most likely transmitted sequence and outputs a likelihood for said sequence.

11. A wireless communication system according to claim 3, wherein said transmitted sequence estimator includes signal selectors in a plurality of stages, and a signal selector in a final stage selects a most likely transmitted sequence and outputs a likelihood for a bit sequence transmitted by said sequence.

12. A wireless communication system according to claim 3, wherein said transmitted sequence estimator includes a likelihood calculator for generating a converted signal replica using elements of said R matrix and calculating the likelihood using a physical quantity measured from said converted signal replica and said received signals.

13. A wireless communication system according to claim 12, wherein said likelihood calculator calculates the likelihood using a squared Euclidean distance between said received signals and said converted signal replica.

14. A wireless communication system according to claim 12, wherein said likelihood calculator calculates the likelihood using a Euclidean distance converted by performing a given processing operation on a squared Euclidean distance between said received signals and said converted signal replica.

15. A wireless communication system according to claim 3, wherein said transmitted sequence estimator includes a likelihood calculator for calculating the likelihood using the difference between a squared Euclidean distance between a converted signal replica at a bit 0 and the received signals and a squared Euclidean distance between a converted signal replica at a bit 1 and the received signals.

16. A wireless communication system according to claim 15, wherein said transmitted sequence estimator includes an accumulator for accumulating a first squared Euclidean distance between a converted signal replica at a bit 0 and the received signals and a second squared Euclidean distance between a converted signal replica at a bit 1 and the received signals, and outputting a provisional squared Euclidean distance based on the accumulated squared Euclidean distances; and wherein said likelihood calculator calculates the likelihood using said provisional squared Euclidean distance if either one of said first and second squared Euclidean distances is not output.

17. A wireless communication system according to claim 15, wherein said squared Euclidean distance is replaced with a Euclidean distance which is converted by performing a given functional operation on said squared Euclidean distance.

18. A wireless communication system according to claim 3, wherein said channel coefficient estimator estimates, in the transmitting apparatus having the M (M is an integer of 2 or greater) transmission antennas, the channel coefficients using pilot symbols periodically transmitted according to a symbol pattern inherent in each of the transmission antennas and known to the receiving apparatus.

19. A wireless communication system according to claim 3, wherein said transmitting apparatus spreads in advance and then transmits the transmitted signals, and said QH processor multiplies the received signal vector having said received signals after being despread as elements by the complex conjugate transposed matrix of said Q matrix and outputs the product as the converted signal.

20. A wireless communication system for receiving and demodulating transmitted signals from a transmitting apparatus having M (M is an integer of 2 or greater) transmission antennas, with a receiving apparatus having N (N is an integer of 2 or greater), said receiving apparatus comprising:
   means for performing nulling representative of orthogonalization of the received signals, using a channel matrix having as elements channel coefficients between said reception antennas and said transmission antennas;
   means for outputting a likelihood for bits of said transmitted signals based on the nulled signals;
   a channel coefficient estimator for estimating and outputting said channel coefficients between said between said reception antennas and said transmission antennas based on said received signals;
   a QR decomposer for performing QR decomposition on the channel matrix of said channel coefficients and outputting a Q matrix and an R matrix;
   a QH processor for multiplying a received signal vector having said received signals as elements by a complex conjugate transposed matrix of said Q matrix and outputting the product as a converted signal;
   a transmitted symbol candidate selector for selecting and outputting a symbol candidate for said converted signal based on said received signals; and
   a transmitted sequence estimator for outputting at least one of a transmitted sequence, a likelihood for said transmitted sequence, and a likelihood for bits transmitted by said transmitted sequence, based on said converted signal, said symbol candidate, and said R matrix.

21. A wireless communication system according to claim 20, wherein said transmitted symbol candidate selector employs a linear filter.

22. A wireless communication system according to claim 20, wherein said transmitted symbol candidate selector employs maximum likelihood estimation.

23. A wireless communication system for receiving and demodulating transmitted signals from a transmitting apparatus having M (M is an integer of 2 or greater) transmission antennas, with a receiving apparatus having N (N is an integer of 2 or greater), said receiving apparatus comprising:
   means for performing nulling representative of orthogonalization of the received signals, using a channel matrix having as elements channel coefficients between said reception antennas and said transmission antennas;
   means for outputting a likelihood for bits of said transmitted signals based on the nulled signals,
   a channel coefficient estimator for estimating and outputting said channel coefficients between said between said reception antennas and said transmission antennas based on said received signals;
   a priority determiner for determining priorities between transmission sequences transmitted from said transmission antennas based on said received signals;
   a sorter for sorting said channel coefficients based on the channel coefficients estimated by said channel coefficient estimator and the priorities determined by said priority determiner, and outputting a modified channel matrix;
   a QR decomposer for performing QR decomposition on said modified channel matrix and outputting a Q matrix and an R matrix;
   a QH processor for multiplying a received signal vector having said received signals as elements by a complex conjugate transposed matrix of said Q matrix and outputting the product as a converted signal;
   a transmitted sequence estimator for outputting at least one of a transmitted sequence, a likelihood for said transmitted sequence, and a likelihood for bits transmitted by said transmitted sequence, based on said converted signal and said R matrix; and
   a restorer for restoring and outputting at least one of said transmitted sequence, the likelihood for said transmitted sequence, and the likelihood for bits transmitted by said transmitted sequence, based on the output from said transmitted sequence estimator and said priorities.

24. A wireless communication system according to claim 23, wherein said priority determiner employs received electric power of each of said transmitted sequences.

25. A wireless communication system according to claim 23, wherein said priority determiner employs a received electric power vs. noise electric power ratio of each of said transmitted sequences.

26. A wireless communication system according to claim 23, wherein said priority determiner employs a received electric power vs. noise electric power ratio and an interference electric power ratio of each of said transmitted sequences.

27. A wireless communication system according to claim 23, wherein data sequences transmitted from M transmission antennas are modulated respectively by independent modulating processes, and said modulating processes have respective different numbers of signal points, and said priority determiner determines said priorities based on said modulating processes for the respective transmission antennas.

28. A wireless communication system according to claim 27, wherein a priority is given to an antenna which has sequences of a lower modulation multi-valued number among said transmission antennas.

29. A wireless communication system according to claim 23, wherein data sequences transmitted from M transmission antennas are modulated respectively by independent modulating processes, and said modulating processes have respective independent coding ratios, and said priority determiner determines said priorities based on the coding ratios for the respective transmission antennas.

30. A wireless communication system for receiving and demodulating transmitted signals from a transmitting apparatus having M (M is an integer of 2 or greater) transmission antennas, with a receiving apparatus having N (N is an integer of 2 or greater), said receiving apparatus comprising:
   means for performing nulling representative of orthogonalization of the received signals, using a channel matrix having as elements channel coefficients between said reception antennas and said transmission antennas;
   means for outputting a likelihood for bits of said transmitted signals based on the nulled signals,
   a channel coefficient estimator for estimating and outputting said channel coefficients between said between said reception antennas and said transmission antennas based on said received signals;

a QR decomposer for performing QR decomposition on the channel matrix of said channel coefficients and outputting a Q matrix and an R matrix;

a QH processor for multiplying a received signal vector having said received signals as elements by a complex conjugate transposed matrix of said Q matrix and outputting the product as a converted signal;

a transmitted sequence candidate selector for determining candidate sequences for L (L is an integer ranging from 1 to M) converted signals based on said received signals and outputting the determined candidate sequences as transmitted sequence candidates; and a transmitted sequence estimator for outputting at least one of a transmitted sequence, a likelihood for said transmitted sequence, and a likelihood for bits transmitted by said transmitted sequence, based on said converted signal, said R matrix, and said transmitted sequence candidates.

31. A wireless communication system according to claim 30, wherein said transmitted sequence candidate selector employs a linear filter.

32. A wireless communication system according to claim 30, wherein said transmitted sequence candidate selector employs maximum likelihood estimation.

33. A wireless communication system for receiving and demodulating transmitted signals from a transmitting apparatus having M (M is an integer of 2 or greater) transmission antennas, with a receiving apparatus having N (N is an integer of 2 or greater), said receiving apparatus comprising:

means for performing nulling representative of orthogonalization of the received signals, using a channel matrix having as elements channel coefficients between said reception antennas and said transmission antennas;

means for outputting a likelihood for bits of said transmitted signals based on the nulled signals, a channel coefficient estimator for estimating and outputting said channel coefficients between said between said reception antennas and said transmission antennas based on said received signals;

a priority determiner for determining priorities between transmission sequences transmitted from said transmission antennas based on said received signals;

a sorter for sorting said channel coefficients based on the channel coefficients estimated by said channel coefficient estimator and the priorities determined by said priority determiner, and outputting a modified channel matrix;

a QR decomposer for performing QR decomposition on said modified channel matrix and outputting a Q matrix and an R matrix;

a QH processor for multiplying a received signal vector having said received signals as elements by a complex conjugate transposed matrix of said Q matrix and outputting the product as a converted signal;

a transmitted symbol candidate selector for selecting a symbol candidate for a demodulated sequence based on said received signals, and outputting a transmitted symbol candidate;

a transmitted sequence estimator for outputting at least one of a transmitted sequence, a likelihood for said transmitted sequence, and a likelihood for bits transmitted by said transmitted sequence, based on said converted signal, said R matrix, and said transmitted symbol candidate; and a restorer for restoring and outputting at least one of said transmitted sequence, the likelihood for said transmitted sequence, and the likelihood for bits transmitted by said transmitted sequence, based on the output from said transmitted sequence estimator and said priorities.

34. A wireless communication system for receiving and demodulating transmitted signals from a transmitting apparatus having M (M is an integer of 2 or greater) transmission antennas, with a receiving apparatus having N (N is an integer of 2 or greater), said receiving apparatus comprising:

means for performing nulling representative of orthogonalization of the received signals, using a channel matrix having as elements channel coefficients between said reception antennas and said transmission antennas;

means for outputting a likelihood for bits of said transmitted signals based on the nulled signals, a channel coefficient estimator for estimating and outputting said channel coefficients between said between said reception antennas and said transmission antennas based on said received signals;

a priority determiner for determining priorities between transmission sequences transmitted from said transmission antennas based on said received signals;

a sorter for sorting said channel coefficients based on the channel coefficients estimated by said channel coefficient estimator and the priorities determined by said priority determiner, and outputting a modified channel matrix;

a QR decomposer for performing QR decomposition on said modified channel matrix and outputting a Q matrix and an R matrix;

a QH processor for multiplying a received signal vector having said received signals as elements by a complex conjugate transposed matrix of said Q matrix and outputting the product as a converted signal;

a transmitted sequence candidate selector for determining candidate sequences for L (L is an integer ranging from 1 to M) converted signals based on said received signals and outputting the determined candidate sequences as transmitted sequence candidates;

a transmitted sequence estimator for outputting at least one of a transmitted sequence, a likelihood for said transmitted sequence, and a likelihood for bits transmitted by said transmitted sequence, based on said converted signal, said R matrix, and said transmitted sequence candidates; and a restorer for restoring and outputting at least one of said transmitted sequence, the likelihood for said transmitted sequence, and the likelihood for bits transmitted by said transmitted sequence, based on the output from said transmitted sequence estimator and said priorities.

35. A wireless communication system for receiving and demodulating transmitted signals from a transmitting apparatus having M (M is an integer of 2 or greater) transmission antennas, with a receiving apparatus having N (N is an integer of 2 or greater), said receiving apparatus comprising:

means for performing nulling representative of orthogonalization of the received signals, using a channel matrix having as elements channel coefficients between said reception antennas and said transmission antennas;

means for outputting a likelihood for bits of said transmitted signals based on the nulled signals, a channel coefficient estimator for estimating and outputting said channel coefficients between said between said reception antennas and said transmission antennas based on said received signals;

a QR decomposer for performing QR decomposition on the channel matrix of said channel coefficients and outputting a Q matrix and an R matrix;

a QH processor for multiplying a received signal vector having said received signals as elements by a complex conjugate transposed matrix of said Q matrix and outputting the product as a converted signal;

a transmitted sequence candidate selector for determining candidate sequences for L (L is an integer ranging from 1 to M) converted signals based on said received signals and outputting the determined candidate sequences as transmitted sequence candidates;

a transmitted symbol candidate selector for selecting and outputting symbol candidates for (M−L) demodulated signals based on said received signals; and a transmitted sequence estimator for outputting at least one of a transmitted sequence, a likelihood for said transmitted sequence, and a likelihood for bits transmitted by said transmitted sequence, based on said converted signal, said R matrix, said transmitted sequence candidates, and said symbol candidates.

36. A wireless communication system for receiving and demodulating transmitted signals from a transmitting apparatus having M (M is an integer of 2 or greater) transmission antennas, with a receiving apparatus having N (N is an integer of 2 or greater), said receiving apparatus comprising:

means for performing nulling representative of orthogonalization of the received signals, using a channel matrix having as elements channel coefficients between said reception antennas and said transmission antennas;

means for outputting a likelihood for bits of said transmitted signals based on the nulled signals, a channel coefficient estimator for estimating and outputting said channel coefficients between said between said reception antennas and said transmission antennas based on said received signals;

a priority determiner for determining priorities between transmission sequences transmitted from said transmission antennas based on said received signals;

a sorter for sorting said channel coefficients based on the channel coefficients estimated by said channel coefficient estimator and the priorities determined by said priority determiner, and outputting a modified channel matrix;

a QR decomposer for performing QR decomposition on said modified channel matrix and outputting a Q matrix and an R matrix;

a QH processor for multiplying a received signal vector having said received signals as elements by a complex conjugate transposed matrix of said Q matrix and outputting the product as a converted signal;

a transmitted sequence candidate selector for determining candidate sequences for L (L is an integer ranging from 1 to M) converted signals based on said received signals and outputting the determined candidate sequences as transmitted sequence candidates;

a transmitted symbol candidate selector for selecting and outputting symbol candidates for (M−L) converted signals based on said received signals;

a transmitted sequence estimator for outputting at least one of a transmitted sequence, a likelihood for said transmitted sequence, and a likelihood for bits transmitted by said transmitted sequence, based on said converted signal, said R matrix, and said symbol candidates; and a restorer for restoring and outputting at least one of said transmitted sequence, the likelihood for said transmitted sequence, and the likelihood for bits transmitted by said transmitted sequence, based on the output from said transmitted sequence estimator and said priorities.

37. A wireless communication system for receiving and demodulating transmitted signals from a transmitting apparatus having M (M is an integer of 2 or greater) transmission antennas, with a receiving apparatus having N (N is an integer of 2 or greater), said receiving apparatus comprising:

an accumulator for accumulating a first squared Euclidean distance at a bit 0 and a second squared Euclidean distance at a bit 1, and outputting a provisional squared Euclidean distance based on the accumulated squared Euclidean distances; and means for calculating a likelihood using said provisional squared Euclidean distance if either one of said first and second squared Euclidean distances is not output.

38. A wireless communication system according to claim 37, wherein said squared Euclidean distance is replaced with a Euclidean distance which is converted by performing a given functional operation on said squared Euclidean distance.

39. A receiving apparatus having N (N is an integer of 2 or greater) reception antennas in a wireless communication system for receiving and demodulating transmitted signals from a transmitting apparatus having M (M is an integer of 2 or greater) transmission antennas, said receiving apparatus comprising:

means for performing nulling representative of the received signals, using a channel matrix having as elements channel coefficients between said reception antennas and said transmission antennas; and means for demodulating said transmitted signals based on the nulled signals, wherein said means for performing nulling uses a complex conjugate transposed matrix of a Q matrix produced by QR-decomposing the channel matrix as nulling.

40. A receiving apparatus having N (N is an integer of 2 or greater) reception antennas in a wireless communication system for receiving and demodulating transmitted signals from a transmitting apparatus having M (M is an integer of 2 or greater) transmission antennas, said receiving apparatus comprising:

means for performing nulling representative of the received signals, using a channel matrix having as elements channel coefficients between said reception antennas and said transmission antennas; and means for demodulating said transmitted signals based on the nulled signals, wherein said transmitted signals are demodulated in a descending order from a transmitted sequence transmitted from an Mth transmitted antenna to a transmitted sequence transmitted from a first transmitted antenna, based on the nulled signals.

41. A receiving apparatus according to claim 39, wherein data sequences transmitted from M transmission antennas are modulated respectively by independent modulating processes, and said modulating processes have respective independent coding ratios, and said priority determiner determines said priorities based on the coding ratios for the respective transmission antennas.

42. A receiving apparatus having N (N is an integer of 2 or greater) reception antennas in a wireless communication system for receiving and demodulating transmitted signals from a transmitting apparatus having M (M is an integer of 2 or greater) transmission antennas, said receiving apparatus comprising:

means for performing nulling representative of the received signals, using a channel matrix having as elements channel coefficients between said reception antennas and said transmission antennas;
means for demodulating said transmitted signals based on the nulled signals,
a channel coefficient estimator for estimating and outputting said channel coefficients between said between said reception antennas and said transmission antennas based on said received signals;
a QR decomposer for performing QR decomposition on the channel matrix of said channel coefficients and outputting a Q matrix and an R matrix;
a QH processor for multiplying a received signal vector having said received signals as elements by a complex conjugate transposed matrix of said Q matrix and outputting the product as a converted signal; and
a transmitted sequence estimator for outputting at least one of a transmitted sequence, a likelihood for said transmitted sequence, and a likelihood for bits transmitted by said transmitted sequence, based on said converted signal and said R matrix.

43. A receiving apparatus according to claim 42, wherein said transmitted sequence estimator includes likelihood calculator groups and signal selectors in P stages (P is an integer of 1 or greater);
a likelihood calculator group in a pth (p is an integer ranging from 1 to P) stage comprising Kp (Kp is an integer of 1 or greater) likelihood calculators;
each of said likelihood calculators calculating a likelihood in the pth stage and generating said transmitted symbol candidates based on the converted signal, said R matrix, Lp−1 (Lp−1 is an integer of 1 or greater) error signals output from a signal selector in a (p−1)th stage, and the transmitted symbol candidates; and
a signal selector in the pth stage outputting Lp (Lp is an integer of 1 or greater) maximum likelihoods and Lp transmitted symbol candidates which give the likelihoods, based on Kp likelihoods output from the likelihood calculator group in the pth stage and said transmitted symbol candidates.

44. A receiving apparatus according to claim 43, wherein data sequences transmitted from M transmission antennas are modulated respectively by independent modulating processes, and said modulating processes have respective different numbers of signal points, and said signal selector determines the number of error signals and transmitted symbol candidates which are output depending on the modulating process for the transmission antenna to be processed by a likelihood calculator in a next stage.

45. A receiving apparatus according to claim 42, wherein said transmitted sequence estimator includes likelihood calculator groups and signal selectors in P stages (P is an integer of 1 or greater);
a likelihood calculator group in a pth (p is an integer ranging from 1 to P) stage comprising Kp (Kp is an integer of 1 or greater) likelihood calculators;
each of said likelihood calculators calculating a likelihood in the pth stage and generating said transmitted symbol candidates based on the converted signal, said R matrix, Kp−1 (Kp−1 is an integer of 1 or greater) error signals output from a signal selector in a (p−1)th stage, and the transmitted symbol candidates; and
a signal selector in the pth stage outputting Kp+1 maximum likelihoods and Kp+1 transmitted symbol candidates which give the likelihoods, based on Kp likelihoods output from the likelihood calculator group in the pth stage and said transmitted symbol candidates.

46. A receiving apparatus according to claim 42, wherein said transmitted sequence estimator comprises likelihood calculator groups in M stages (M is an integer of 2 or greater) and signal selector groups in the M stages.

47. A receiving apparatus according to claim 42, wherein said transmitted sequence estimator comprises likelihood calculator groups in N stages (N is an integer of 2 or greater) and signal selector groups in the M stages.

48. A receiving apparatus according to claim 42, wherein said transmitted sequence estimator includes signal selectors in a plurality of stages, and a signal selector in a final stage selects and outputs a most likely transmitted sequence.

49. A receiving apparatus according to claim 42, wherein said transmitted sequence estimator includes signal selectors in a plurality of stages, and a signal selector in a final stage selects a most likely transmitted sequence and outputs a likelihood for said sequence.

50. A receiving apparatus according to claim 42, wherein said transmitted sequence estimator includes signal selectors in a plurality of stages, and a signal selector in a final stage selects a most likely transmitted sequence and outputs a likelihood for a bit sequence transmitted by said sequence.

51. A receiving apparatus according to claim 42, wherein said transmitted sequence estimator includes a likelihood calculator for generating a converted signal replica using elements of said R matrix and calculating the likelihood using a physical quantity measured from said converted signal replica and said received signals.

52. A receiving apparatus according to claim 51, wherein said likelihood calculator calculates the likelihood using a squared Euclidean distance between said received signals and said converted signal replica.

53. A receiving apparatus according to claim 51, wherein said likelihood calculator calculates the likelihood using a Euclidean distance converted by performing a given processing operation on a squared Euclidean distance between said received signals and said converted signal replica.

54. A receiving apparatus according to claim 42, wherein said transmitted sequence estimator includes a likelihood calculator for calculating the likelihood using the difference between a squared Euclidean distance between a converted signal replica at a bit 0 and the received signals and a squared Euclidean distance between a converted signal replica at a bit 1 and the received signals.

55. A receiving apparatus according to claim 54, wherein said transmitted sequence estimator includes an accumulator for accumulating a first squared Euclidean distance between a converted signal replica at a bit 0 and the received signals and a second squared Euclidean distance between a converted signal replica at a bit 1 and the received signals, and outputting a provisional squared Euclidean distance based on the accumulated squared Euclidean distances; and
wherein said likelihood calculator calculates the likelihood using said provisional squared Euclidean distance if either one of said first and second squared Euclidean distances is not output.

56. A receiving apparatus according to claim 54, wherein said squared Euclidean distance is replaced with a Euclidean distance which is converted by performing a given functional operation on said squared Euclidean distance.

57. A receiving apparatus according to claim 42, wherein said channel coefficient estimator estimates, in the transmitting apparatus having the M (M is an integer of 2 or greater) transmission antennas, the channel coefficients using pilot symbols periodically transmitted according to a symbol pattern inherent in each of the transmission antennas and known to the receiving apparatus.

58. A receiving apparatus according to claim 42, wherein said transmitting apparatus spreads in advance and then transmits the transmitted signals, and said QH processor multiplies the received signal vector having said received signals after being despread as elements by the complex conjugate transposed matrix of said Q matrix and outputs the product as the converted signal.

59. A receiving apparatus having N (N is an integer of 2 or greater) reception antennas in a wireless communication system for receiving and demodulating transmitted signals from a transmitting apparatus having M (M is an integer of 2 or greater) transmission antennas, said receiving apparatus comprising:
- means for performing nulling representative of the received signals, using a channel matrix having as elements channel coefficients between said reception antennas and said transmission antennas;
- means for demodulating said transmitted signals based on the nulled signals,
- a channel coefficient estimator for estimating and outputting said channel coefficients between said between said reception antennas and said transmission antennas based on said received signals;
- a QR decomposer for performing QR decomposition on the channel matrix of said channel coefficients and outputting a Q matrix and an R matrix;
- a QH processor for multiplying a received signal vector having said received signals as elements by a complex conjugate transposed matrix of said Q matrix and outputting the product as a converted signal;
- a transmitted symbol candidate selector for selecting and outputting a symbol candidate for said converted signal based on said received signals; and
- a transmitted sequence estimator for outputting at least one of a transmitted sequence, a likelihood for said transmitted sequence, and a likelihood for bits transmitted by said transmitted sequence, based on said converted signal, said symbol candidate, and said R matrix.

60. A receiving apparatus according to claim 59, wherein said transmitted symbol candidate selector employs a linear filter.

61. A receiving apparatus according to claim 59, wherein said transmitted symbol candidate selector employs maximum likelihood estimation.

62. A receiving apparatus having N (N is an integer of 2 or greater) reception antennas in a wireless communication system for receiving and demodulating transmitted signals from a transmitting apparatus having M (M is an integer of 2 or greater) transmission antennas, said receiving apparatus comprising:
- means for performing nulling representative of the received signals, using a channel matrix having as elements channel coefficients between said reception antennas and said transmission antennas;
- means for demodulating said transmitted signals based on the nulled signals,
- a channel coefficient estimator for estimating and outputting said channel coefficients between said between said reception antennas and said transmission antennas based on said received signals;
- a priority determiner for determining priorities between transmission sequences transmitted from said transmission antennas based on said received signals;
- a sorter for sorting said channel coefficients based on the channel coefficients estimated by said channel coefficient estimator and the priorities determined by said priority determiner, and outputting a modified channel matrix;
- a QR decomposer for performing QR decomposition on said modified channel matrix and outputting a Q matrix and an R matrix;
- a QH processor for multiplying a received signal vector having said received signals as elements by a complex conjugate transposed matrix of said Q matrix and outputting the product as a converted signal;
- a transmitted sequence estimator for outputting at least one of a transmitted sequence, a likelihood for said transmitted sequence, and a likelihood for bits transmitted by said transmitted sequence, based on said converted signal and said R matrix; and
- a restorer for restoring and outputting at least one of said transmitted sequence, the likelihood for said transmitted sequence, and the likelihood for bits transmitted by said transmitted sequence, based on the output from said transmitted sequence estimator and said priorities.

63. A receiving apparatus according to claim 62, wherein said priority determiner employs received electric power of each of said transmitted sequences.

64. A receiving apparatus according to claim 62, wherein said priority determiner employs a received electric power vs. noise electric power ratio of each of said transmitted sequences.

65. A receiving apparatus according to claim 62, wherein said priority determiner employs a received electric power vs. noise electric power ratio and an interference electric power ratio of each of said transmitted sequences.

66. A receiving apparatus according to claim 62, wherein data sequences transmitted from M transmission antennas are modulated respectively by independent modulating processes, and said modulating processes have respective different numbers of signal points, and said priority determiner determines said priorities based on said modulating processes for the respective transmission antennas.

67. A receiving apparatus according to claim 66, wherein a priority is given to an antenna which has sequences of a lower modulation multi-valued number among said transmission antennas.

68. A receiving apparatus having N (N is an integer of 2 or greater) reception antennas in a wireless communication system for receiving and demodulating transmitted signals from a transmitting apparatus having M (M is an integer of 2or greater) transmission antennas, said receiving apparatus comprising:
- means for performing nulling representative of the received signals, using a channel matrix having as elements channel coefficients between said reception antennas and said transmission antennas;
- means for demodulating said transmitted signals based on the nulled signals,
- a channel coefficient estimator for estimating and outputting said channel coefficients between said between said reception antennas and said transmission antennas based on said received signals;
- a QR decomposer for performing QR decomposition on the channel matrix of said channel coefficients and outputting a Q matrix and an R matrix;
- a QH processor for multiplying a received signal vector having said received signals as elements by a complex conjugate transposed matrix of said Q matrix and outputting the product as a converted signal;
- a transmitted sequence candidate selector for determining candidate sequences for L (L is an integer ranging from 1 to M) converted signals based on said received signals and outputting the determined candidate sequences as transmitted sequence candidates; and a transmitted sequence estimator for outputting at least one of a transmitted sequence, a likelihood for said transmitted sequence, and a likelihood for bits transmitted by said transmitted sequence, based on said converted signal, said R matrix, and said transmitted sequence candidates.

69. A receiving apparatus according to claim 68, wherein said transmitted sequence candidate selector employs a linear filter.

70. A receiving apparatus according to claim 68, wherein said transmitted sequence candidate selector employs maximum likelihood estimation.

71. A receiving apparatus having N (N is an integer of 2 or greater) reception antennas in a wireless communication system for receiving and demodulating transmitted signals from a transmitting apparatus having M (M is an integer of 2 or greater) transmission antennas, said receiving apparatus comprising:

means for performing nulling representative of the received signals, using a channel matrix having as elements channel coefficients between said reception antennas and said transmission antennas;

means for demodulating said transmitted signals based on the nulled signals, a channel coefficient estimator for estimating and outputting said channel coefficients between said between said reception antennas and said transmission antennas based on said received signals;

a priority determiner for determining priorities between transmission sequences transmitted from said transmission antennas based on said received signals;

a sorter for sorting said channel coefficients based on the channel coefficients estimated by said channel coefficient estimator and the priorities determined by said priority determiner, and outputting a modified channel matrix;

a QR decomposer for performing QR decomposition on said modified channel matrix and outputting a Q matrix and an R matrix;

a QH processor for multiplying a received signal vector having said received signals as elements by a complex conjugate transposed matrix of said Q matrix and outputting the product as a converted signal;

a transmitted symbol candidate selector for selecting a symbol candidate for a demodulated sequence based on said received signals, and outputting a transmitted symbol candidate;

a transmitted sequence estimator for outputting at least one of a transmitted sequence, a likelihood for said transmitted sequence, and a likelihood for bits transmitted by said transmitted sequence, based on said converted signal, said R matrix, and said transmitted symbol candidate; and a restorer for restoring and outputting at least one of said transmitted sequence, the likelihood for said transmitted sequence, and the likelihood for bits transmitted by said transmitted sequence, based on the output from said transmitted sequence estimator and said priorities.

72. A receiving apparatus having N (N is an integer of 2 or greater) reception antennas in a wireless communication system for receiving and demodulating transmitted signals from a transmitting apparatus having M (M is an integer of 2 or greater) transmission antennas, said receiving apparatus comprising:

means for performing nulling representative of the received signals, using a channel matrix having as elements channel coefficients between said reception antennas and said transmission antennas;

means for demodulating said transmitted signals based on the nulled signals, a channel coefficient estimator for estimating and outputting said channel coefficients between said between said reception antennas and said transmission antennas based on said received signals;

a priority determiner for determining priorities between transmission sequences transmitted from said transmission antennas based on said received signals;

a sorter for sorting said channel coefficients based on the channel coefficients estimated by said channel coefficient estimator and the priorities determined by said priority determiner, and outputting a modified channel matrix;

a QR decomposer for performing QR decomposition on said modified channel matrix and outputting a Q matrix and an R matrix;

a QH processor for multiplying a received signal vector having said received signals as elements by a complex conjugate transposed matrix of said Q matrix and outputting the product as a converted signal;

a transmitted sequence candidate selector for determining candidate sequences for L (L is an integer ranging from 1 to M) converted signals based on said received signals and outputting the determined candidate sequences as transmitted sequence candidates;

a transmitted sequence estimator for outputting at least one of a transmitted sequence, a likelihood for said transmitted sequence, and a likelihood for bits transmitted by said transmitted sequence, based on said converted signal, said R matrix, and said transmitted sequence candidates; and a restorer for restoring and outputting at least one of said transmitted sequence, the likelihood for said transmitted sequence, and the likelihood for bits transmitted by said transmitted sequence, based on the output from said transmitted sequence estimator and said priorities.

73. A receiving apparatus having N (N is an integer of 2 or greater) reception antennas in a wireless communication system for receiving and demodulating transmitted signals from a transmitting apparatus having M (M is an integer of 2 or greater) transmission antennas, said receiving apparatus comprising:

means for performing nulling representative of the received signals, using a channel matrix having as elements channel coefficients between said reception antennas and said transmission antennas;

means for demodulating said transmitted signals based on the nulled signals, a channel coefficient estimator for estimating and outputting said channel coefficients between said between said reception antennas and said transmission antennas based on said received signals;

a QR decomposer for performing QR decomposition on the channel matrix of said channel coefficients and outputting a Q matrix and an R matrix;

a QH processor for multiplying a received signal vector having said received signals as elements by a complex conjugate transposed matrix of said Q matrix and outputting the product as a converted signal;

a transmitted sequence candidate selector for determining candidate sequences for L (L is an integer ranging from 1 to M) converted signals based on said received signals and outputting the determined candidate sequences as transmitted sequence candidates;

a transmitted symbol candidate selector for selecting and outputting symbol candidates for (M−L) demodulated signals based on said received signals; and a transmitted sequence estimator for outputting at least one of a transmitted sequence, a likelihood for said transmitted sequence, and a likelihood for bits transmitted by said transmitted sequence, based on said converted signal, said R matrix, said transmitted sequence candidates, and said symbol candidates.

74. A receiving apparatus having N (N is an integer of 2 or greater) reception antennas in a wireless communication system for receiving and demodulating transmitted signals from a transmitting apparatus having M (M is an integer of 2 or greater) transmission antennas, said receiving apparatus comprising:

means for performing nulling representative of the received signals, using a channel matrix having as elements channel coefficients between said reception antennas and said transmission antennas;

means for demodulating said transmitted signals based on the nulled signals, a channel coefficient estimator for estimating and outputting said channel coefficients between said between said reception antennas and said transmission antennas based on said received signals;

a priority determiner for determining priorities between transmission sequences transmitted from said transmission antennas based on said received signals;

a sorter for sorting said channel coefficients based on the channel coefficients estimated by said channel coefficient estimator and the priorities determined by said priority determiner, and outputting a modified channel matrix;

a QR decomposer for performing QR decomposition on said modified channel matrix and outputting a Q matrix and an R matrix;

a QH processor for multiplying a received signal vector having said received signals as elements by a complex conjugate transposed matrix of said Q matrix and outputting the product as a converted signal;

a transmitted sequence candidate selector for determining candidate sequences for L (L is an integer ranging from 1 to M) converted signals based on said received signals and outputting the determined candidate sequences as transmitted sequence candidates;

a transmitted symbol candidate selector for selecting and outputting symbol candidates for (M−L) converted signals based on said received signals;

a transmitted sequence estimator for outputting at least one of a transmitted sequence, a likelihood for said transmitted sequence, and a likelihood for bits transmitted by said transmitted sequence, based on said converted signal, said R matrix, and said symbol candidates; and a restorer for restoring and outputting at least one of said transmitted sequence, the likelihood for said transmitted sequence, and the likelihood for bits transmitted by said transmitted sequence, based on the output from said transmitted sequence estimator and said priorities.

75. A receiving apparatus having N (N is an integer of 2 or greater) reception antennas in a wireless communication system for receiving and demodulating transmitted signals from a transmitting apparatus having M (M is an integer of 2 or greater) transmission antennas, said receiving apparatus comprising:

an accumulator for accumulating a first squared Euclidean distance at a bit 0 and a second squared Euclidean distance at a bit 1, and outputting a provisional squared Euclidean distance based on the accumulated squared Euclidean distances; and means for calculating a likelihood using said provisional squared Euclidean distance if either one of said first and second squared Euclidean distances is not output.

76. A recording apparatus according to claim 75, wherein said squared Euclidean distance is replaced with a Euclidean distance which is converted by performing a given functional operation on said squared Euclidean distance.

77. A demodulating method of receiving and demodulating transmitted signals from a transmitting apparatus having M (M is an integer of 2 or greater) transmission antennas, in a receiving apparatus having N (N is an integer of 2 or greater) reception antennas, said demodulating method comprising the steps of:

performing nulling representative of orthogonalization of the received signals, using a channel matrix having as elements channel coefficients between said reception antennas and said transmission antennas; and demodulating said transmitted signals based on the nulled signals;

wherein said step of performing nulling uses a complex conjugate transposed matrix of a Q matrix produced by QR-decomposing the channel matrix as nulling.

78. A demodulating method of receiving and demodulating transmitted signals from a transmitting apparatus having M (M is an integer of 2 or greater) transmission antennas, in a receiving apparatus having N (N is an integer of 2 or greater) reception antennas, said demodulating method comprising the steps of:

performing nulling representative of orthogonalization of the received signals, using a channel matrix having as elements channel coefficients between said reception antennas and said transmission antennas; and demodulating said transmitted signals based on the nulled signals;

wherein said transmitted signals are demodulated in a descending order from a transmitted sequence transmitted from an Mth transmitted antenna to a transmitted sequence transmitted from a first transmitted antenna, based on the nulled signals.

79. A demodulating method of receiving and demodulating transmitted signals from a transmitting apparatus having M (M is an integer of 2 or greater) transmission antennas, in a receiving apparatus having N (N is an integer of 2 or greater) reception antennas, said demodulating method comprising the steps of:

performing nulling representative of orthogonalization of the received signals, using a channel matrix having as elements channel coefficients between said reception antennas and said transmission antennas; and demodulating said transmitted signals based on the nulled signals;

wherein said receiving apparatus comprises:

a channel coefficient estimator for estimating and outputting said channel coefficients between said between said reception antennas and said transmission antennas based on said received signals;

a QR decomposer for performing QR decomposition on the channel matrix of said channel coefficients and outputting a Q matrix and an R matrix;

a QH processor for multiplying a received signal vector having said received signals as elements by a complex conjugate transposed matrix of said Q matrix and outputting the product as a converted signal; and a transmitted sequence estimator for outputting at least one of a transmitted sequence, a likelihood for said transmitted sequence, and a likelihood for bits transmitted by said transmitted sequence, based on said converted signal and said R matrix.

80. A demodulating method according to claim 79, wherein said transmitted sequence estimator includes likelihood calculator groups and signal selectors in P stages (P is an integer of 1 or greater);

a likelihood calculator group in a pth (p is an integer ranging from 1 to P) stage comprising Kp (Kp is an integer of 1 or greater) likelihood calculators;

each of said likelihood calculators calculating a likelihood in the pth stage and generating said transmitted symbol candidates based on the converted signal, said R matrix, Lp−1 (Lp−1 is an integer of 1 or greater) error signals output from a signal selector in a (p−1)th stage, and the transmitted symbol candidates; and a signal selector in the pth stage outputting Lp (Lp is an integer of 1 or greater) maximum likelihoods and Lp transmitted symbol candidates which give the likelihoods, based on Kp likelihoods output from the likelihood calculator group in the pth stage and said transmitted symbol candidates.

81. A demodulating method according to claim 80, wherein data sequences transmitted from M transmission antennas are modulated respectively by independent modulating processes, and said modulating processes have respective different numbers of signal points, and said signal selector determines the number of error signals and transmitted symbol candidates which are output depending on the modulating process for the transmission antenna to be processed by a likelihood calculator in a next stage.

82. A demodulating method according to claim 79, wherein said transmitted sequence estimator includes likelihood calculator groups and signal selectors in P stages (P is an integer of 1 or greater);

a likelihood calculator group in a pth (p is an integer ranging from 1 to P) stage comprising Kp (Kp is an integer of 1 or greater) likelihood calculators;

each of said likelihood calculators calculating a likelihood in the pth stage and generating said transmitted symbol candidates based on the converted signal, said R matrix, Kp−1 (Kp−1 is an integer of 1 or greater) error signals output from a signal selector in a (p−1)th stage, and the transmitted symbol candidates; and a signal selector in the pth stage outputting Kp+1 maximum likelihoods and Kp+1 transmitted symbol candidates which give the likelihoods, based on Kp likelihoods output from the likelihood calculator group in the pth stage and said transmitted symbol candidates.

83. A demodulating method according to claim 79, wherein said transmitted sequence estimator comprises likelihood calculator groups in M stages (M is an integer of 2 or greater) and signal selector groups in the M stages.

84. A demodulating method according to claim 79, wherein said transmitted sequence estimator comprises likelihood calculator groups in M stages (M is an integer of 2 or greater) and signal selector groups in the M stages.

85. A demodulating method according to claim 79, wherein said transmitted sequence estimator includes signal selectors in a plurality of stages, and a signal selector in a final stage selects a most likely transmitted sequence.

86. A demodulating method according to claim 79, wherein said transmitted sequence estimator includes signal selectors in a plurality of stages, and a signal selector in a final stage selects a most likely transmitted sequence and outputs a likelihood for said sequence.

87. A demodulating method according to claim 79, wherein said transmitted sequence estimator includes signal selectors in a plurality of stages, and a signal selector in a final stage selects a most likely transmitted sequence and outputs a likelihood for a bit sequence transmitted by said sequence.

88. A demodulating method according to claim 79, wherein said transmitted sequence estimator includes a likelihood calculator for generating a converted signal replica using elements of said R matrix and calculating the likelihood using a physical quantity measured from said converted signal replica and said received signals.

89. A demodulating method according to claim 88, wherein said likelihood calculator calculates the likelihood using a squared Euclidean distance between said received signals and said converted signal replica.

90. A demodulating method according to claim 88, wherein said likelihood calculator calculates the likelihood using a Euclidean distance converted by performing a given processing operation on a squared Euclidean distance between said received signals and said converted signal replica.

91. A demodulating method according to claim 79, wherein said transmitted sequence estimator includes a likelihood calculator for calculating the likelihood using the difference between a squared Euclidean distance between a converted signal replica at a bit 0 and the received signals and a squared Euclidean distance between a converted signal replica at a bit 1 and the received signals.

92. A demodulating method according to claim 91, wherein said transmitted sequence estimator includes an accumulator for accumulating a first squared Euclidean distance between a converted signal replica at a bit 0 and the received signals and a second squared Euclidean distance between a converted signal replica at a bit 1 and the received signals, and outputting a provisional squared Euclidean distance based on the accumulated squared Euclidean distances.

93. A demodulating method according to claim 91, wherein said squared Euclidean distance is replaced with a Euclidean distance which is converted by performing a given functional operation on said squared Euclidean distance.

94. A demodulating method according to claim 79, wherein said channel coefficient estimator estimates, in the transmitting apparatus having the M (M is an integer of 2 or greater) transmission antennas, the channel coefficients using pilot symbols periodically transmitted according to a symbol pattern inherent in each of the transmission antennas and known to the receiving apparatus.

95. A demodulating method according to claim 79, wherein said transmitting apparatus spreads in advance and then transmits the transmitted signals, and said QH processor multiplies the received signal vector having said received signals after being despread as elements by the complex conjugate transposed matrix of said Q matrix and outputs the product as the converted signal.

96. A demodulating method of receiving and demodulating transmitted signals from a transmitting apparatus having M (M is an integer of 2 or greater) transmission antennas, in a receiving apparatus having N (N is an integer of 2 or greater) reception antennas, said demodulating method comprising the steps of:

performing nulling representative of orthogonalization of the received signals, using a channel matrix having as elements channel coefficients between said reception antennas and said transmission antennas; and demodulating said transmitted signals based on the nulled signals;

wherein said receiving apparatus comprises:

a channel coefficient estimator for estimating and outputting said channel coefficients between said between said reception antennas and said transmission antennas based on said received signals;

a QR decomposer for performing QR decomposition on the channel matrix of said channel coefficients and outputting a Q matrix and an R matrix;

a QH processor for multiplying a received signal vector having said received signals as elements by a complex conjugate transposed matrix of said Q matrix and outputting the product as a converted signal;

a transmitted symbol candidate selector for selecting and outputting a symbol candidate for said converted signal based on said received signals; and a transmitted sequence estimator for outputting at least one of a transmitted sequence, a likelihood for said transmitted sequence, and a likelihood for bits transmitted by said transmitted sequence, based on said converted signal, said symbol candidate, and said R matrix.

97. A demodulating method according to claim 96, wherein said transmitted symbol candidate selector employs a linear filter.

98. A demodulating method according to claim 96, wherein said transmitted symbol candidate selector employs maximum likelihood estimation.

99. A demodulating method of receiving and demodulating transmitted signals from a transmitting apparatus having M (M is an integer of 2 or greater) transmission antennas, in a receiving apparatus having N (N is an integer of 2 or greater) reception antennas, said demodulating method comprising the steps of:

performing nulling representative of orthogonalization of the received signals, using a channel matrix having as elements channel coefficients between said reception antennas and said transmission antennas; and demodulating said transmitted signals based on the nulled signals;

wherein said receiving apparatus comprises:

a channel coefficient estimator for estimating and outputting said channel coefficients between said between said reception antennas and said transmission antennas based on said received signals;

a priority determiner for determining priorities between transmission sequences transmitted from said transmission antennas based on said received signals;

a sorter for sorting said channel coefficients based on the channel coefficients estimated by said channel coefficient estimator and the priorities determined by said priority determiner, and outputting a modified channel matrix;

a QR decomposer for performing QR decomposition on said modified channel matrix and outputting a Q matrix and an R matrix;

a QH processor for multiplying a received signal vector having said received signals as elements by a complex conjugate transposed matrix of said Q matrix and outputting the product as a converted signal;

a transmitted sequence estimator for outputting at least one of a transmitted sequence, a likelihood for said transmitted sequence, and a likelihood for bits transmitted by said transmitted sequence, based on said converted signal and said R matrix; and a restorer for restoring and outputting at least one of said transmitted sequence, the likelihood for said transmitted sequence, and the likelihood for bits transmitted by said transmitted sequence, based on the output from said transmitted sequence estimator and said priorities.

100. A demodulating method according to claim 99, wherein said priority determiner employs received electric power of each of said transmitted sequences.

101. A demodulating method according to claim 99, wherein said priority determiner employs a received electric power vs. noise electric power ratio of each of said transmitted sequences.

102. A demodulating method according to claim 99, wherein data sequences transmitted from M transmission antennas are modulated respectively by independent modulating processes, and said modulating processes have respective different numbers of signal points, and said priority determiner determines said priorities based on said modulating processes for the respective transmission antennas.

103. A demodulating method according to claim 102, wherein a priority is given to an antenna which has sequences of a lower modulation multi-valued number among said transmission antennas.

104. A demodulating method according to claim 99, wherein data sequences transmitted from M transmission antennas are modulated respectively by independent modulating processes, and said modulating processes have respective independent coding ratios, and said priority determiner determines said priorities based on the coding ratios for the respective transmission antennas.

105. A demodulating method of receiving and demodulating transmitted signals from a transmitting apparatus having M (M is an integer of 2 or greater) transmission antennas, in a receiving apparatus having N (N is an integer of 2 or greater) reception antennas, said demodulating method comprising the steps of:

performing nulling representative of orthogonalization of the received signals, using a channel matrix having as elements channel coefficients between said reception antennas and said transmission antennas; and demodulating said transmitted signals based on the nulled signals;

wherein said receiving apparatus comprises:

a channel coefficient estimator for estimating and outputting said channel coefficients between said between said reception antennas and said transmission antennas based on said received signals;

a QR decomposer for performing QR decomposition on the channel matrix of said channel coefficients and outputting a Q matrix and an R matrix;

a QH processor for multiplying a received signal vector having said received signals as elements by a complex conjugate transposed matrix of said Q matrix and outputting the product as a converted signal;

a transmitted sequence candidate selector for determining candidate sequences for L (L is an integer ranging from 1 to M) converted signals based on said received signals and outputting the determined candidate sequences as transmitted sequence candidates; and a transmitted sequence estimator for outputting at least one of a transmitted sequence, a likelihood for said transmitted sequence, and a likelihood for bits transmitted by said transmitted sequence, based on said converted signal, said R matrix, and said transmitted sequence candidates.

106. A demodulating method according to claim 99, wherein said priority determiner employs a received electric power vs. noise electric power ratio and an interference electric power ratio of each of said transmitted sequences.

107. A demodulating method according to claim 105, wherein said transmitted sequence candidate selector employs a linear filter.

108. A demodulating method according to claim 105, wherein said transmitted sequence candidate selector employs maximum likelihood estimation.

109. A demodulating method of receiving and demodulating transmitted signals from a transmitting apparatus having M (M is an integer of 2 or greater) transmission antennas, in a receiving apparatus having N (N is an integer of 2 or greater) reception antennas, said demodulating method comprising the steps of:
  performing nulling representative of orthogonalization of the received signals, using a channel matrix having as elements channel coefficients between said reception antennas and said transmission antennas; and
  demodulating said transmitted signals based on the nulled signals;
  wherein said receiving apparatus comprises:
  a channel coefficient estimator for estimating and outputting said channel coefficients between said between said reception antennas and said transmission antennas based on said received signals;
  a priority determiner for determining priorities between transmission sequences transmitted from said transmission antennas based on said received signals;
  a sorter for sorting said channel coefficients based on the channel coefficients estimated by said channel coefficient estimator and the priorities determined by said priority determiner, and outputting a modified channel matrix;
  a QR decomposer for performing QR decomposition on said modified channel matrix and outputting a Q matrix and an R matrix;
  a QH processor for multiplying a received signal vector having said received signals as elements by a complex conjugate transposed matrix of said Q matrix and outputting the product as a converted signal;
  a transmitted symbol candidate selector for selecting a symbol candidate for a demodulated sequence based on said received signals, and outputting a transmitted symbol candidate;
  a transmitted sequence estimator for outputting at least one of a transmitted sequence, a likelihood for said transmitted sequence, and a likelihood for bits transmitted by said transmitted sequence, based on said converted signal, said R matrix, and said transmitted symbol candidate; and
  a restorer for restoring and outputting at least one of said transmitted sequence, the likelihood for said transmitted sequence, and the likelihood for bits transmitted by said transmitted sequence, based on the output from said transmitted sequence estimator and said priorities.

110. A demodulating method of receiving and demodulating transmitted signals from a transmitting apparatus having M (M is an integer of 2 or greater) transmission antennas, in a receiving apparatus having N (N is an integer of 2 or greater) reception antennas, said demodulating method comprising the steps of:
  performing nulling representative of orthogonalization of the received signals, using a channel matrix having as elements channel coefficients between said reception antennas and said transmission antennas; and
  demodulating said transmitted signals based on the nulled signals;
  wherein said receiving apparatus comprises:
  a channel coefficient estimator for estimating and outputting said channel coefficients between said between said reception antennas and said transmission antennas based on said received signals;
  a priority determiner for determining priorities between transmission sequences transmitted from said transmission antennas based on said received signals;
  a sorter for sorting said channel coefficients based on the channel coefficients estimated by said channel coefficient estimator and the priorities determined by said priority determiner, and outputting a modified channel matrix;
  a QR decomposer for performing QR decomposition on said modified channel matrix and outputting a Q matrix and an R matrix;
  a QH processor for multiplying a received signal vector having said received signals as elements by a complex conjugate transposed matrix of said Q matrix and outputting the product as a converted signal;
  a transmitted sequence candidate selector for determining candidate sequences for L (L is an integer ranging from 1 to M) converted signals based on said received signals and outputting the determined candidate sequences as transmitted sequence candidates;
  a transmitted sequence estimator for outputting at least one of a transmitted sequence, a likelihood for said transmitted sequence, and a likelihood for bits transmitted by said transmitted sequence, based on said converted signal, said R matrix, and said transmitted sequence candidates; and
  a restorer for restoring and outputting at least one of said transmitted sequence, the likelihood for said transmitted sequence, and the likelihood for bits transmitted by said transmitted sequence, based on the output from said transmitted sequence estimator and said priorities.

111. A demodulating method of receiving and demodulating transmitted signals from a transmitting apparatus having M (M is an integer of 2 or greater) transmission antennas, in a receiving apparatus having N (N is an integer of 2 or greater) reception antennas, said demodulating method comprising the steps of:
  performing nulling representative of orthogonalization of the received signals, using a channel matrix having as elements channel coefficients between said reception antennas and said transmission antennas; and
  demodulating said transmitted signals based on the nulled signals;
  wherein said receiving apparatus comprises:
  a channel coefficient estimator for estimating and outputting said channel coefficients between said between said reception antennas and said transmission antennas based on said received signals;
  a QR decomposer for performing QR decomposition on the channel matrix of said channel coefficients and outputting a Q matrix and an R matrix;
  a QH processor for multiplying a received signal vector having said received signals as elements by a complex conjugate transposed matrix of said Q matrix and outputting the product as a converted signal;
  a transmitted sequence candidate selector for determining candidate sequences for L (L is an integer ranging from 1 to M) converted signals based on said received signals and outputting the determined candidate sequences as transmitted sequence candidates;

a transmitted symbol candidate selector for selecting and outputting symbol candidates for (M−L) demodulated signals based on said received signals; and a transmitted sequence estimator for outputting at least one of a transmitted sequence, a likelihood for said transmitted sequence, and a likelihood for bits transmitted by said transmitted sequence, based on said converted signal, said R matrix, said transmitted sequence candidates, and said symbol candidates.

112. A demodulating method of receiving and demodulating transmitted signals from a transmitting apparatus having M (M is an integer of 2 or greater) transmission antennas, in a receiving apparatus having N (N is an integer of 2 or greater) reception antennas, said demodulating method comprising the steps of:

performing nulling representative of orthogonalization of the received signals, using a channel matrix having as elements channel coefficients between said reception antennas and said transmission antennas; and demodulating said transmitted signals based on the nulled signals;

wherein said receiving apparatus comprises:

a channel coefficient estimator for estimating and outputting said channel coefficients between said between said reception antennas and said transmission antennas based on said received signals;

a priority determiner for determining priorities between transmission sequences transmitted from said transmission antennas based on said received signals;

a sorter for sorting said channel coefficients based on the channel coefficients estimated by said channel coefficient estimator and the priorities determined by said priority determiner, and outputting a modified channel matrix;

a QR decomposer for performing QR decomposition on said modified channel matrix and outputting a Q matrix and an R matrix;

a QH processor for multiplying a received signal vector having said received signals as elements by a complex conjugate transposed matrix of said Q matrix and outputting the product as a converted signal;

a transmitted sequence candidate selector for determining candidate sequences for L (L is an integer ranging from 1 to M) converted signals based on said received signals and outputting the determined candidate sequences as transmitted sequence candidates;

a transmitted symbol candidate selector for selecting and outputting symbol candidates for (M−L) converted signals based on said received signals;

a transmitted sequence estimator for outputting at least one of a transmitted sequence, a likelihood for said transmitted sequence, and a likelihood for bits transmitted by said transmitted sequence, based on said converted signal, said R matrix, and said symbol candidates; and a restorer for restoring and outputting at least one of said transmitted sequence, the likelihood for said transmitted sequence, and the likelihood for bits transmitted by said transmitted sequence, based on the output from said transmitted sequence estimator and said priorities.

113. A demodulating method of receiving and demodulating transmitted signals from a transmitting apparatus having M (M is an integer of 2 or greater) transmission antennas, in a receiving apparatus having N (N is an integer of 2 or greater) reception antennas, said demodulating method comprising the steps of:

accumulating a first squared Euclidean distance at a bit 0 and a second squared Euclidean distance at a bit 1, and outputting a provisional squared Euclidean distance based on the accumulated squared Euclidean distances; and calculating a likelihood using said provisional squared Euclidean distance if either one of said first and second squared Euclidean distances is not output.

114. A demodulating method according to claim 113, wherein said squared Euclidean distance is replaced with a Euclidean distance which is converted by performing a given functional operation on said squared Euclidean distance.

* * * * *